United States Patent [19]

McNamara et al.

[11] Patent Number: 5,487,066
[45] Date of Patent: Jan. 23, 1996

[54] DISTRIBUTED INTELLIGENCE NETWORK USING TIME AND FREQUENCY MULTIPLEXING

[75] Inventors: Robert P. McNamara, San Jose; Alan Saldinger, Cupertino; Robert J. Cringle, Mountain View; Gigi C. Chu, Santa Clara; Shanubhog G. Sangameswara, Cupertino; Peterpaul Vita, Saratoga; Michael M. Ouye, Mountain View; David R. F. Stevens, Los Altos; Celeste Baranski, Palo Alto; Cai U. Monsson, Capitola; Timothy P. Murphy, Mountain View; Kevin T. Murphy, Los Altos; Gary M. Ellis, San Jose; Ranjit Ghate, Oakland, all of Calif.

[73] Assignee: First Pacific Networks, Inc., San Jose, Calif.

[21] Appl. No.: 185,673

[22] Filed: Jan. 21, 1994

(Under 37 CFR 1.47)

Related U.S. Application Data

[63] Continuation of Ser. No. 345,490, Apr. 28, 1989, abandoned, which is a continuation-in-part of Ser. No. 170,968, Mar. 21, 1988, abandoned.

[51] Int. Cl.⁶ .............................. H04J 3/26; H04L 12/26
[52] U.S. Cl. ................... 370/85.2; 370/94.1; 370/105.1; 370/110.1
[58] Field of Search ................ 370/13, 17, 24, 370/29, 30, 50, 69.1, 120, 124, 75, 76, 85.1, 85.2, 85.3, 94.1, 95.1, 100.1, 103, 105.1, 110.1; 375/356, 367, 373, 376

[56] References Cited

U.S. PATENT DOCUMENTS

| | | |
|---|---|---|
| Re. 28,598 | 10/1975 | Baer et al. |
| 3,705,269 | 12/1972 | Audersirk et al. |
| 3,706,996 | 12/1972 | Hafner. |
| 3,893,033 | 7/1975 | Finch. |
| 4,087,627 | 5/1978 | Sato et al. |
| 4,289,930 | 9/1981 | Connolly et al. |
| 4,381,522 | 4/1983 | Lambert. |
| 4,393,515 | 7/1983 | de Neuman. |
| 4,402,008 | 8/1983 | Teraslinna. |
| 4,411,007 | 10/1983 | Rodman et al. .................. 375/107 |
| 4,450,554 | 5/1984 | Steensma et al. |
| 4,451,701 | 5/1984 | Bendig. |
| 4,470,140 | 9/1984 | Coffey. |
| 4,485,400 | 11/1984 | Lemelson et al. |
| 4,491,983 | 1/1985 | Pinnow. |
| 4,506,387 | 3/1985 | Walter. |
| 4,516,240 | 5/1985 | Kume et al. |
| 4,518,989 | 5/1985 | Yabiki et al. |
| 4,531,239 | 7/1985 | Usui. |
| 4,535,330 | 8/1985 | Carey et al. |
| 4,536,874 | 8/1985 | Stoffel et al. |
| 4,536,875 | 8/1985 | Kume et al. |
| 4,538,261 | 8/1985 | Kume. |

(List continued on next page.)

FOREIGN PATENT DOCUMENTS

| | | |
|---|---|---|
| 0188117 | 7/1984 | European Pat. Off. |
| 0173364 | 3/1986 | European Pat. Off. |
| 0200704 | 12/1986 | European Pat. Off. |
| 0209383 | 1/1987 | European Pat. Off. |
| 0229684 | 7/1987 | European Pat. Off. |
| 0257901 | 3/1988 | European Pat. Off. |
| 0334569 | 9/1989 | European Pat. Off. |
| 0385695 | 9/1990 | European Pat. Off. |

*Primary Examiner*—Melvin Marcelo
*Attorney, Agent, or Firm*—Philip H. Albert; Townsend and Townsend and Crew

[57] ABSTRACT

A distributed intelligence network using time and frequency domain multiplexing. On power-up, each node determines its skew and requests downloading of program code and configuration data. A node claims timeslots by transmitting a packet into an apparently empty timeslot and verifying receipt of its own packet.

37 Claims, 45 Drawing Sheets

U.S. PATENT DOCUMENTS

| | | |
|---|---|---|
| 4,538,263 | 8/1985 | Gabrielli et al. . |
| 4,539,677 | 9/1985 | Lo . |
| 4,543,654 | 9/1985 | Jones . |
| 4,544,950 | 10/1985 | Tu . |
| 4,550,402 | 10/1985 | Gable et al. . |
| 4,562,573 | 12/1985 | Murano et al. . |
| 4,564,940 | 1/1986 | Yahata . |
| 4,644,526 | 2/1987 | Wu . |
| 4,675,866 | 6/1987 | Takumi et al. . |
| 4,694,453 | 9/1987 | Kobayashi et al. . |
| 4,750,168 | 6/1988 | Trevitt . |
| 4,757,496 | 7/1988 | Bartholet et al. . |
| 4,763,319 | 8/1988 | Rozenglit . |
| 4,763,320 | 8/1988 | Rudolph et al. . |
| 4,811,338 | 3/1989 | Haruyama et al. . |

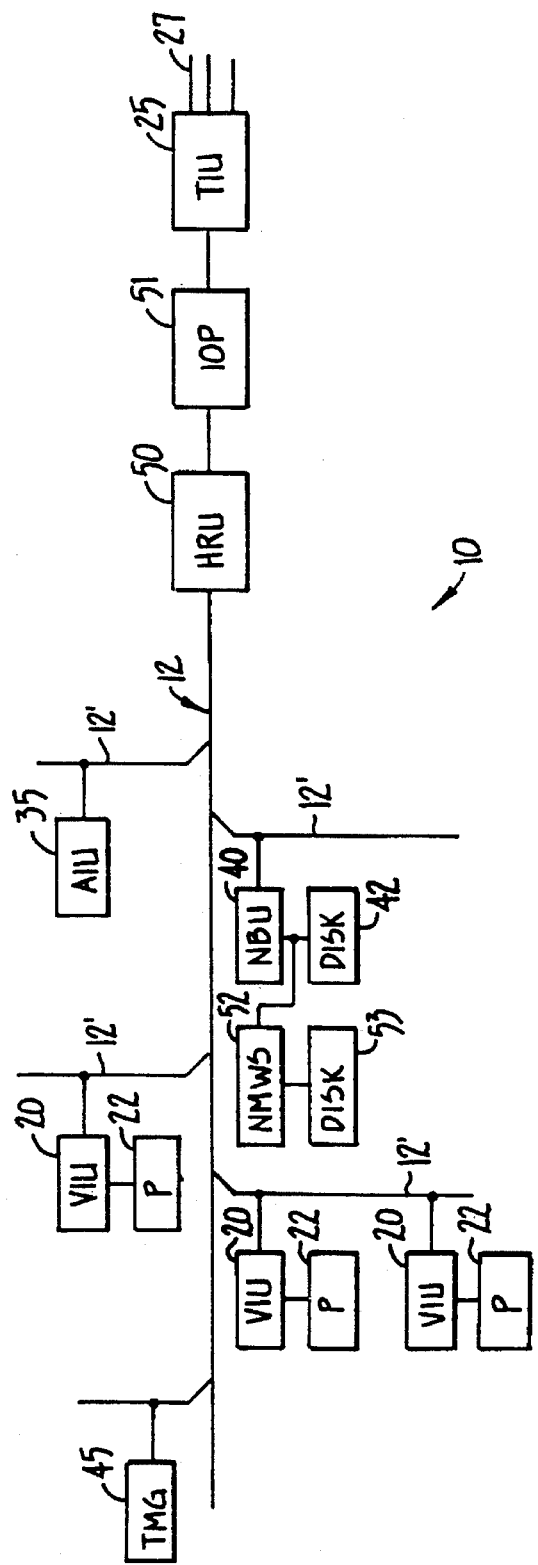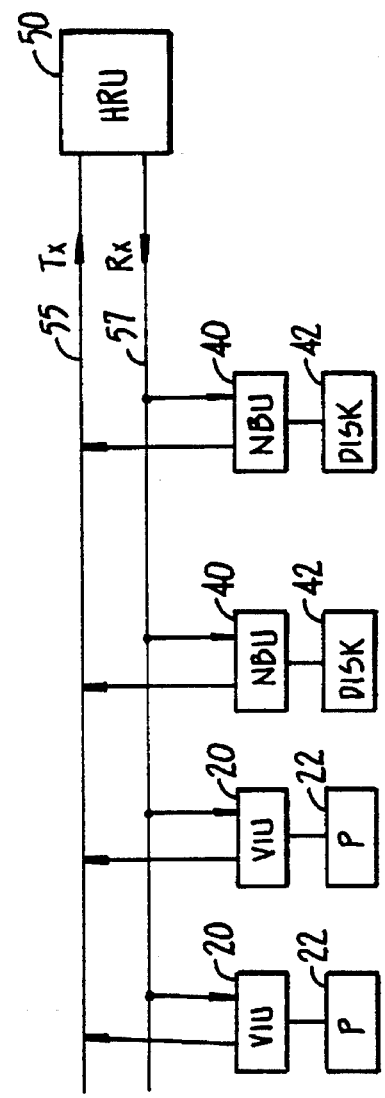
FIG._A-1.
FIG._A-2.

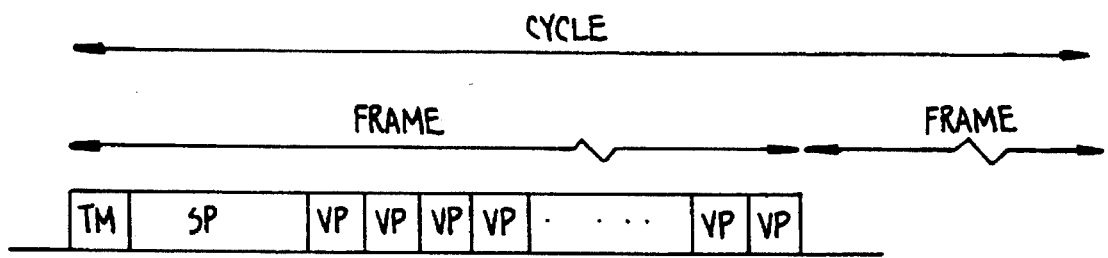
FIG._A-3.
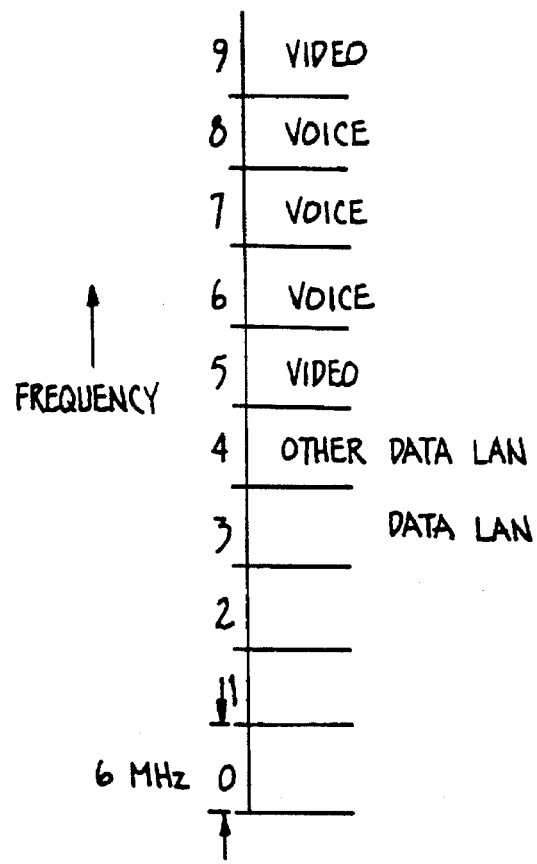
FIG._C-3.

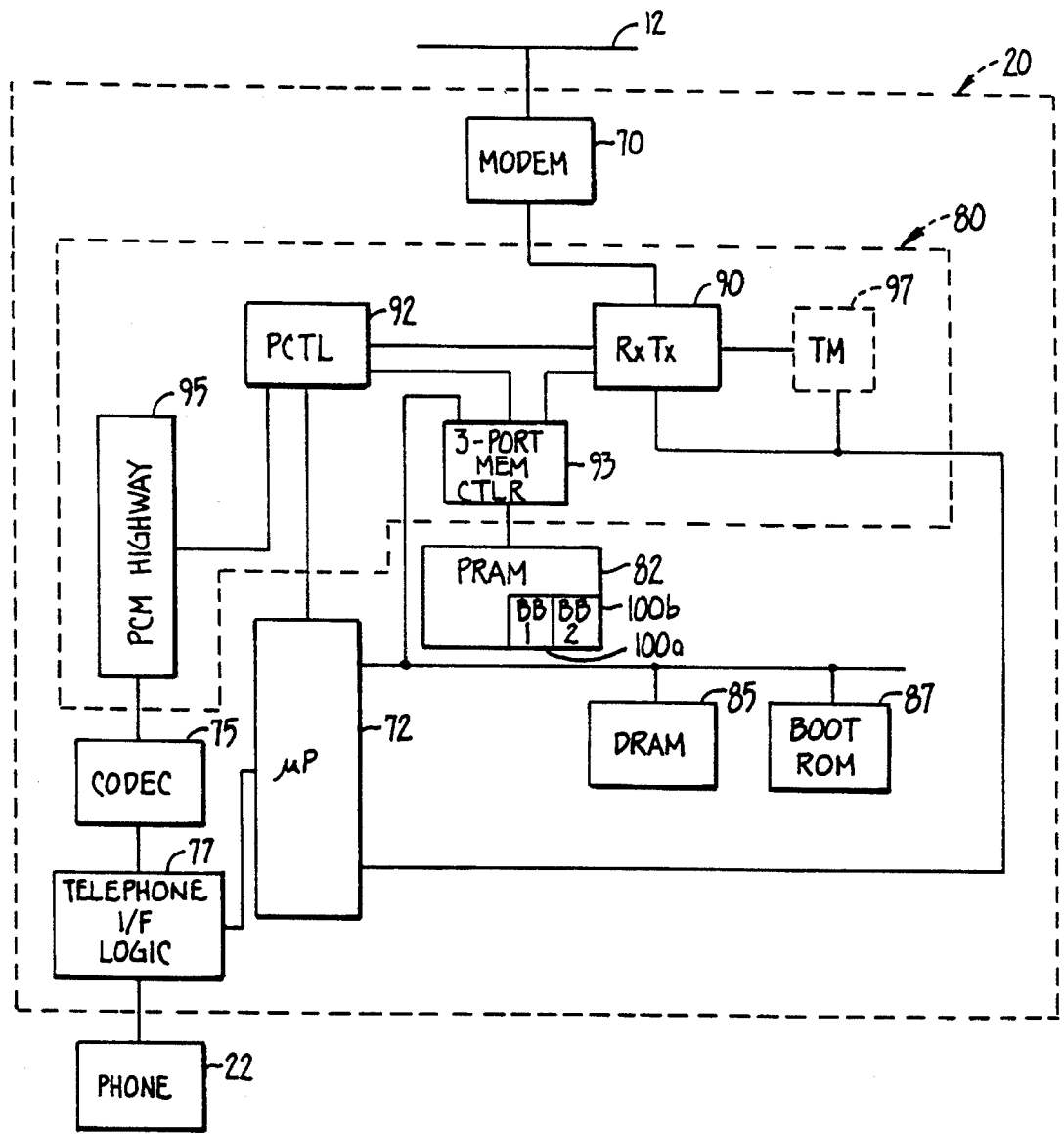
FIG._A-4.

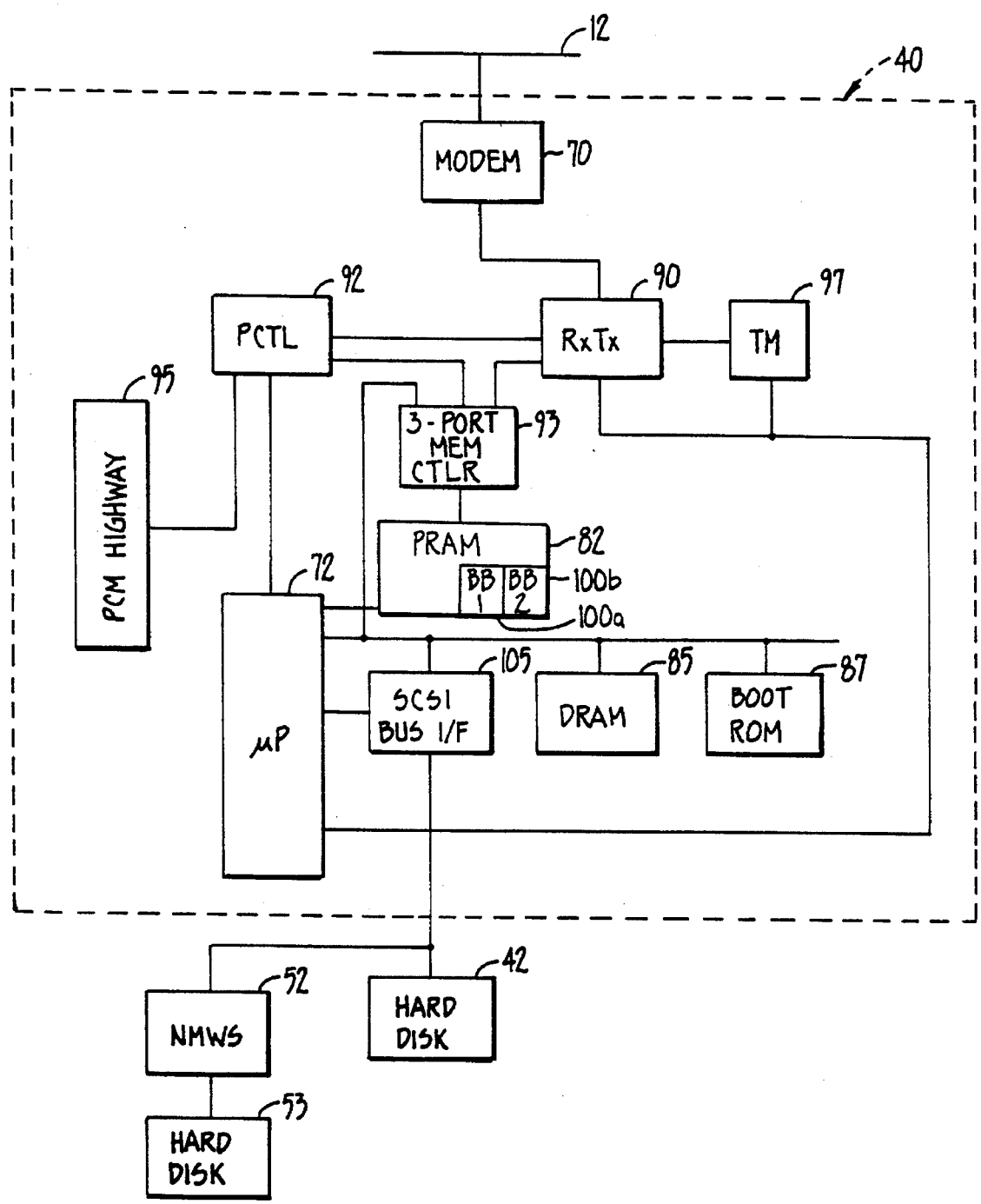
FIG._A-5.

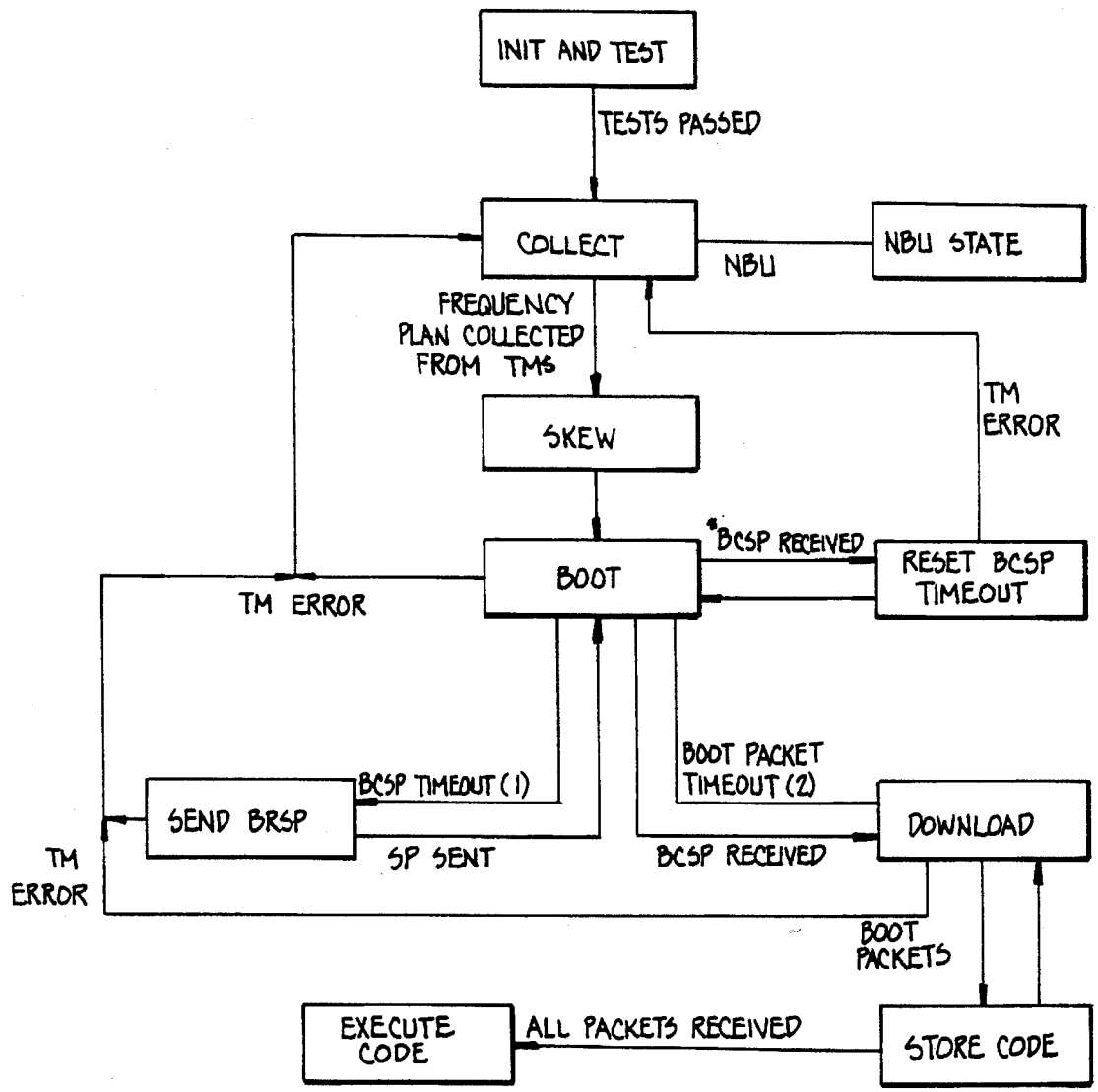
FIG._A-6.

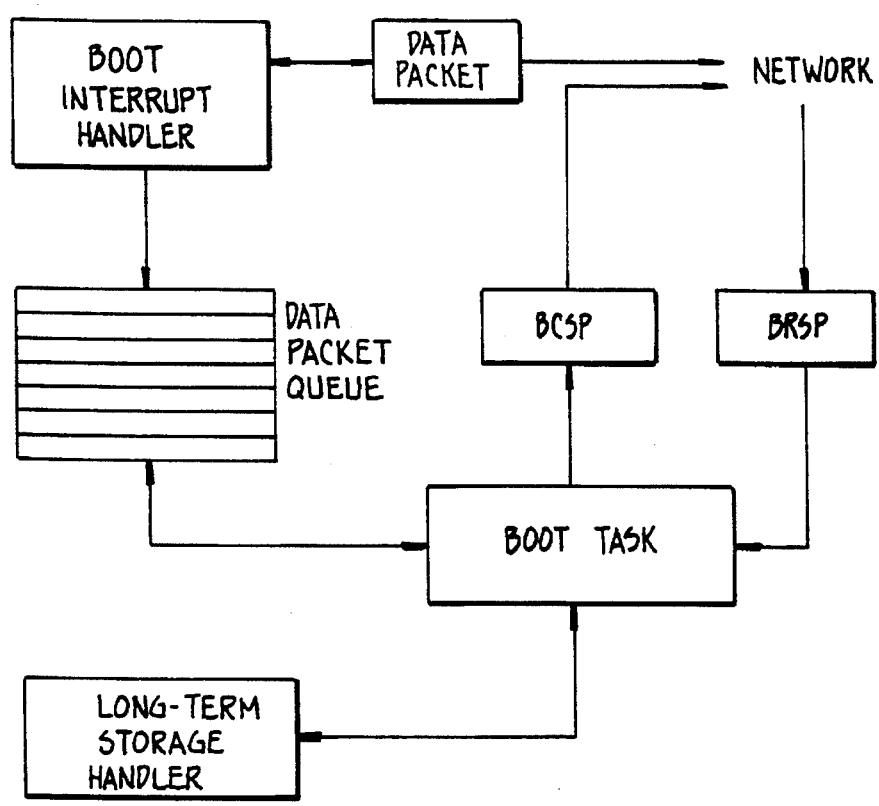
FIG._A-7A.
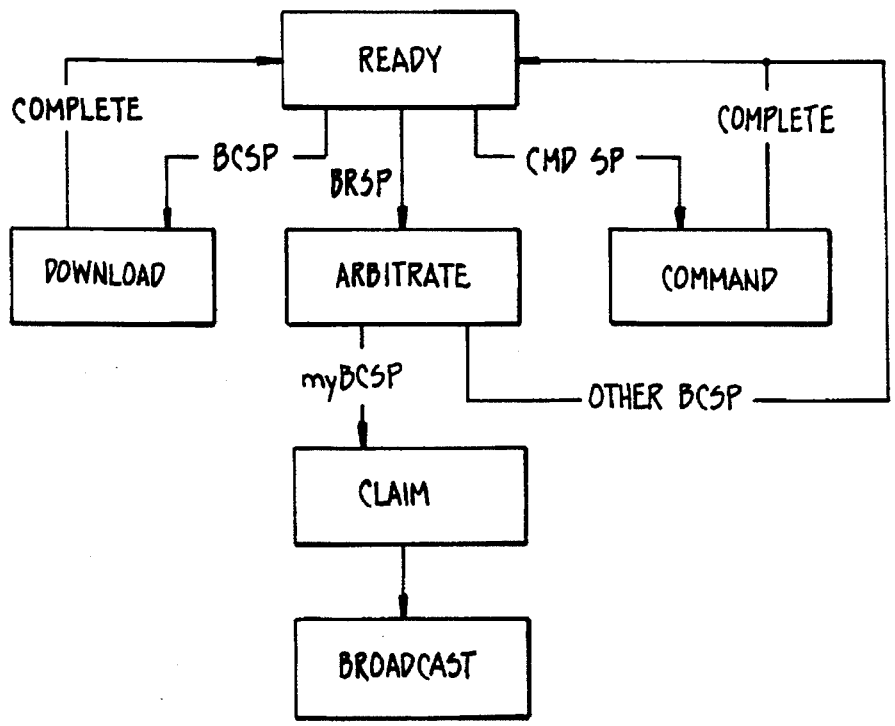
FIG._A-7B.

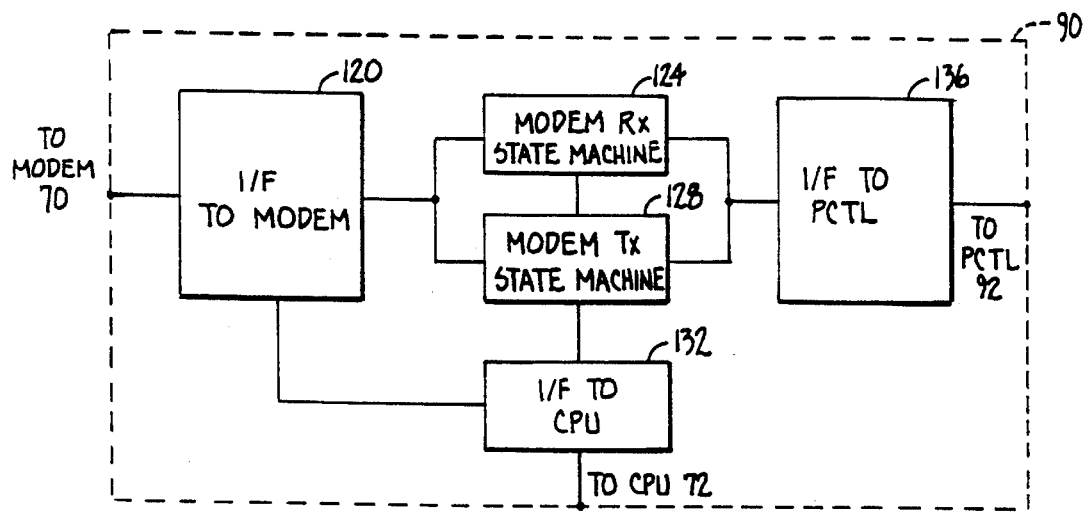
FIG._B-1.
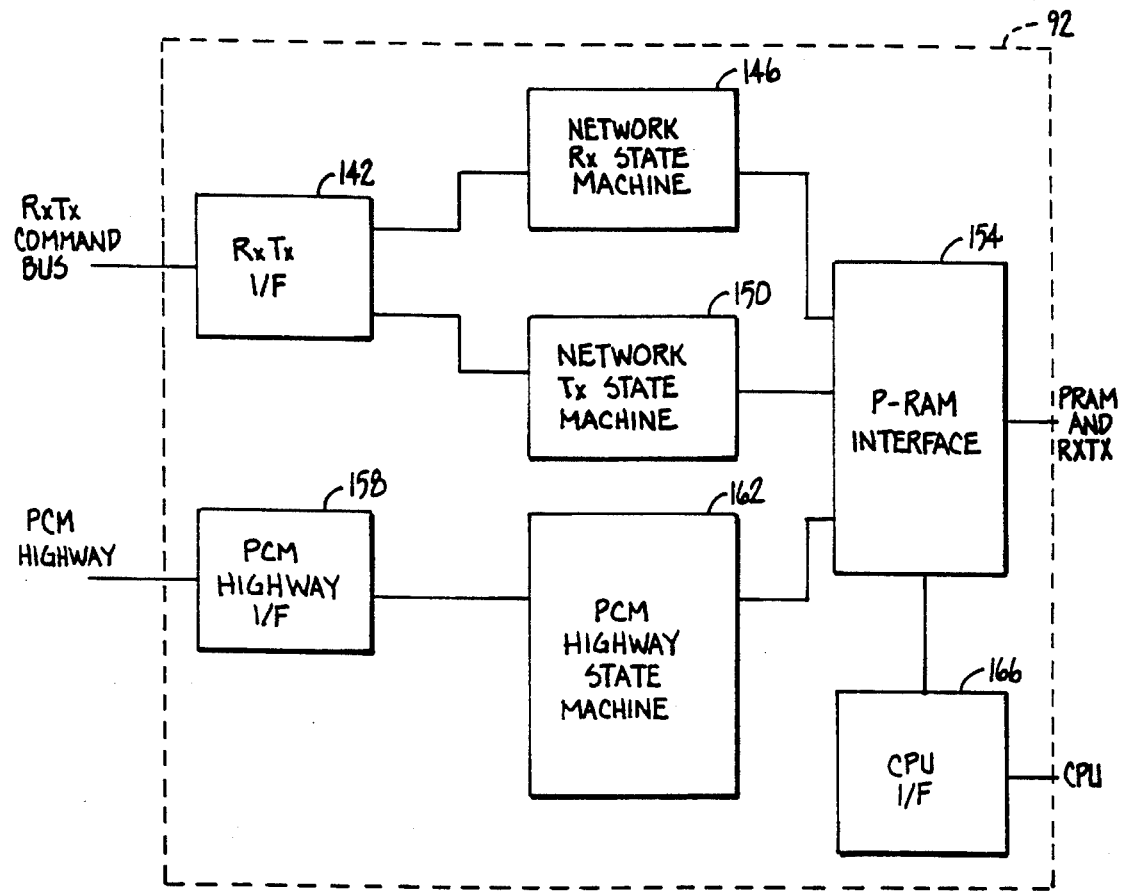
FIG._B-2.

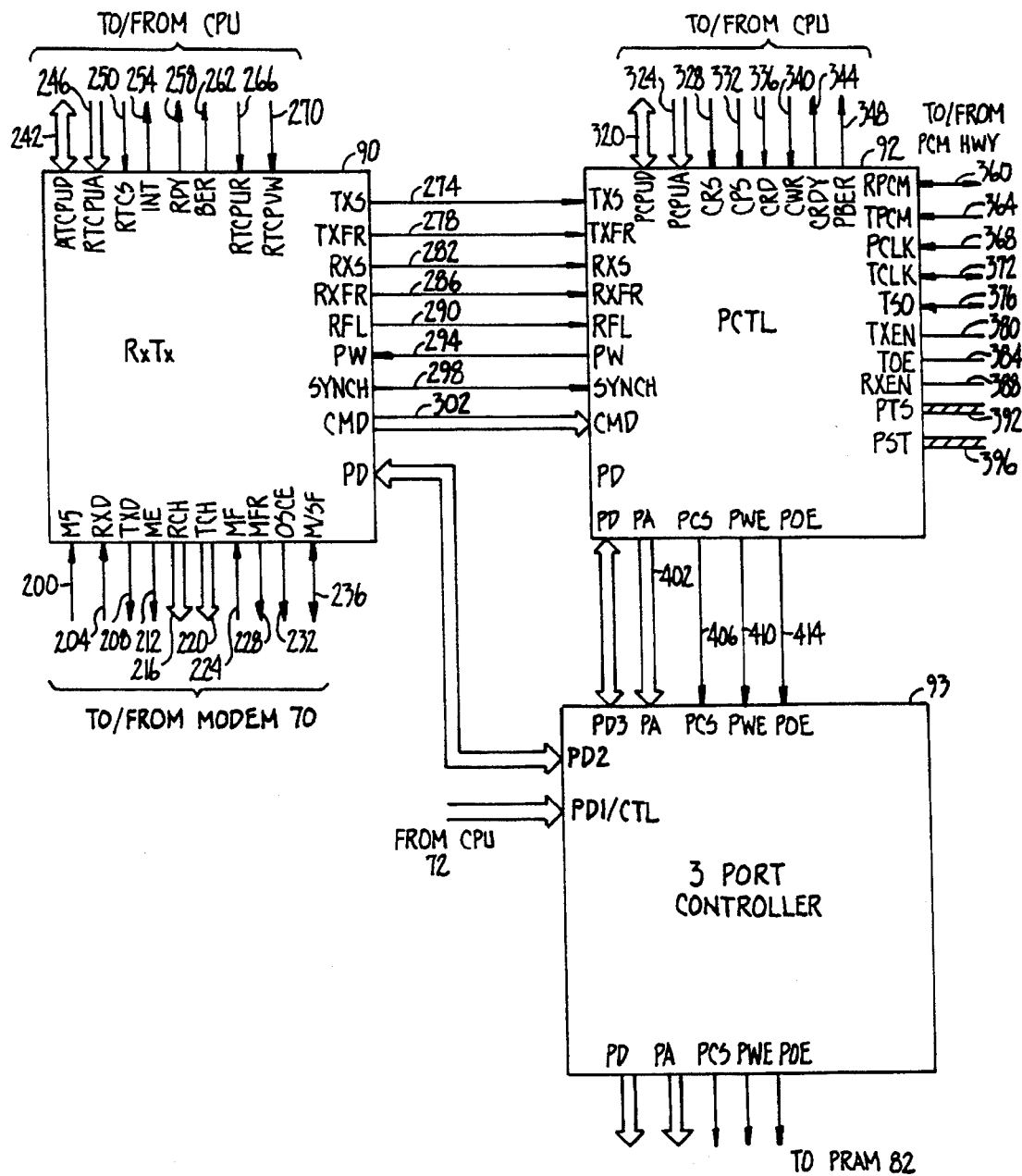
FIG._B4.
FIG._B3.

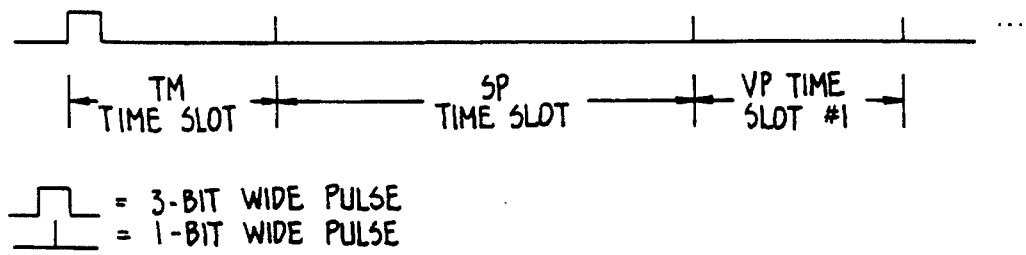
FIG._B-5.
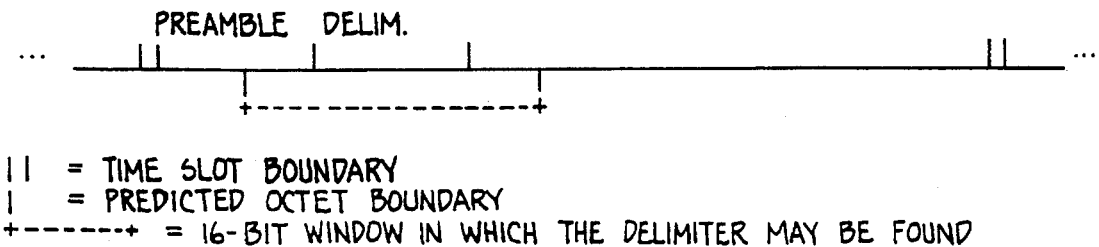
|| = TIME SLOT BOUNDARY
| = PREDICTED OCTET BOUNDARY
+-----+ = 16-BIT WINDOW IN WHICH THE DELIMITER MAY BE FOUND
FIG._B-6.
("MSP-SKEW" IS THE DIFFERENCE BETWEEN THE MSP AND THE SKEW)
FIG._B-7.
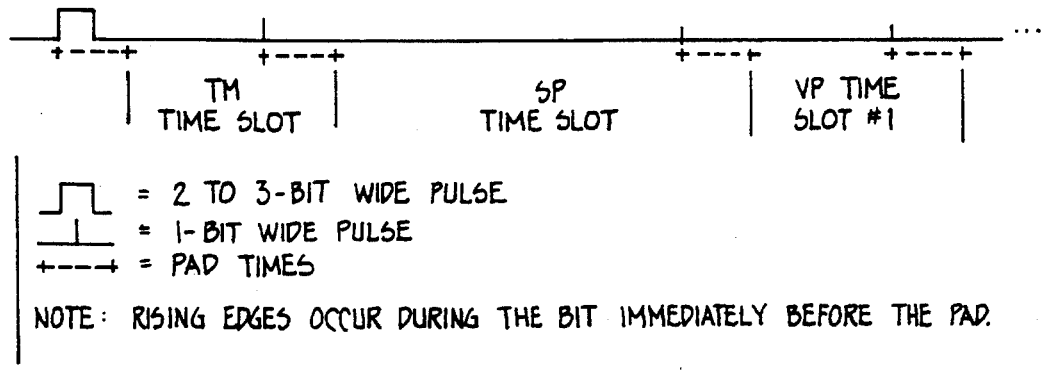
NOTE: RISING EDGES OCCUR DURING THE BIT IMMEDIATELY BEFORE THE PAD.
FIG._B-8.

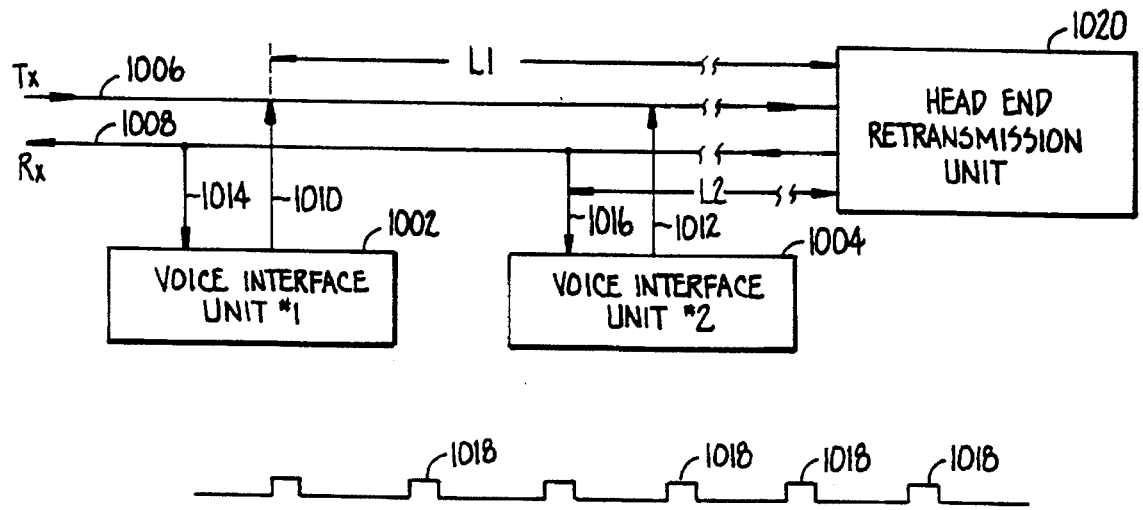
FIG._C-1.
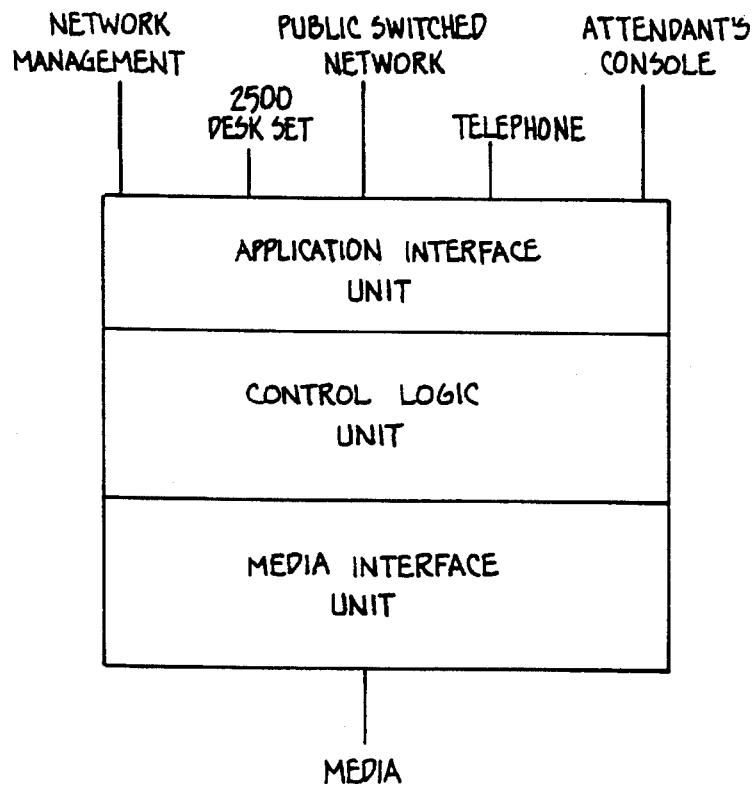
FIG._C-2.

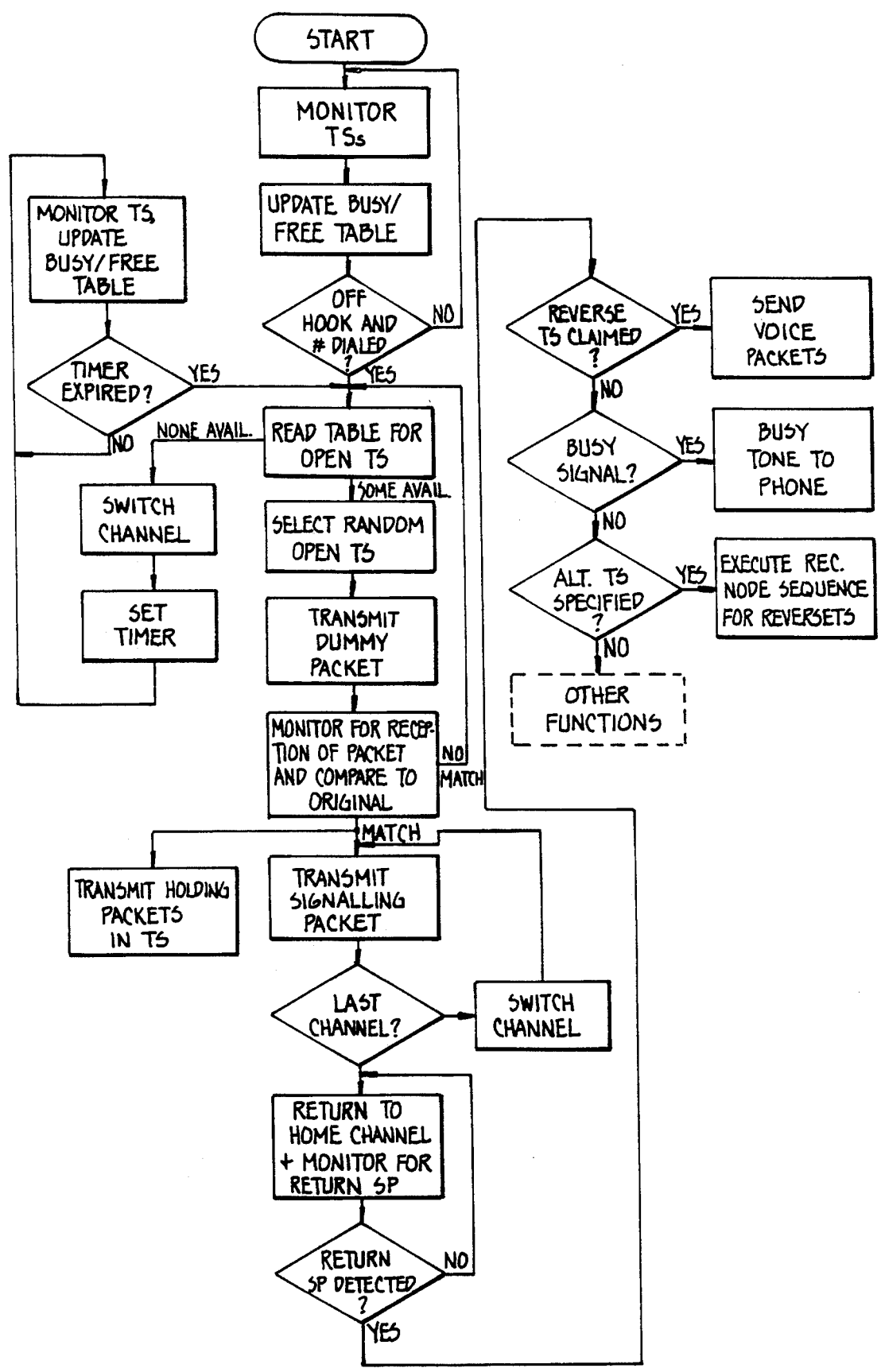
FIG._D-1.

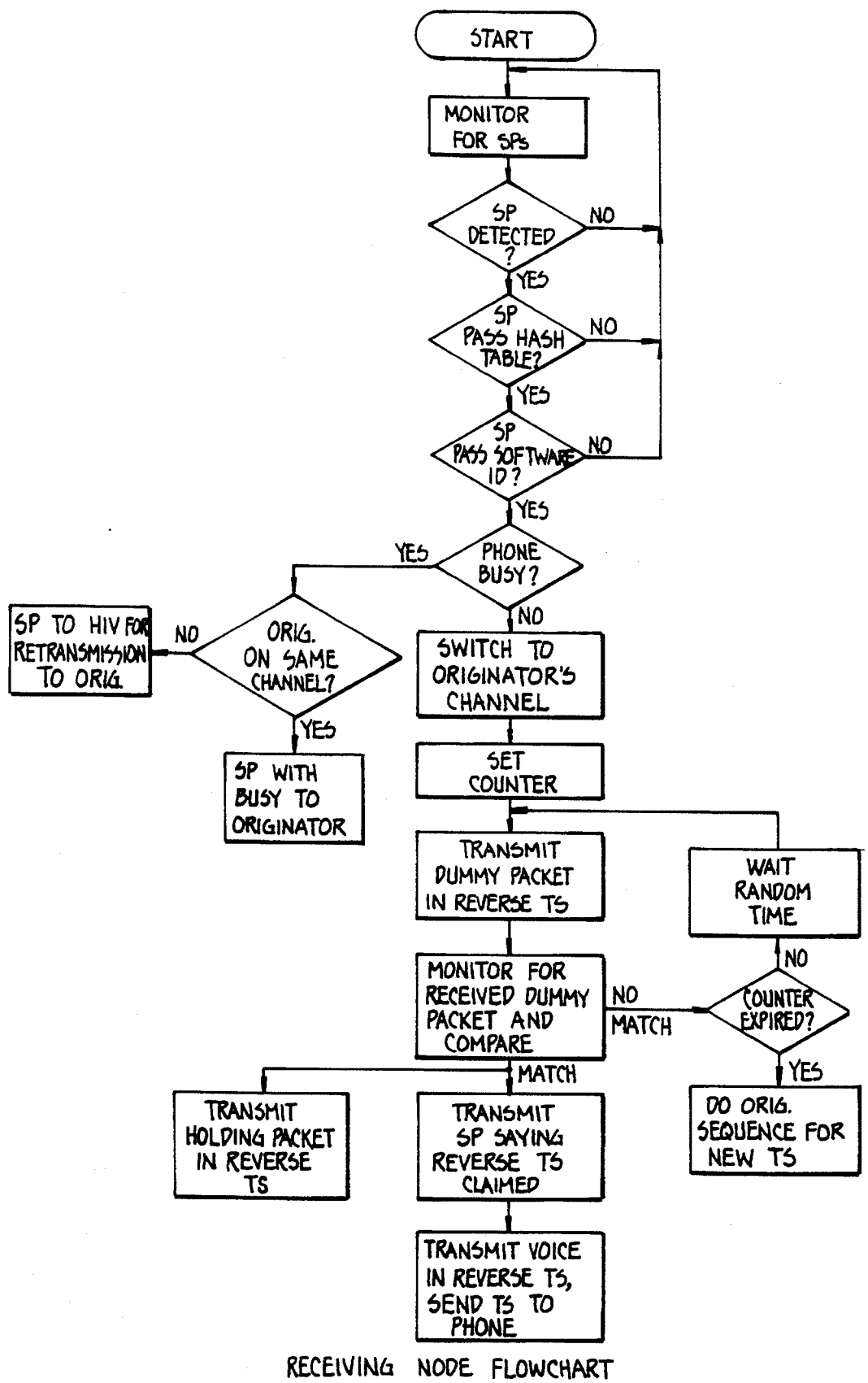
FIG._D-2.

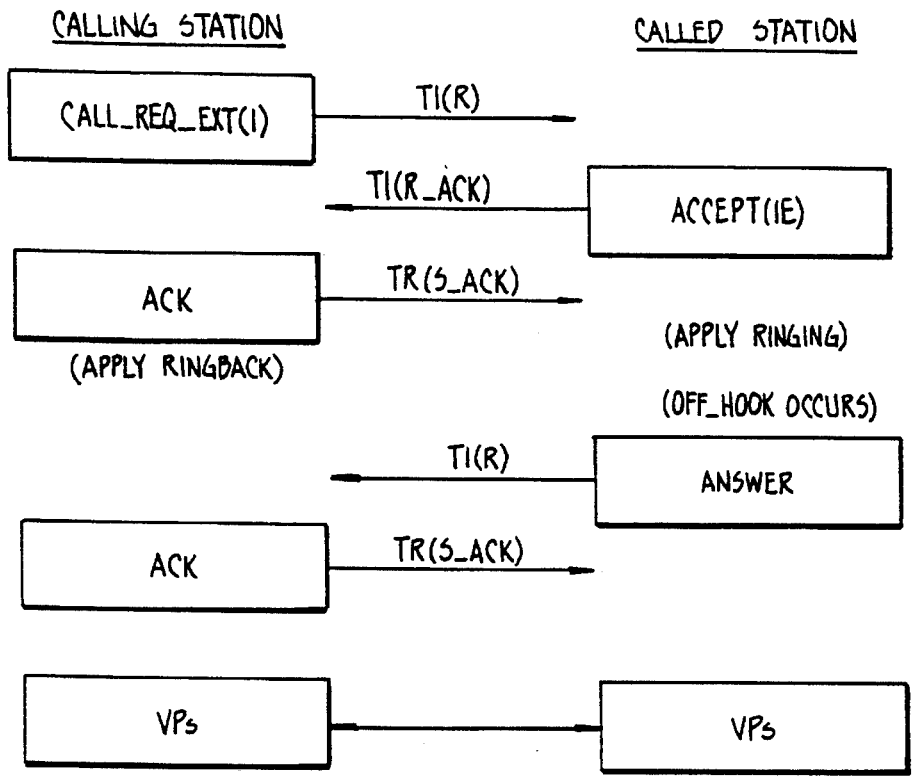
CALLED EXTENSION IS AN IE AND CAN ACCEPT INCOMING CALLS
FIG._E-1.
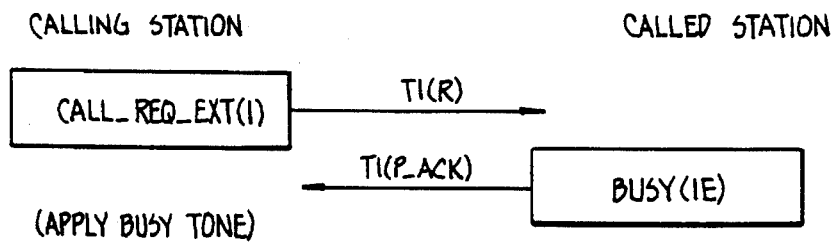
CALLED EXTENSION IS AN IE AND IS BUSY
FIG._E-2.
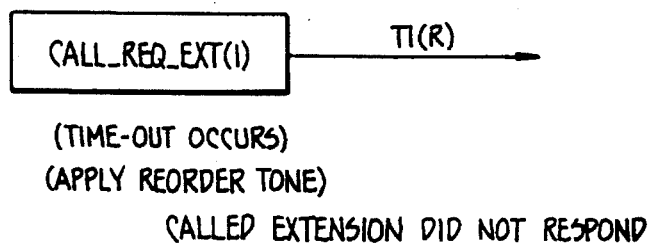
(TIME-OUT OCCURS)
(APPLY REORDER TONE)
CALLED EXTENSION DID NOT RESPOND
FIG._E-3.

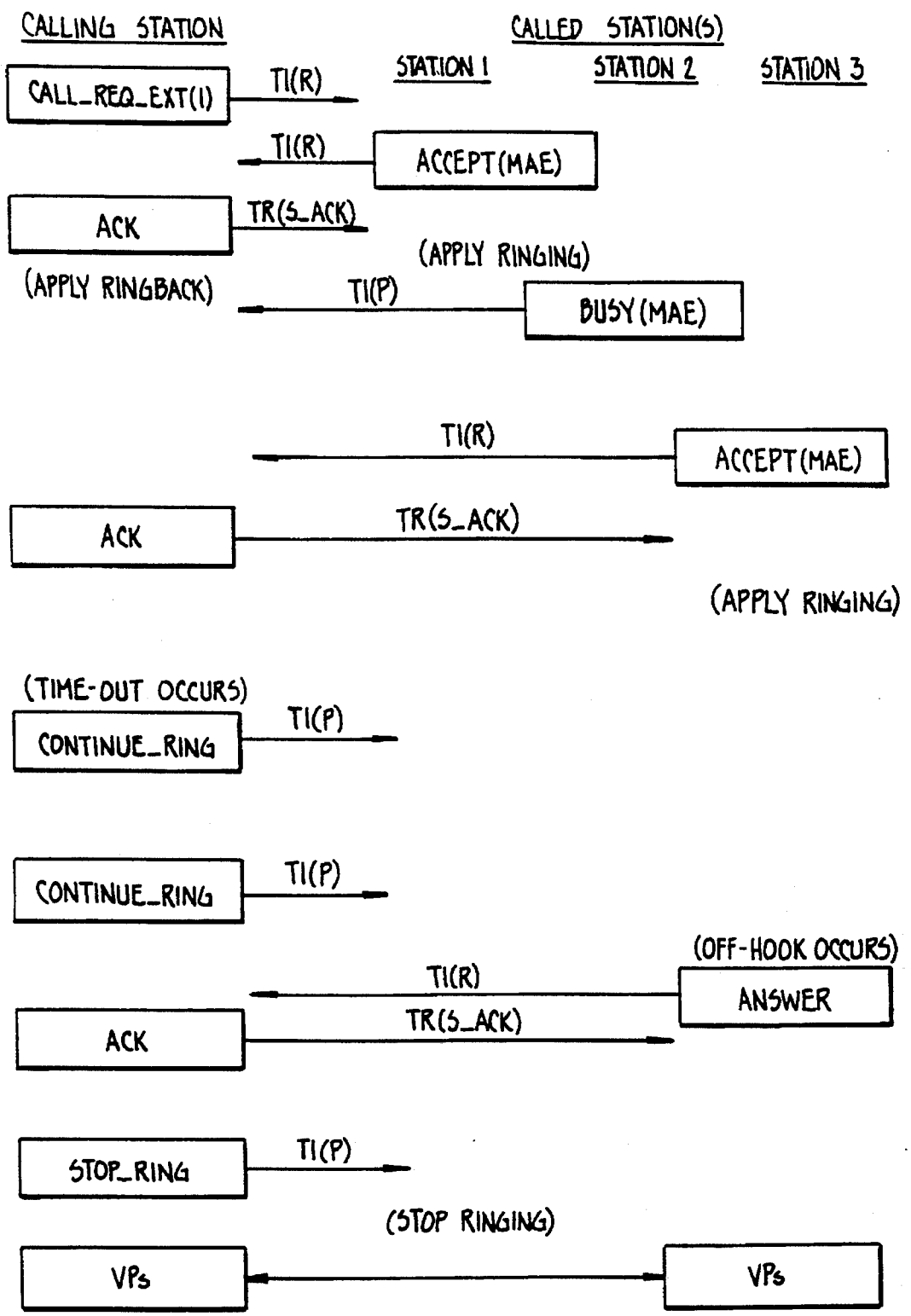
FIG._E-4.

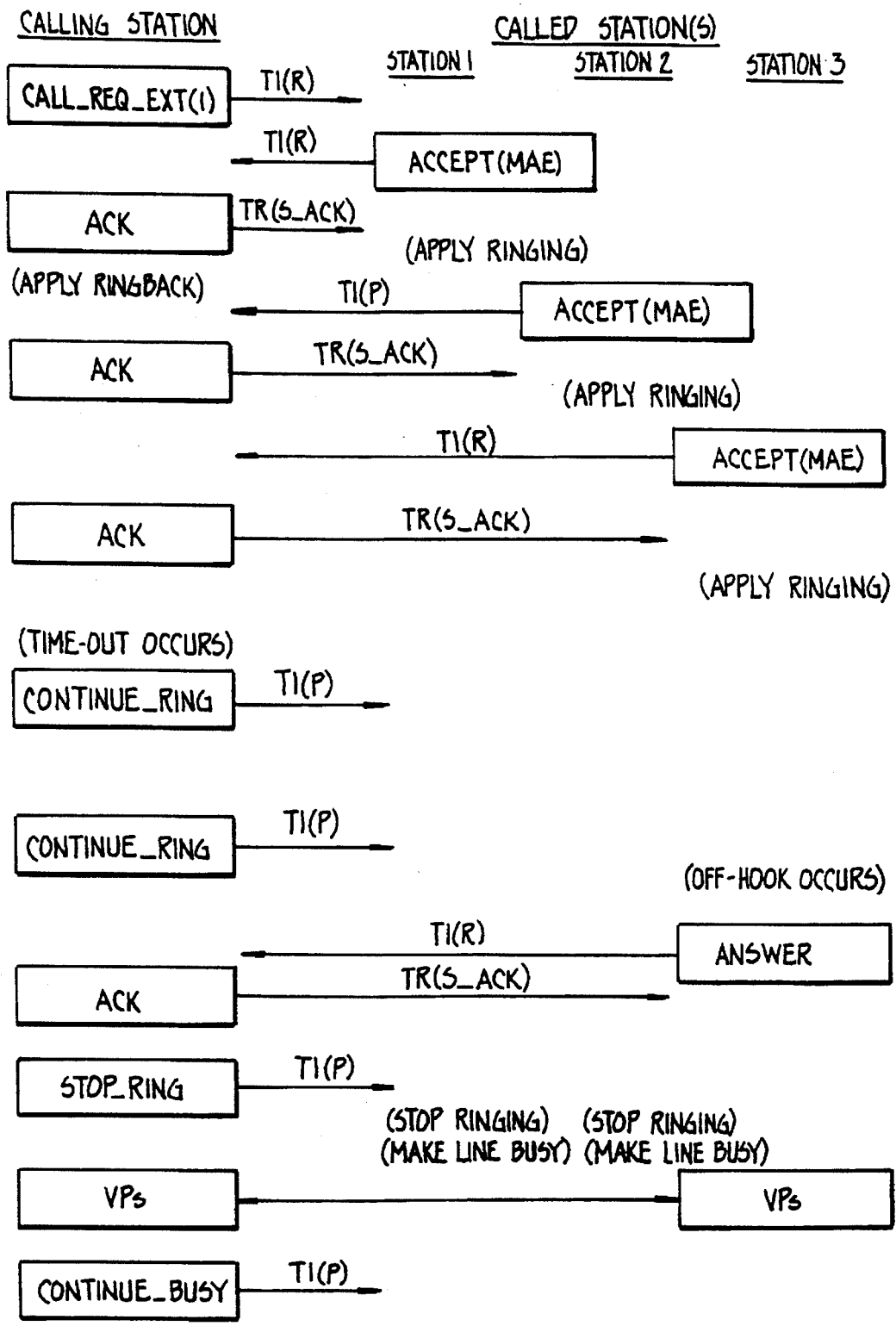
FIG._E-5.

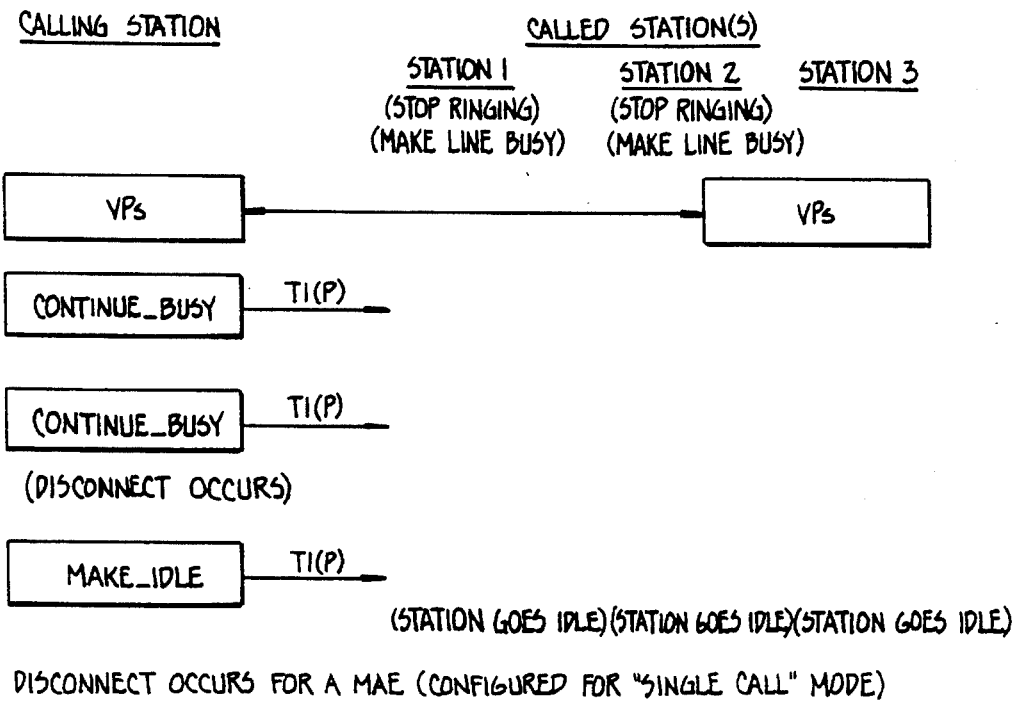
FIG._E-6.
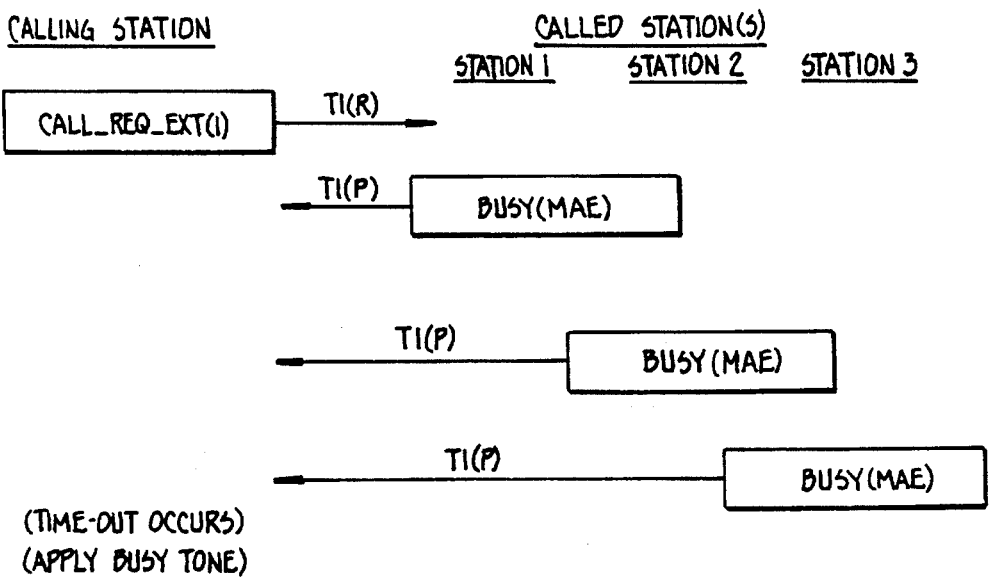
FIG._E-7.

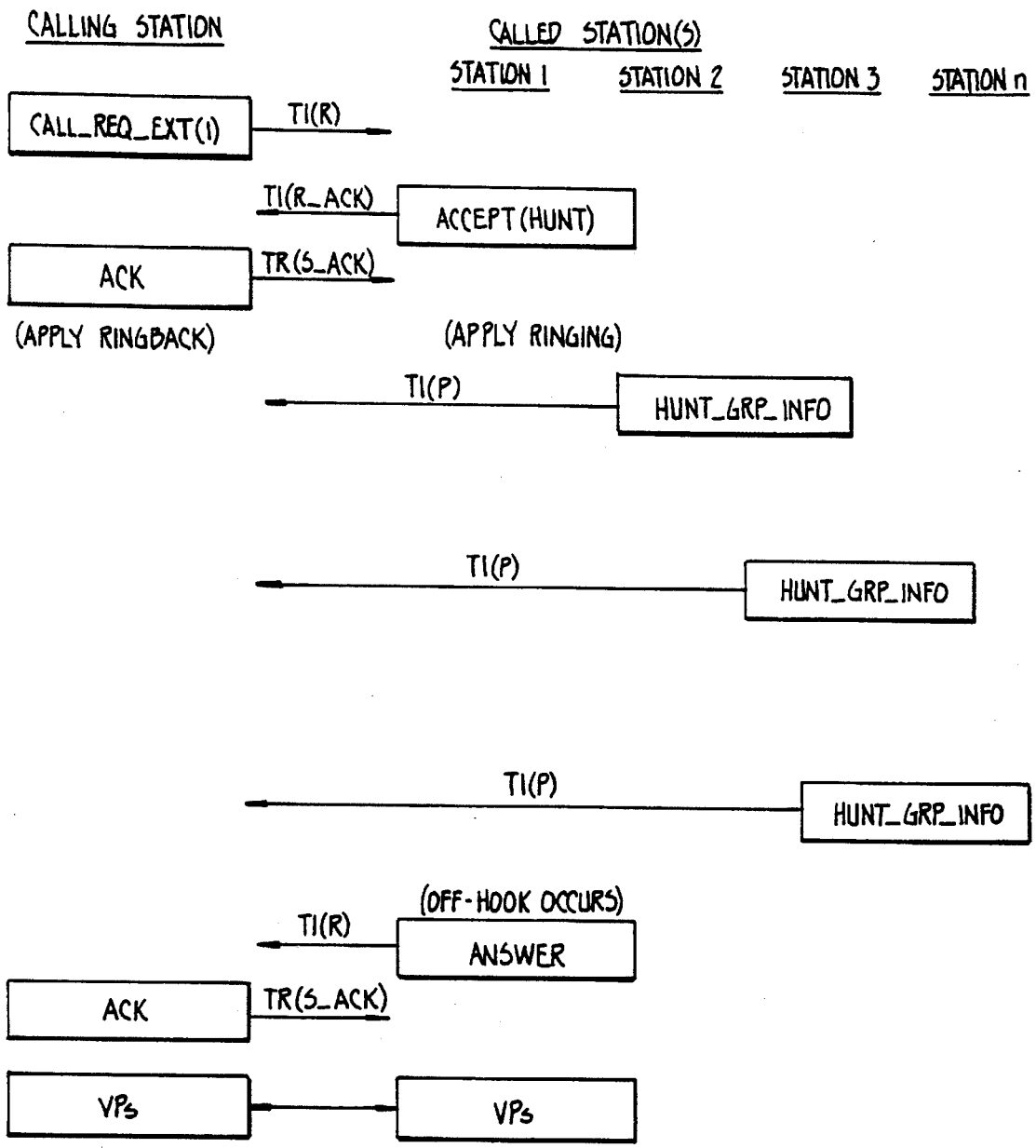
FIG._E-8.

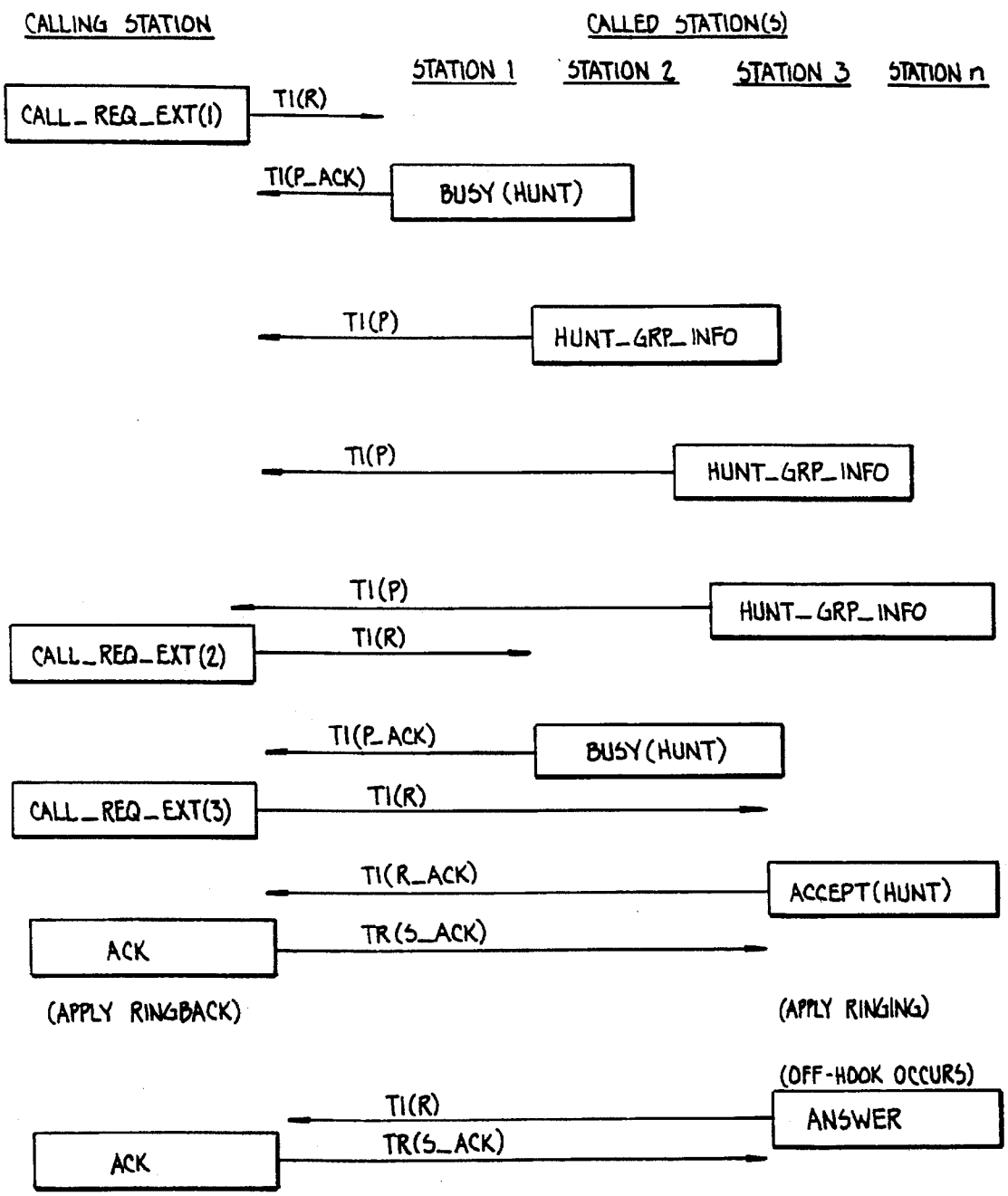
FIRST AND SECOND MEMBERS OF A HUNT EXTENSION ARE BUSY
FIG._E-9.

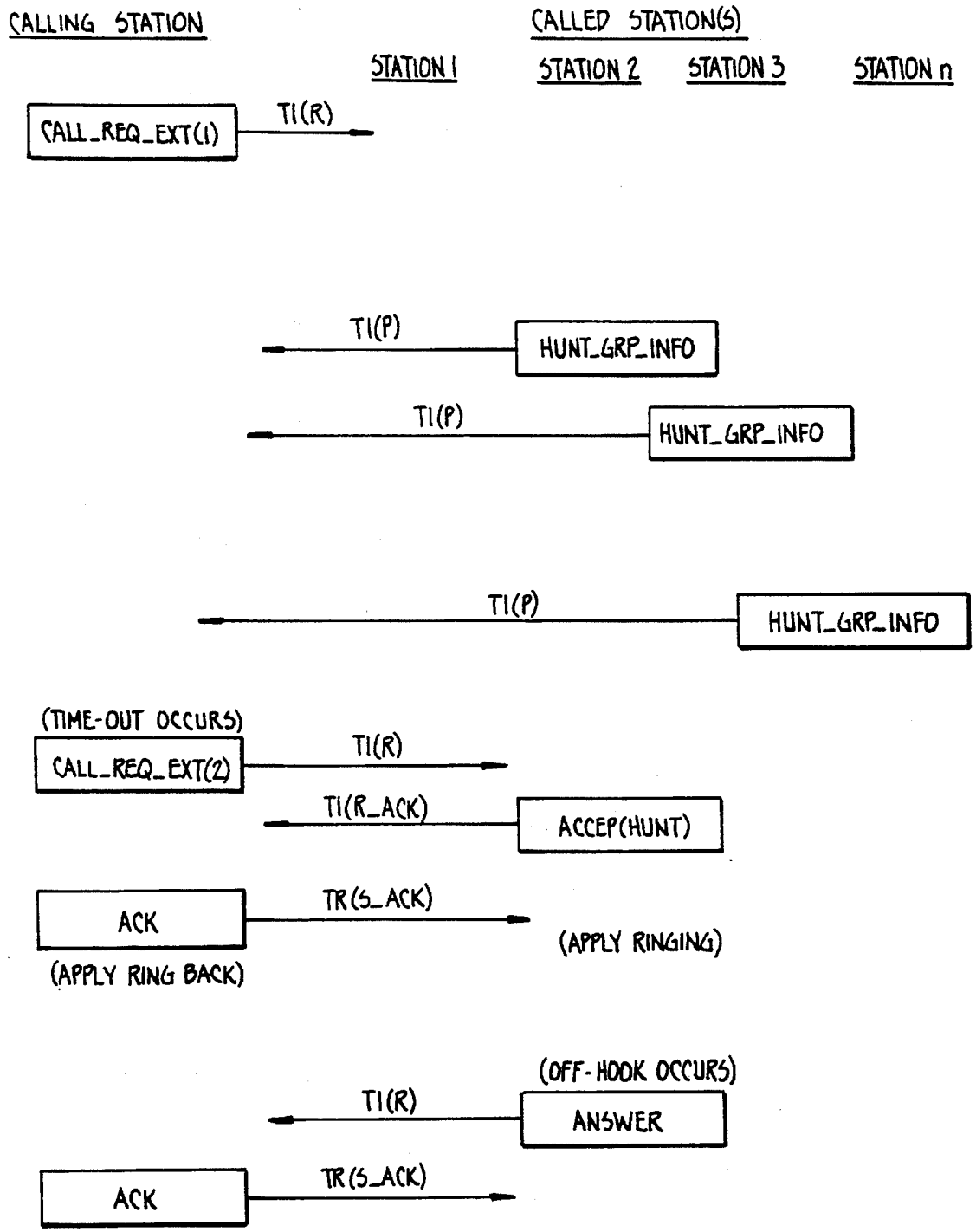
FIRST MEMBER OF HUNT GROUP EXTENSION IS NOT RESPONDING
FIG._E-10.

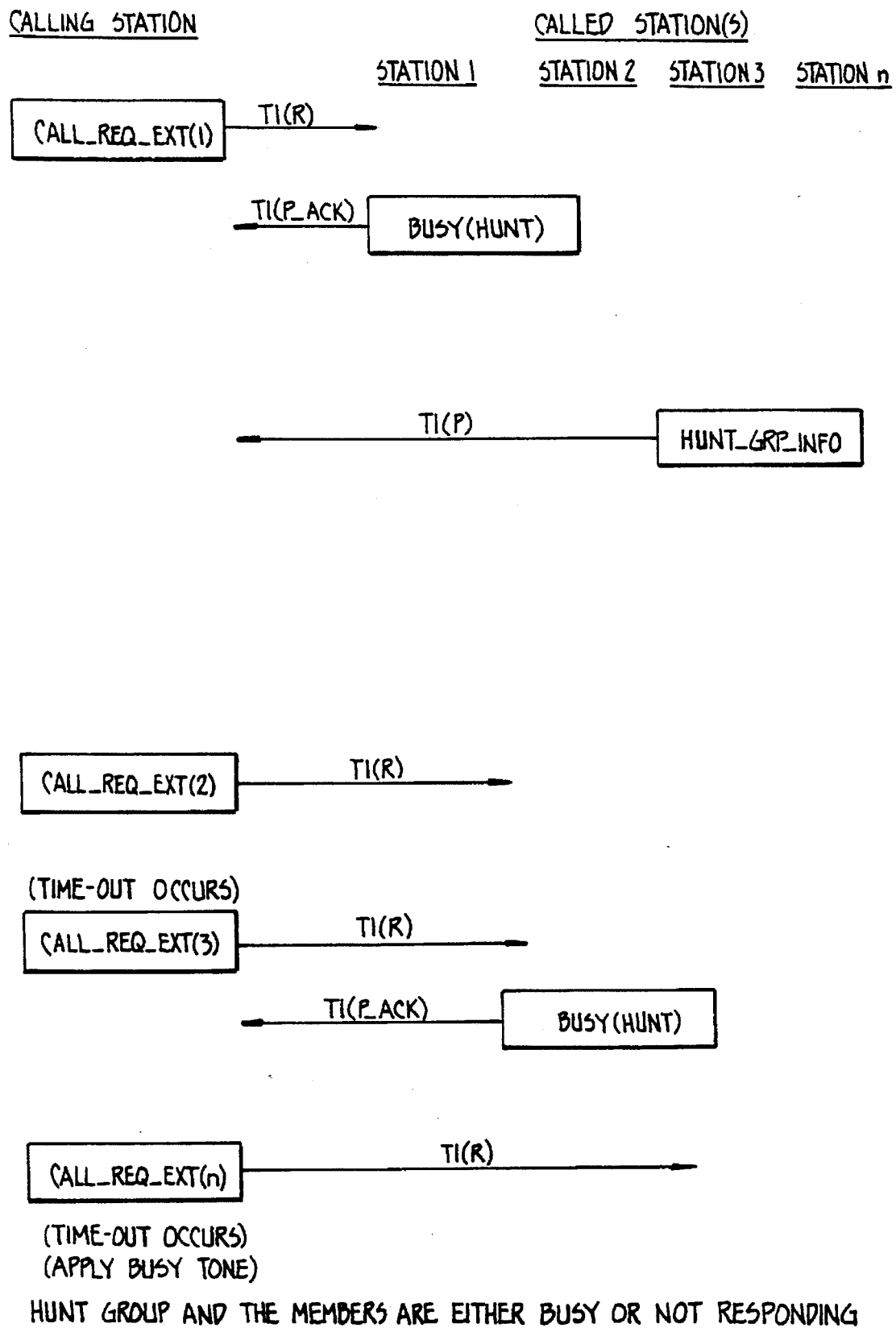
FIG.—E-11.

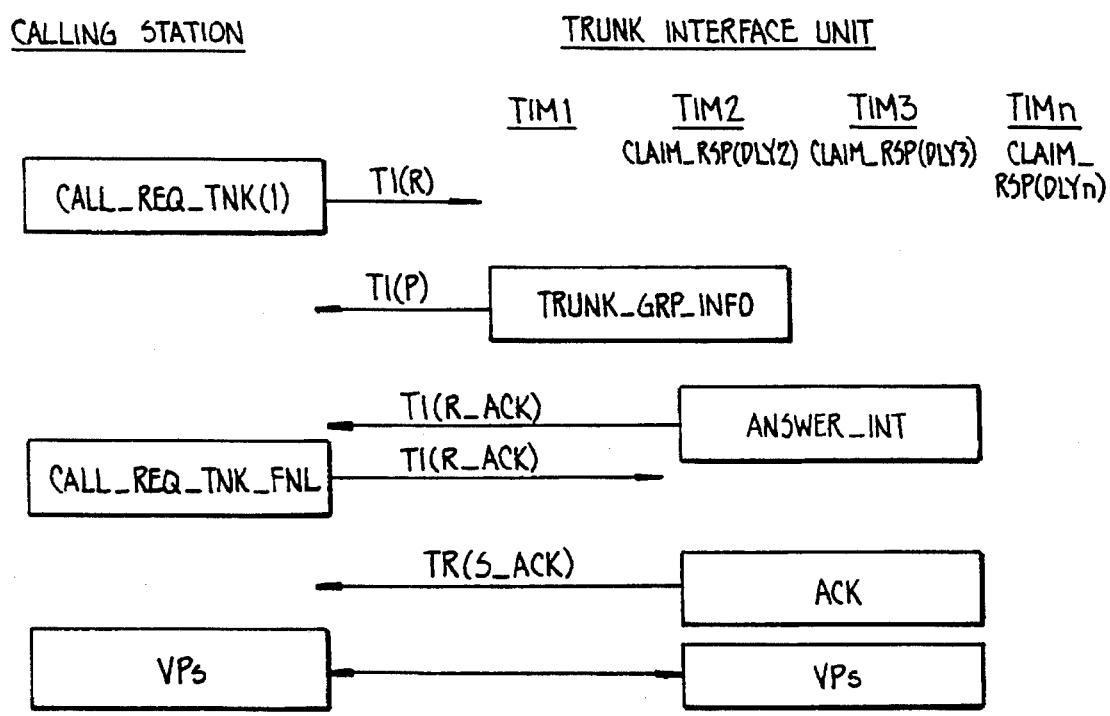
FIG._E-12.

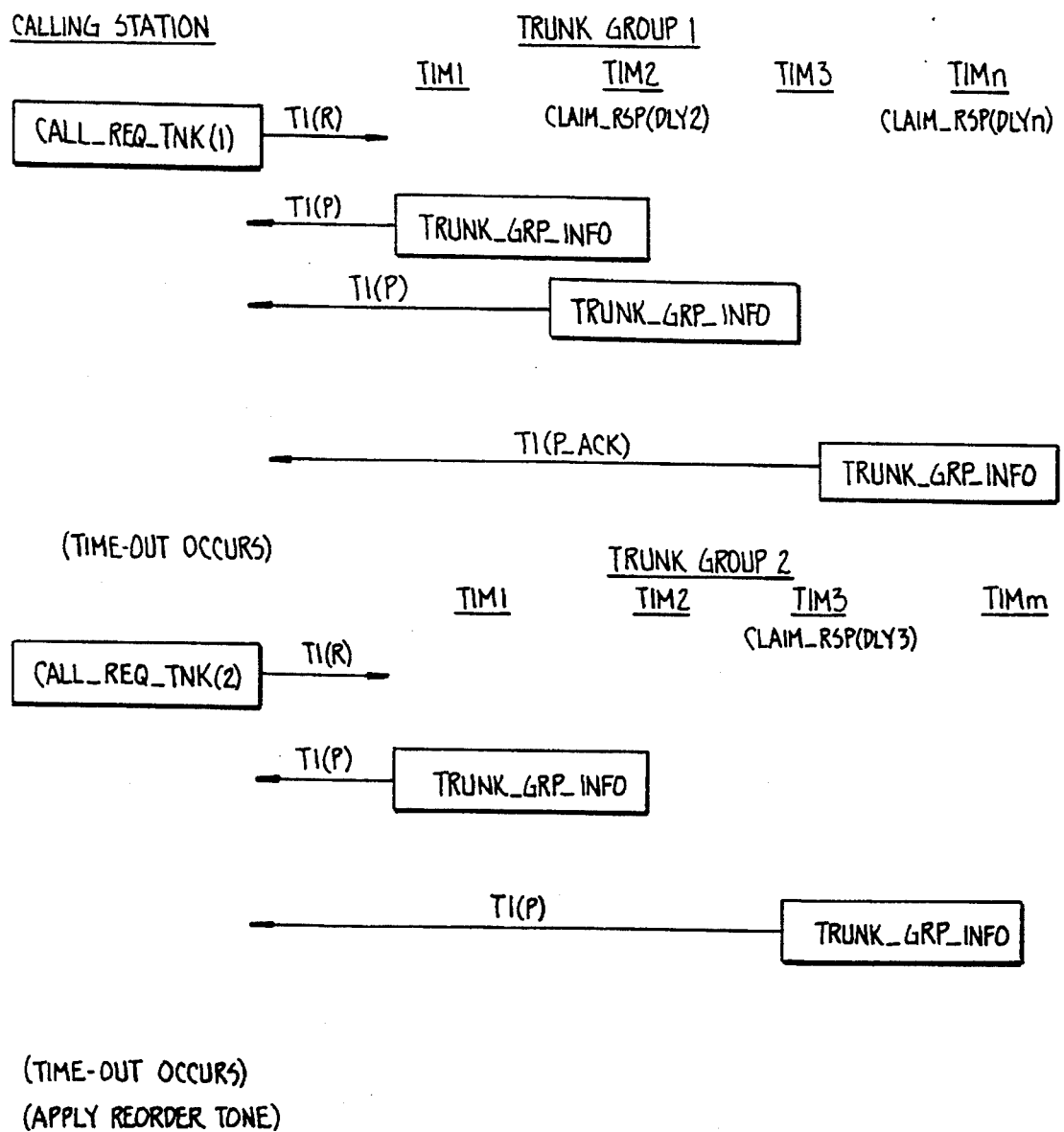
FIG._E-13.
NO TRUNK IS AVAILABLE OR NOT RESPONDING IN ALL THE AVAILABLE GROUPS

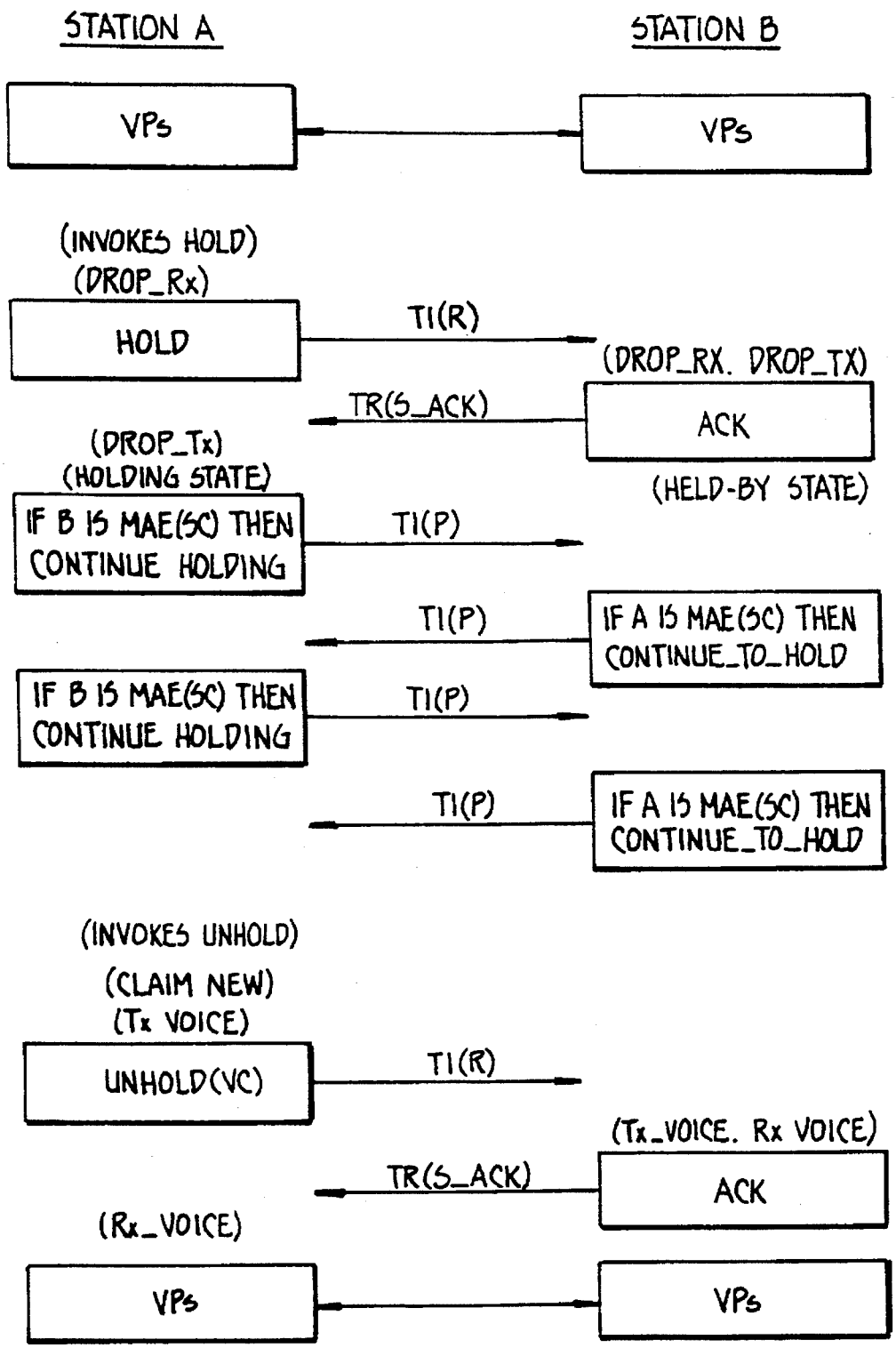
ONE WAY HOLD
FIG._E-14.

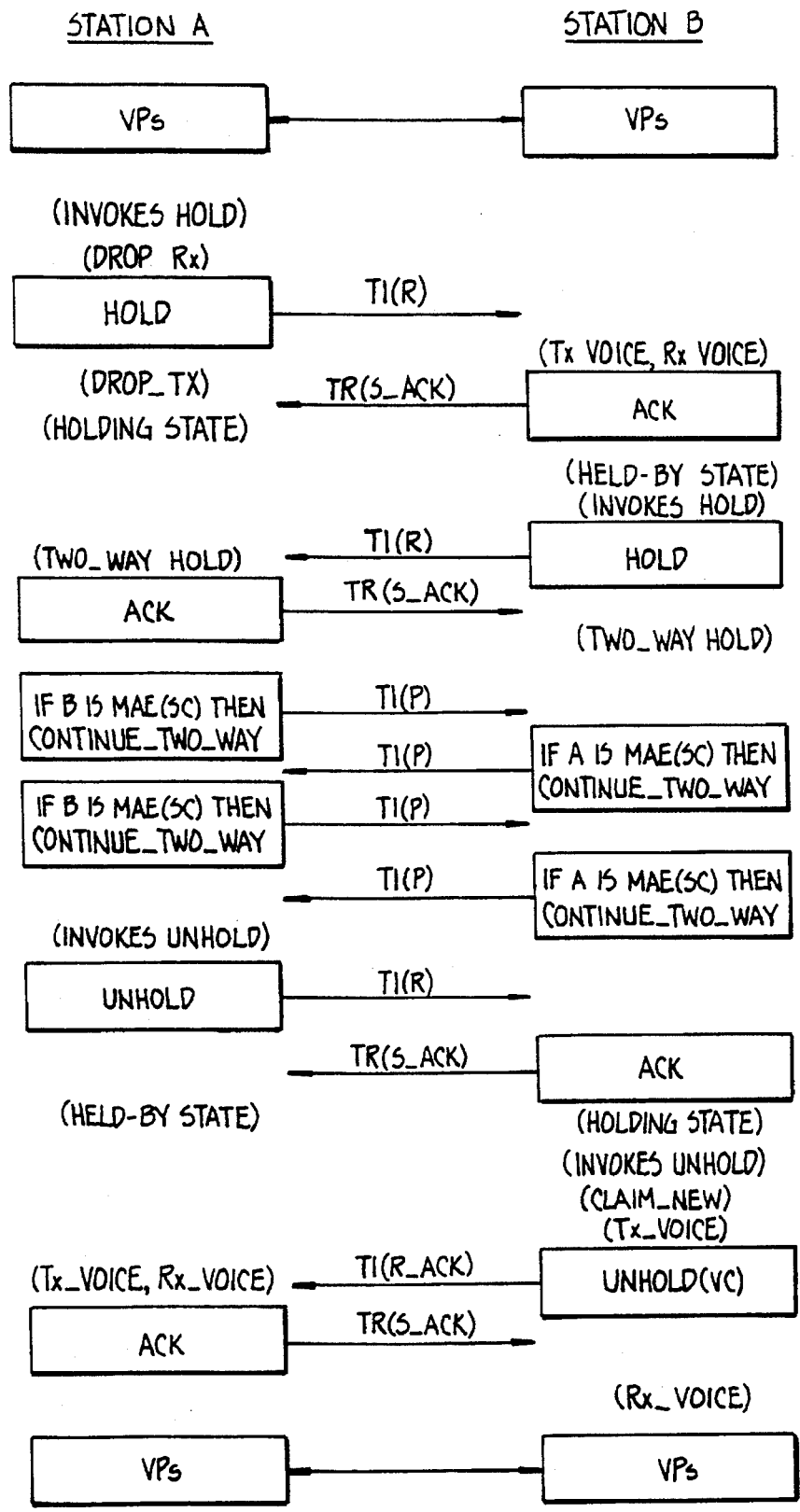
TWO-WAY-HOLD AND UNHOLD
FIG._E-15.

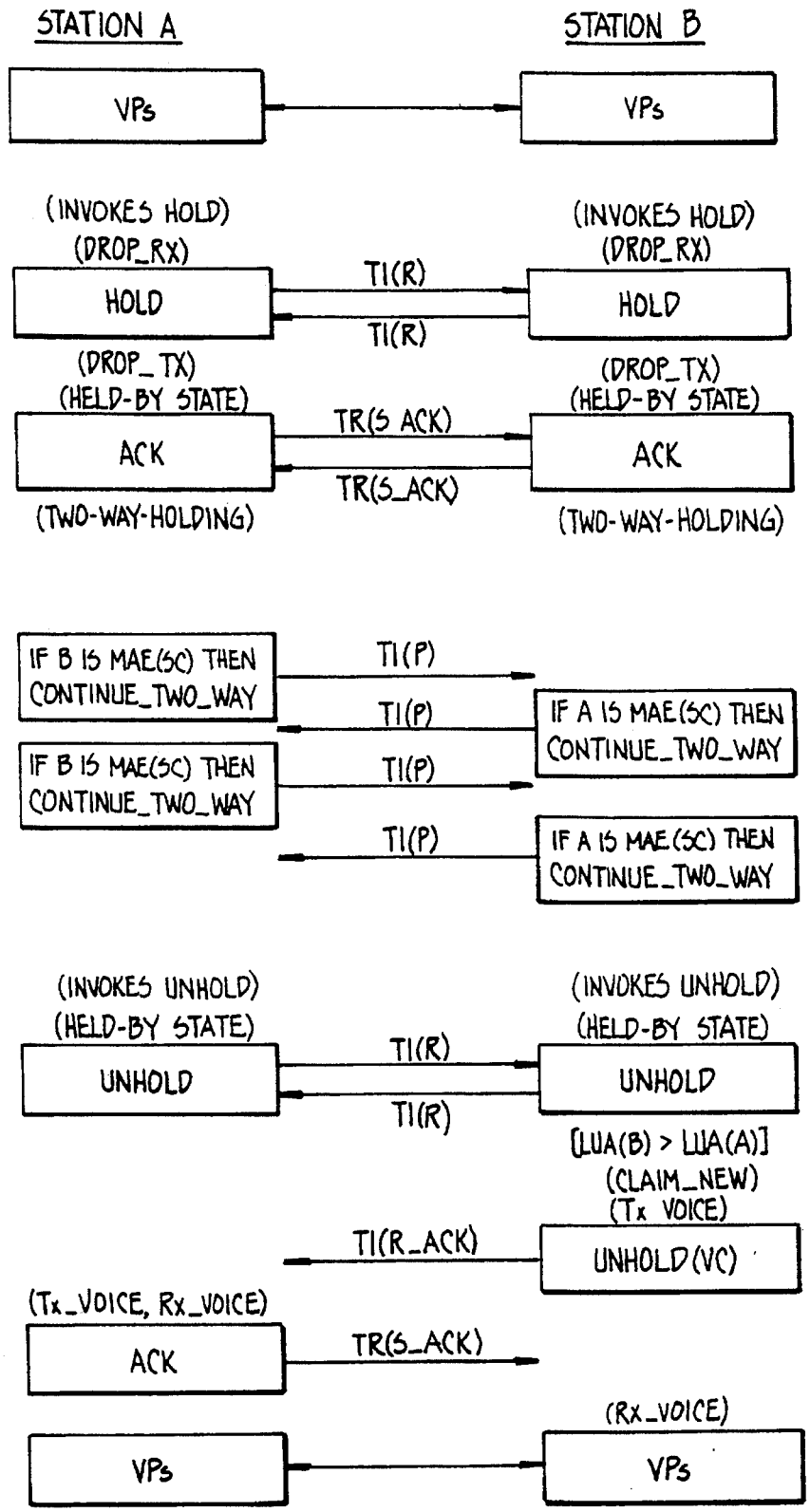
TWO-WAY-HOLD AND UNHOLD (SIMULTANEOUS)
FIG._E-16.

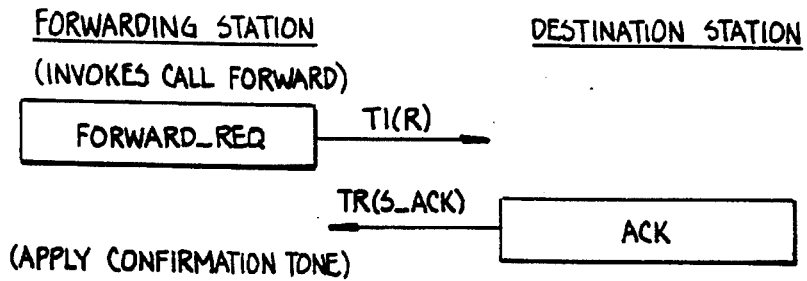
FIG._E-17. DESTINATION ACCEPTS FORWARDING REQUEST
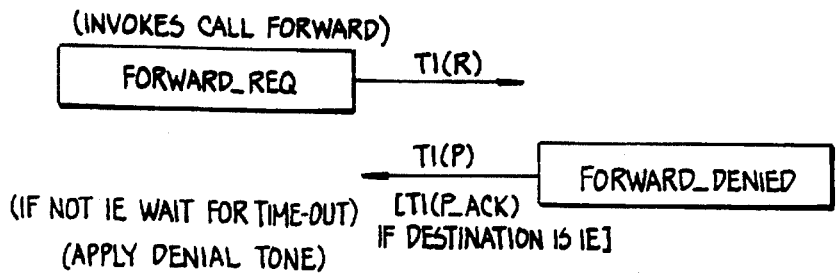
FIG._E-18. DESTINATION DENIES FORWARDING REQUEST
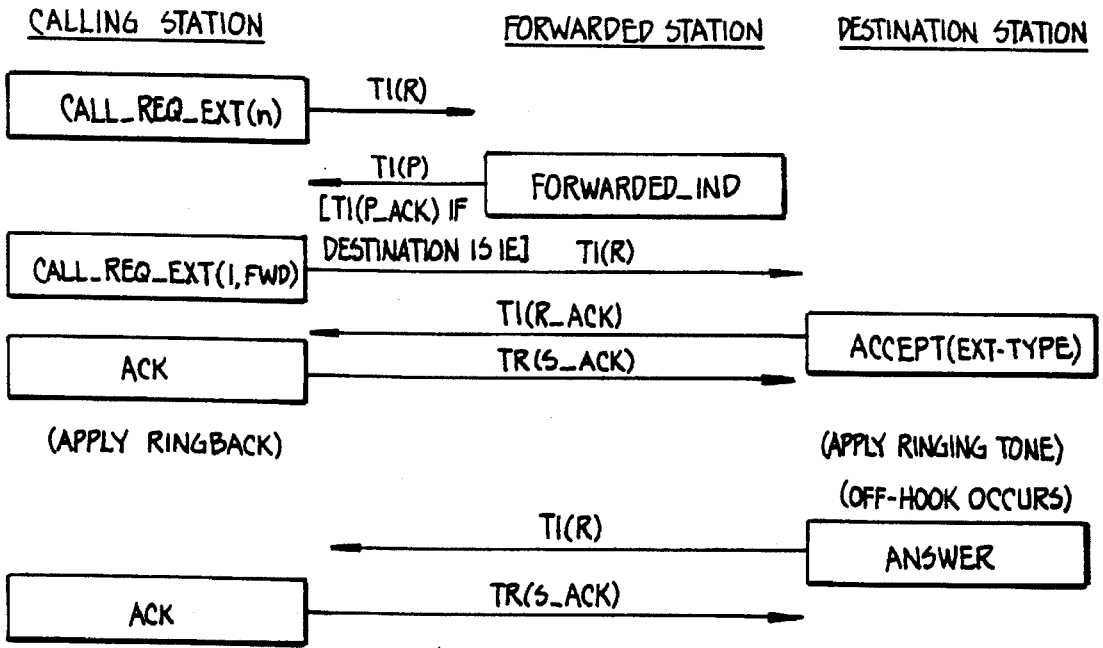
A CALL REQUEST ARRIVES AT A FORWRDED STATION
FIG._E-19.

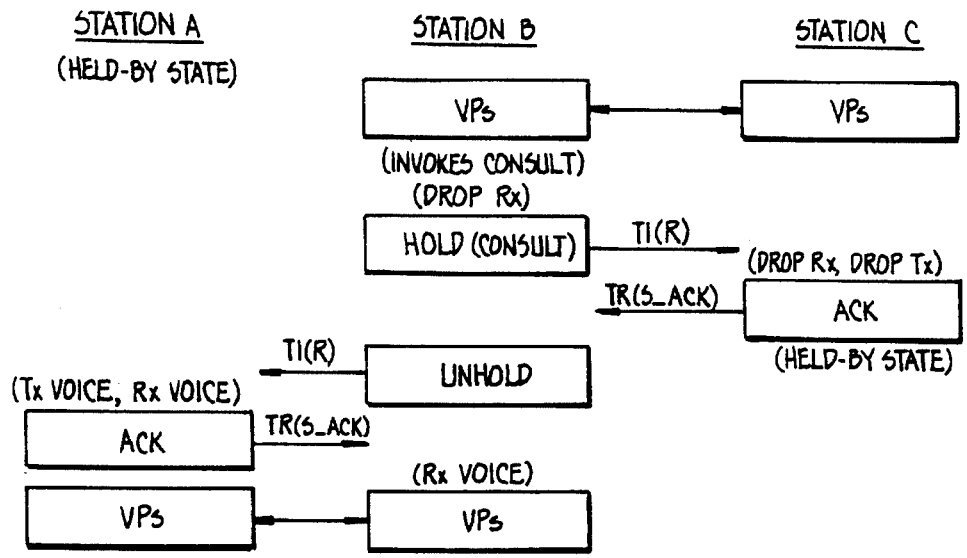
CONSULTATION
FIG._E-20.
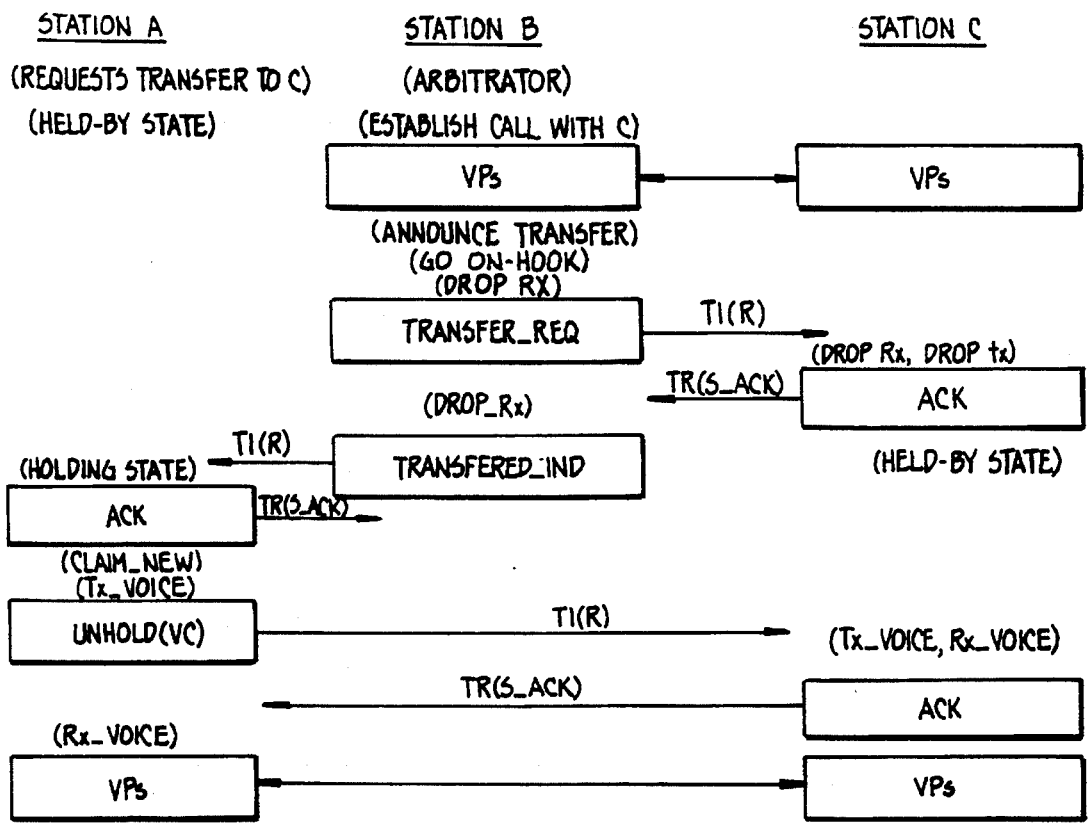
ARBITRATOR ANNOUNCES THE TRANSFER AND THEN GOES ON-HOOK
FIG._E-21.

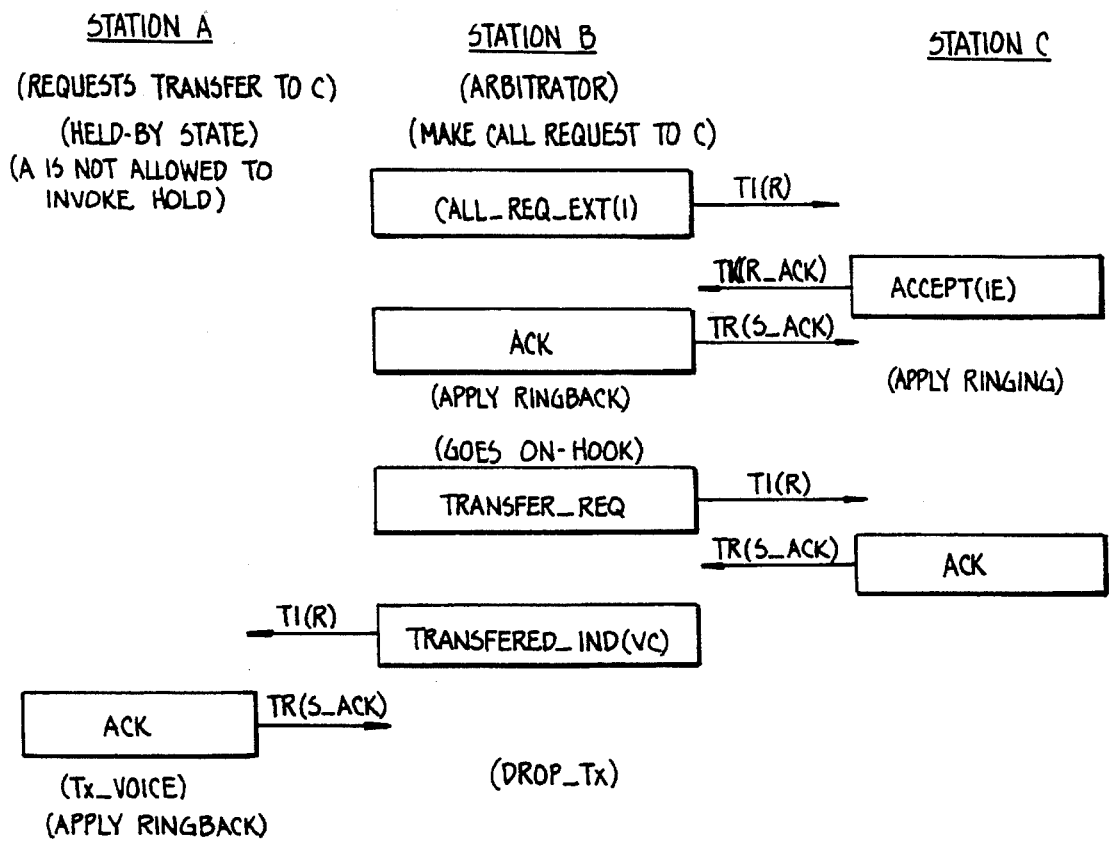
FIG.__E-22.

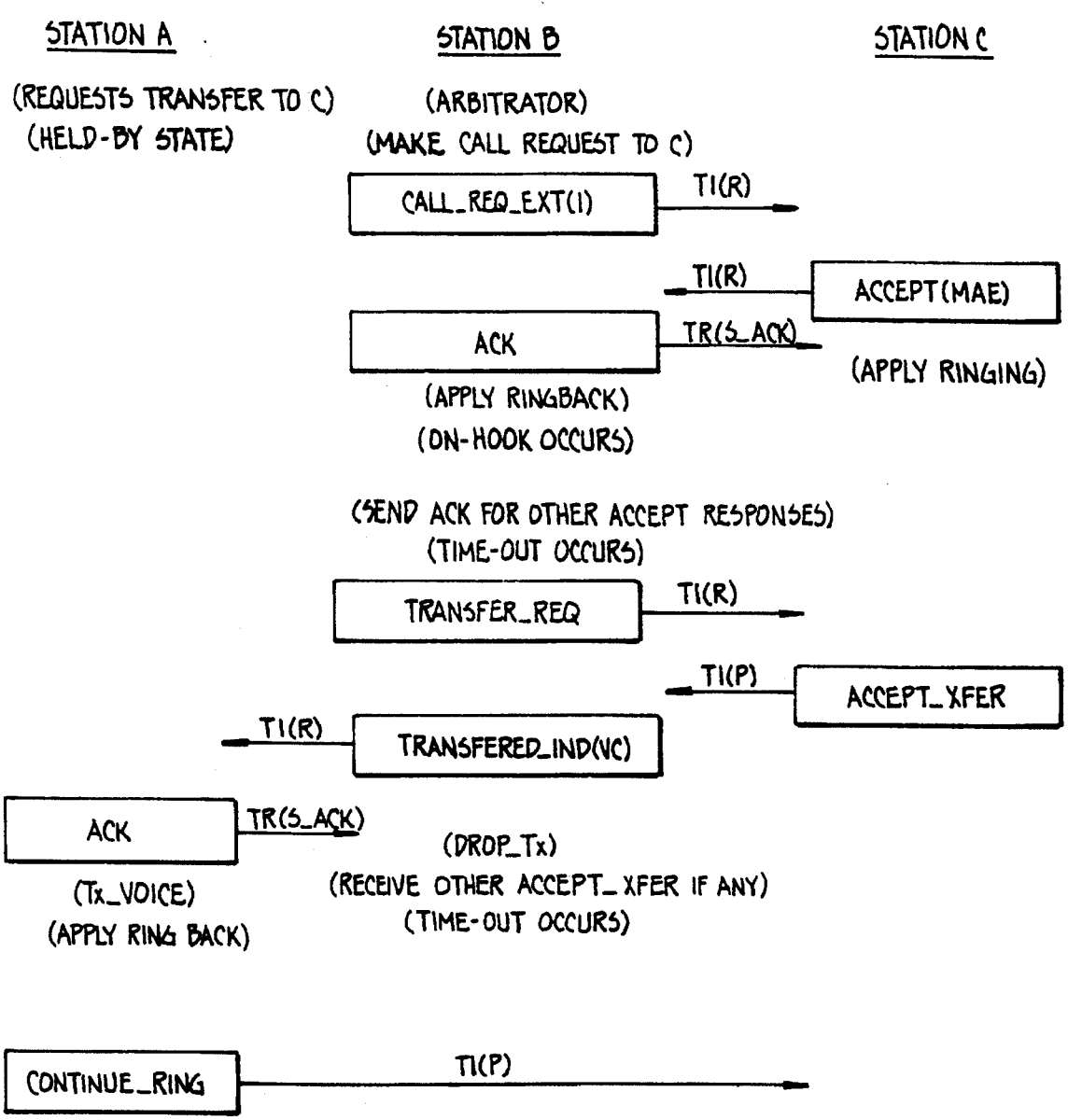
C IS MAE AND ONE OR MORE MEMBERS CAN ACCEPT THE CALL
FIG._E-23.

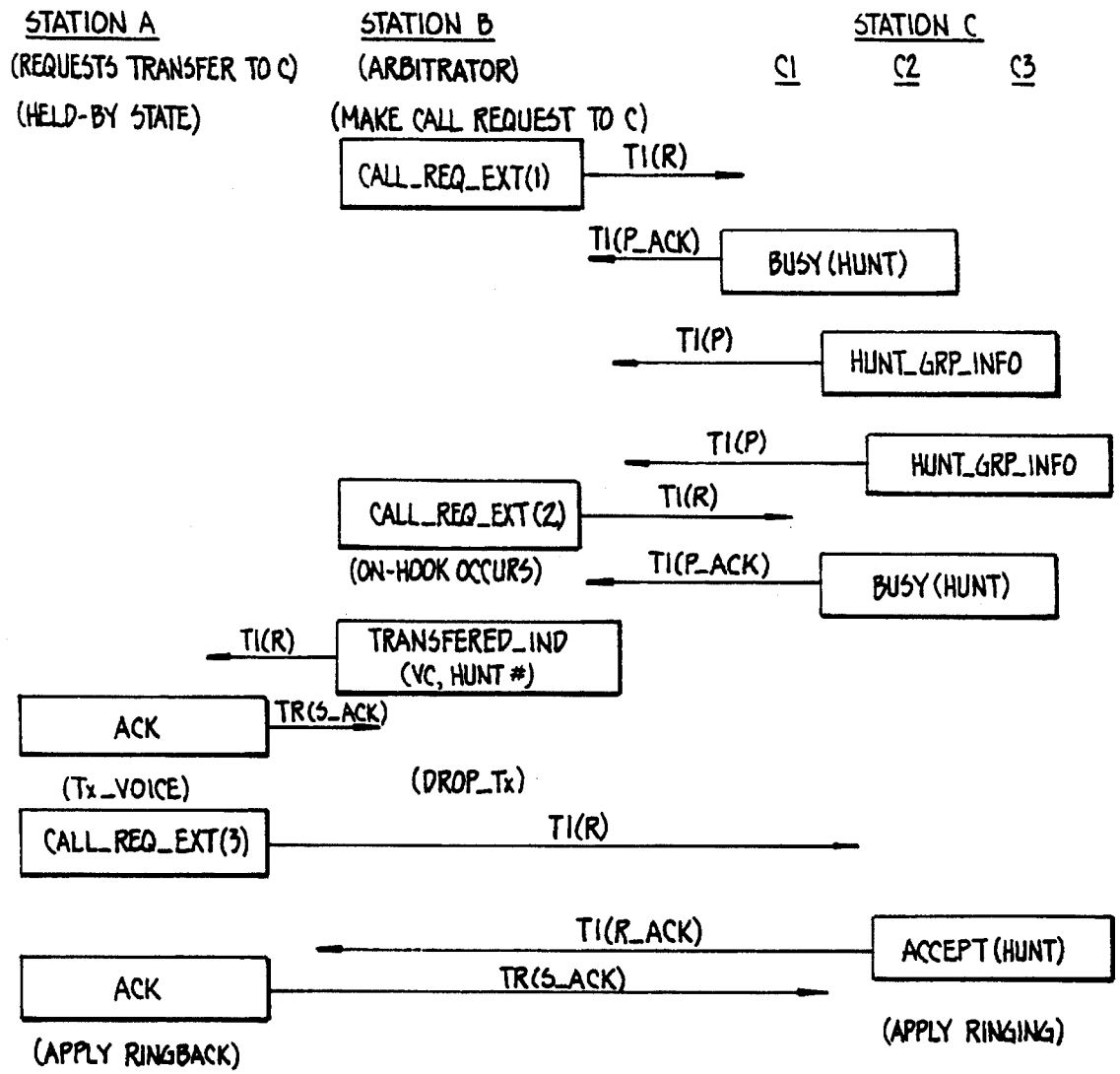
FIG._E-24.

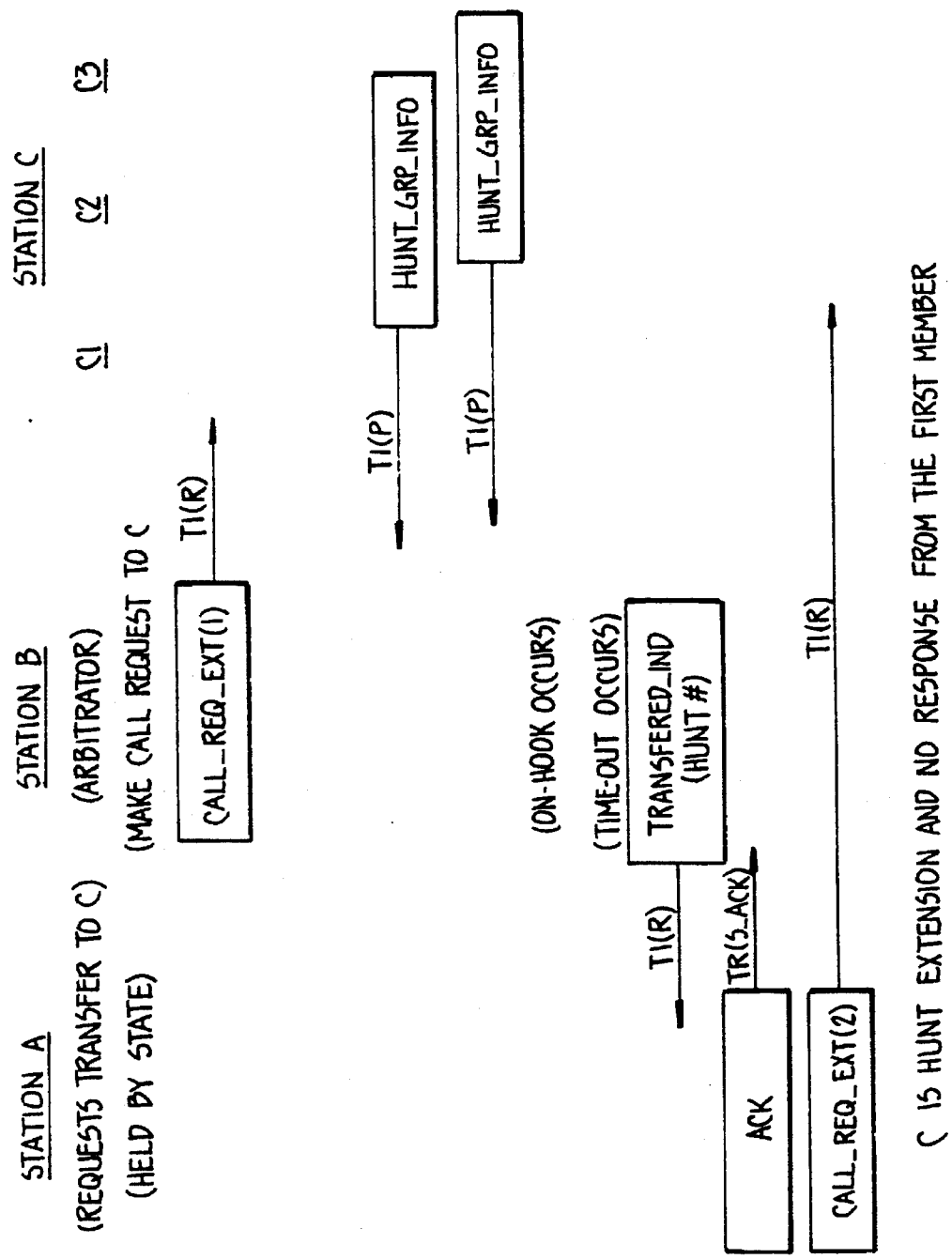
FIG._E-25.

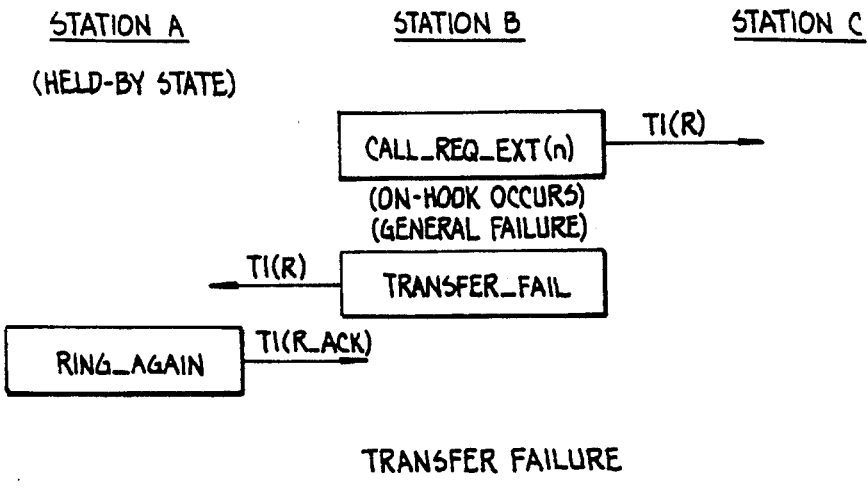
TRANSFER FAILURE
FIG._E-26.
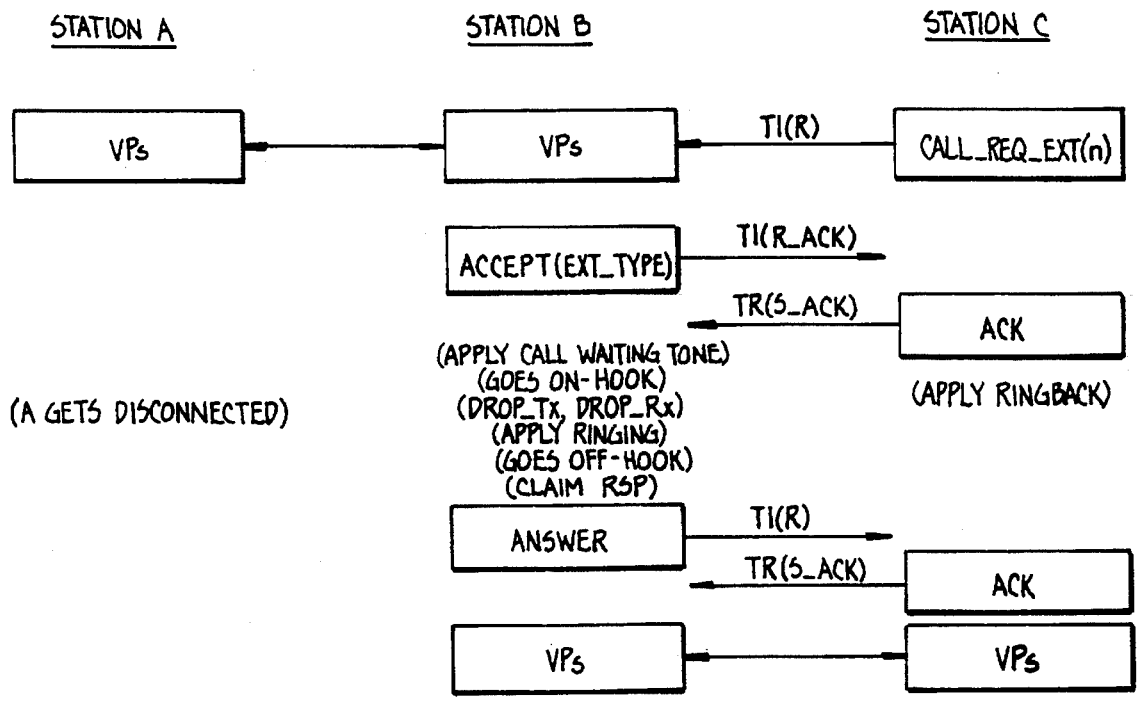
B GETS CALL WAITING FROM C. DISCONNECTS A AND ANSWERS C
FIG._E-27.

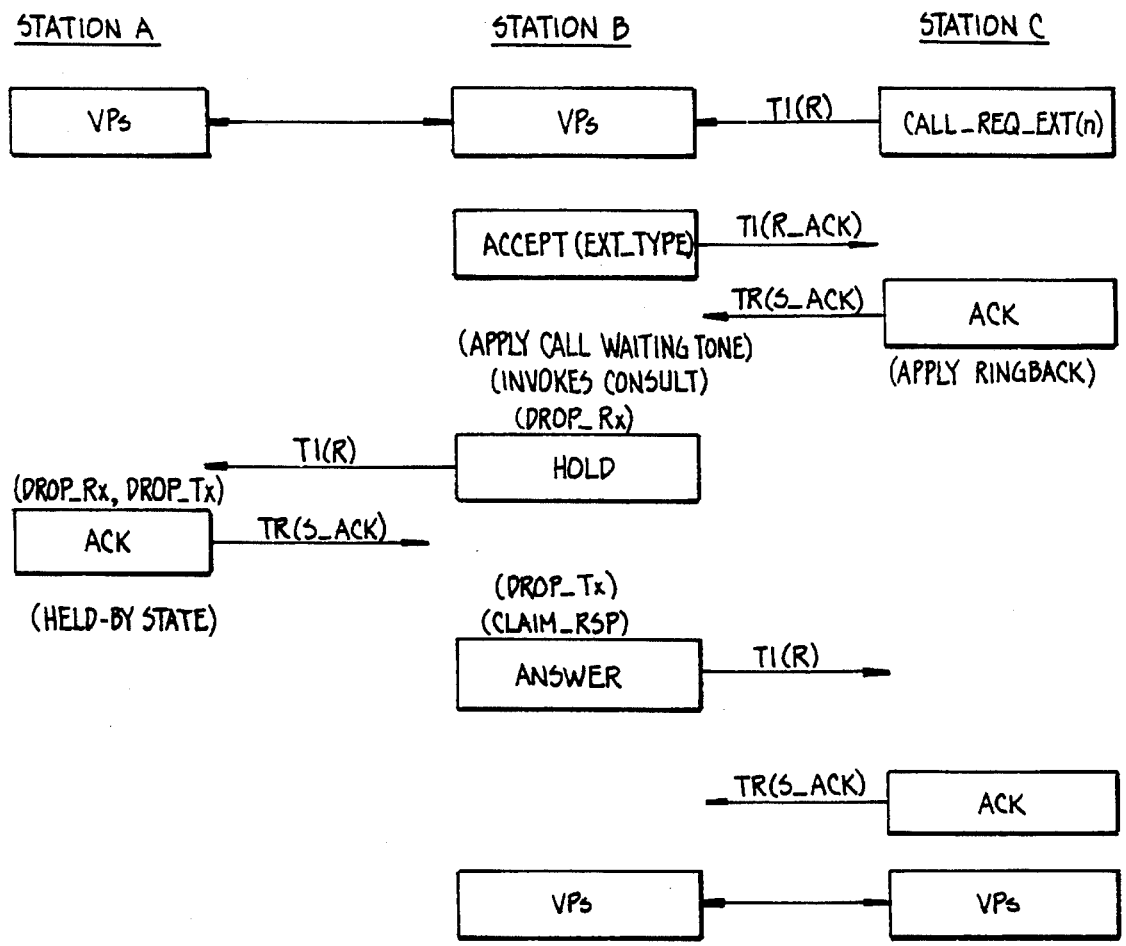
B GETS CALL WAITING FROM C, PUTS A ON HOLD AND ANSWER C
FIG._E-28.

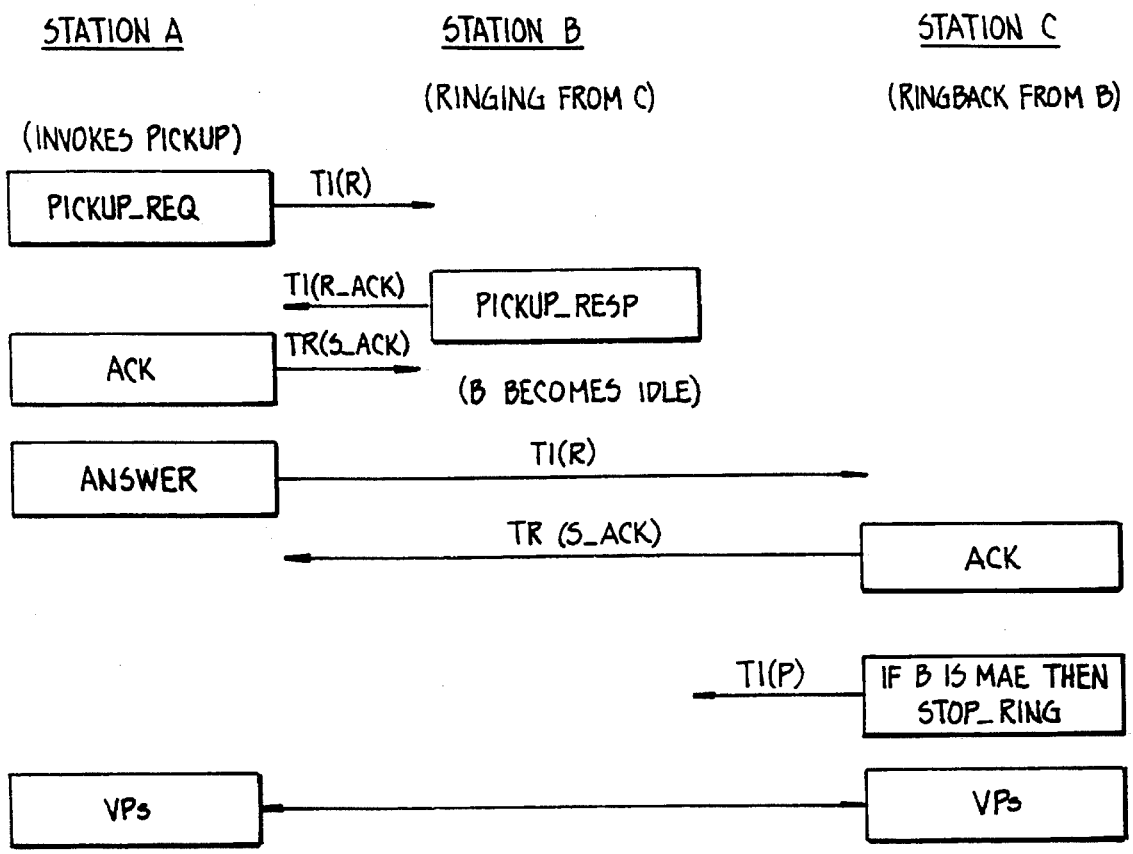
FIG._E-29.

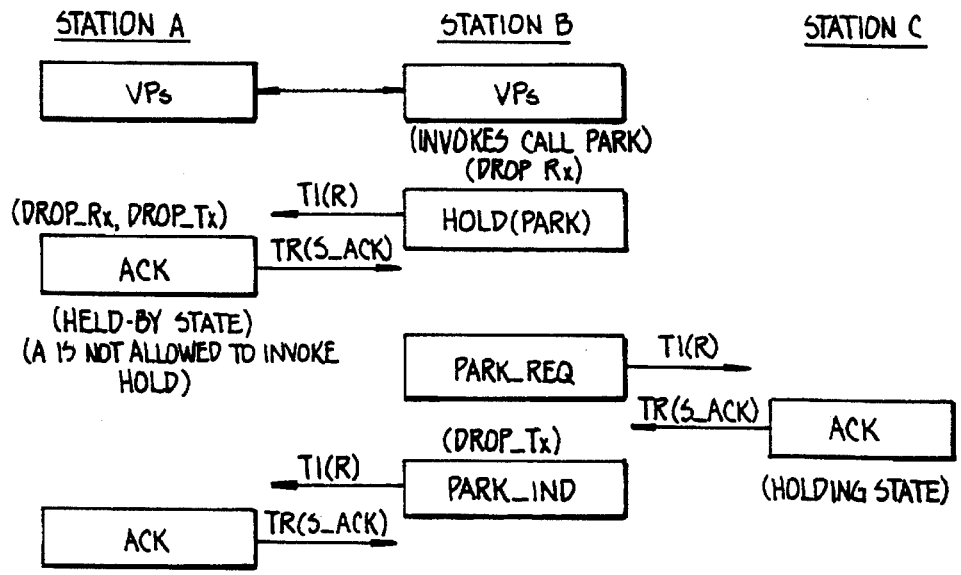
A IS TALKING WITH B AND B INVOKES DIRECTED PARK TO DESTINATION C
FIG._E-30.
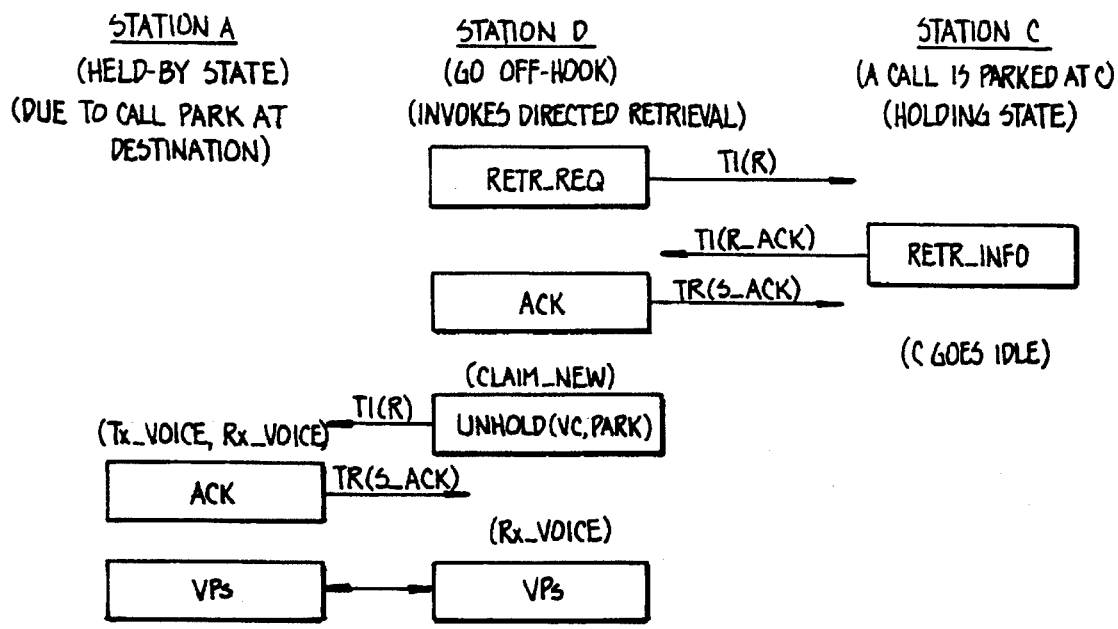
STATION D RETRIEVES A CALL PARKED AT C
FIG._E-31.

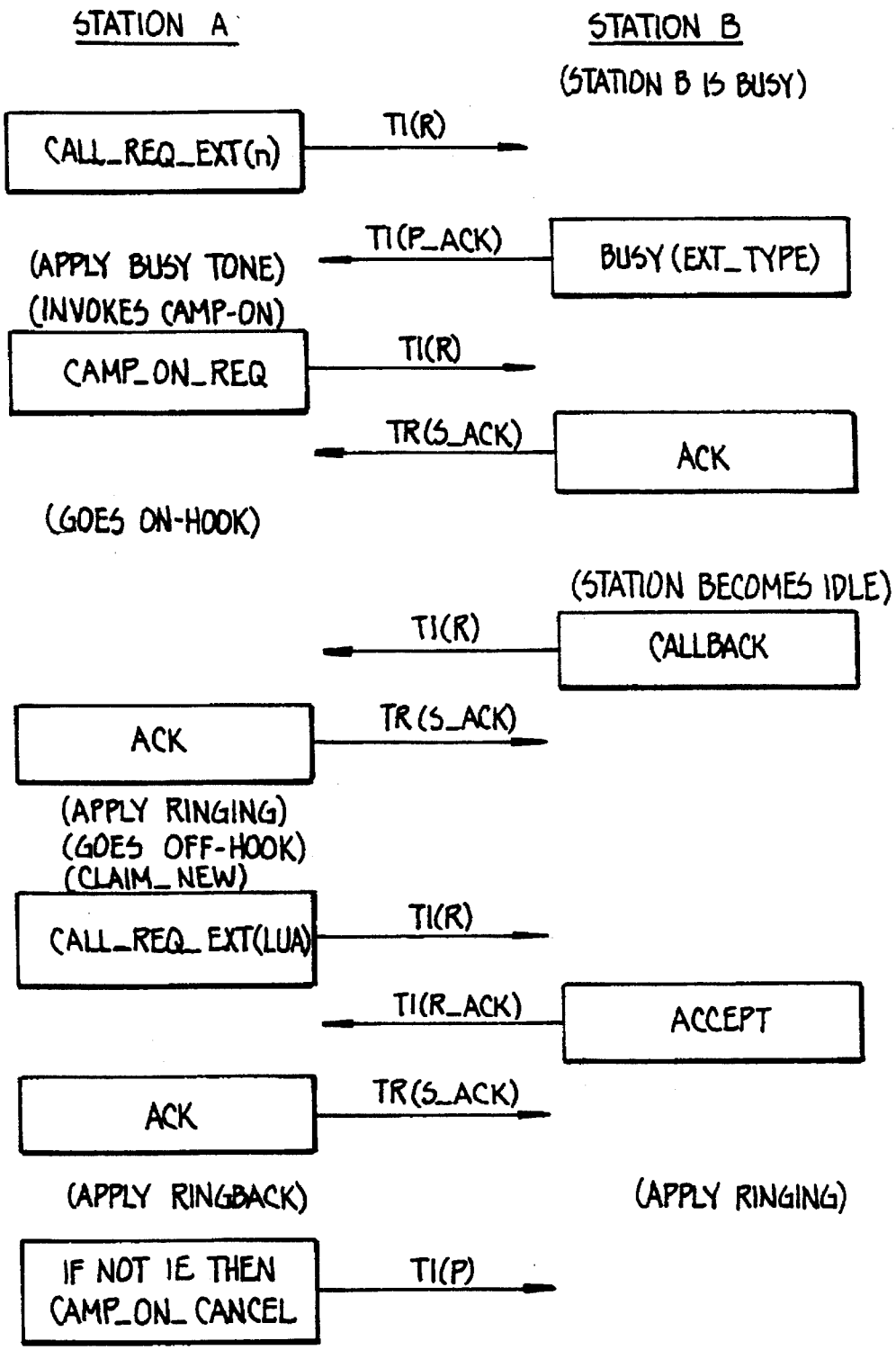
CAMP-ON AND CAMP-ON CALLBACK
FIG._E-32.

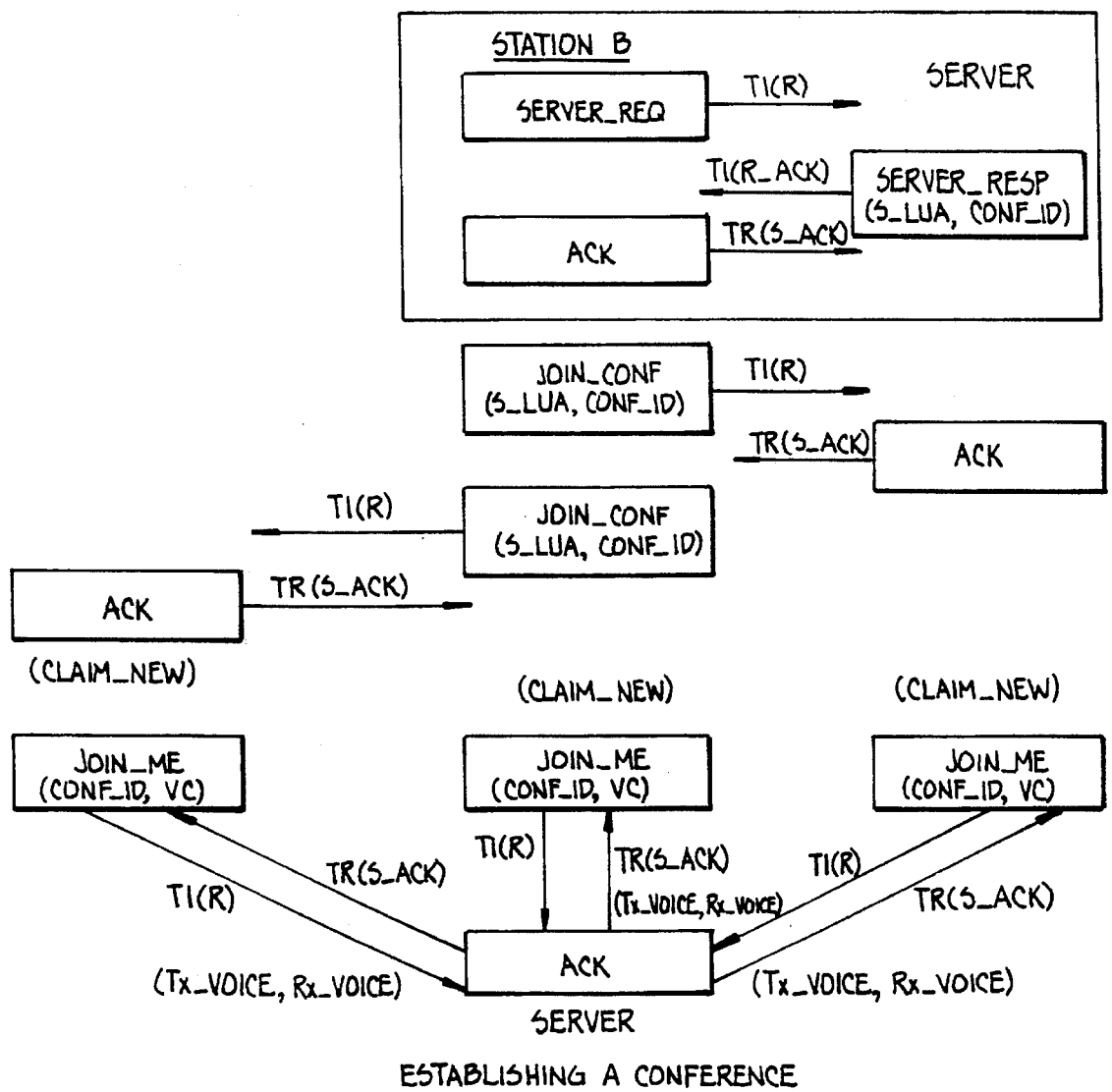
ESTABLISHING A CONFERENCE
FIG._E-33.

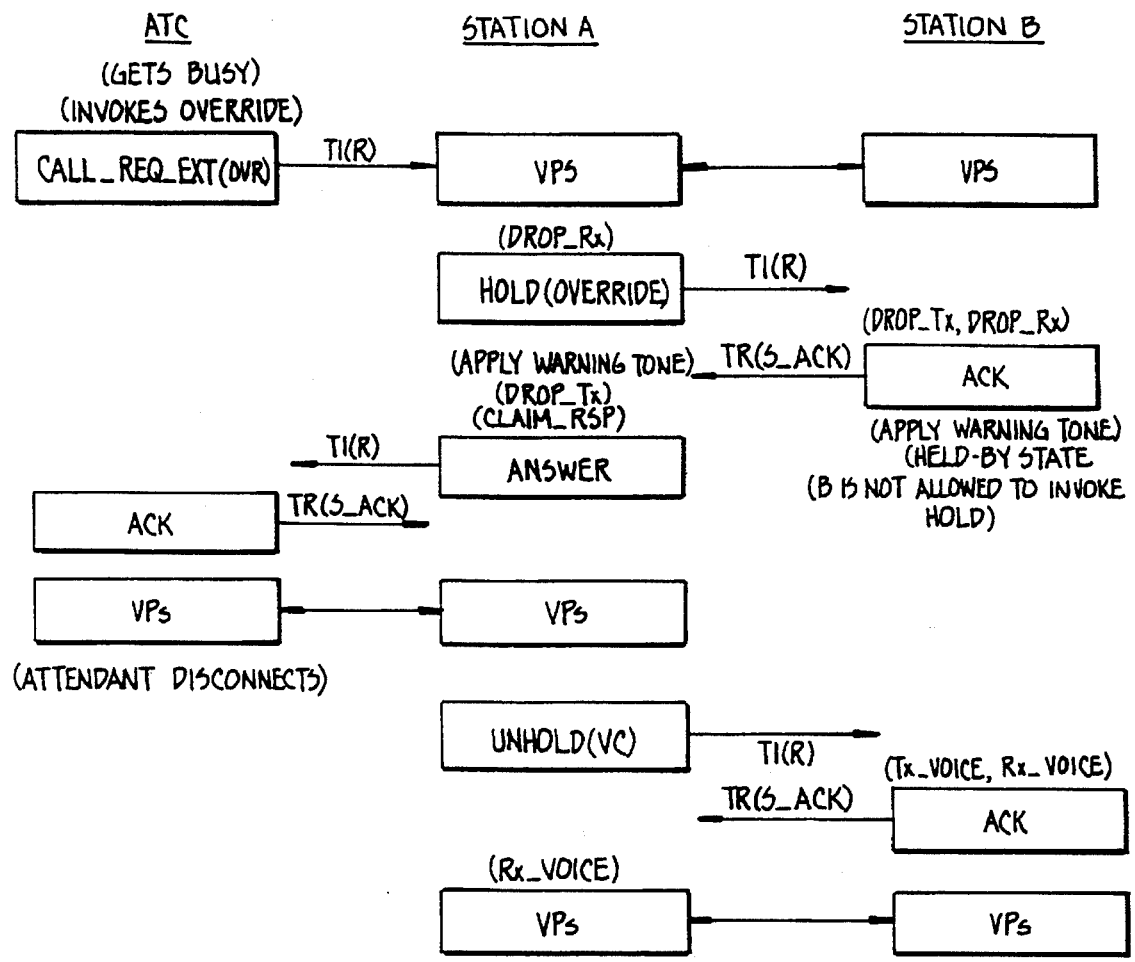
ATTENDANT OVERRIDE WHEN THE STATION IS BUSY
FIG._E-34.
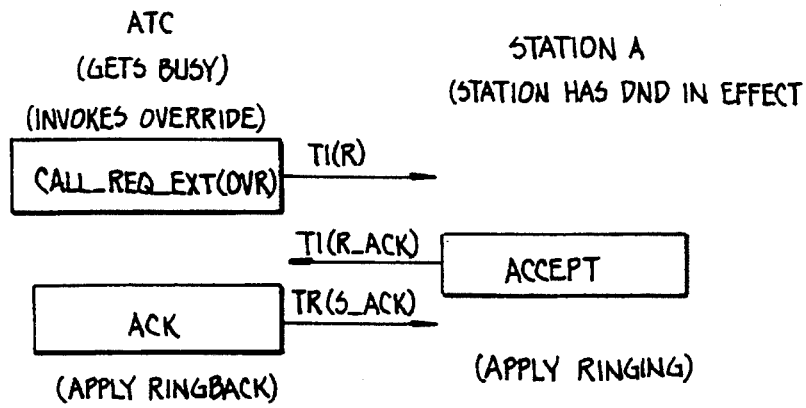
ATTENDANT OVERRIDE WHEN STATION HAS DND IN EFFECT
FIG._E-35.

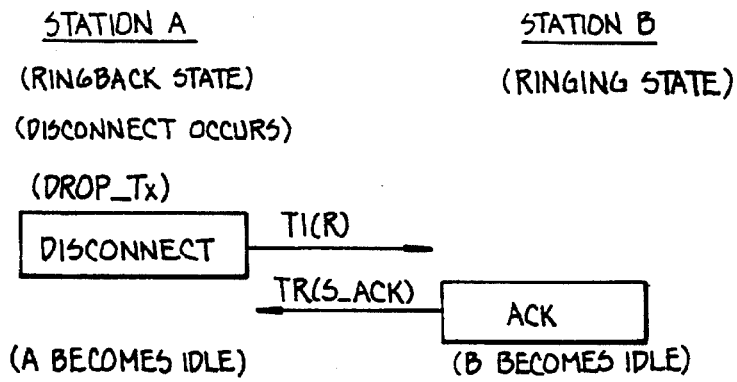
B IS IE AND RINGING. A DISCONNECTS THE CALL.
FIG._E-36.
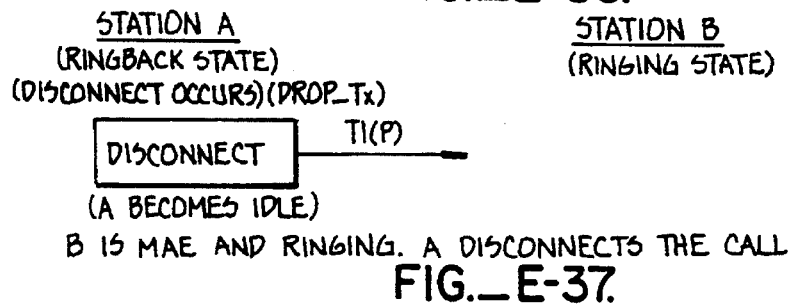
B IS MAE AND RINGING. A DISCONNECTS THE CALL
FIG._E-37.
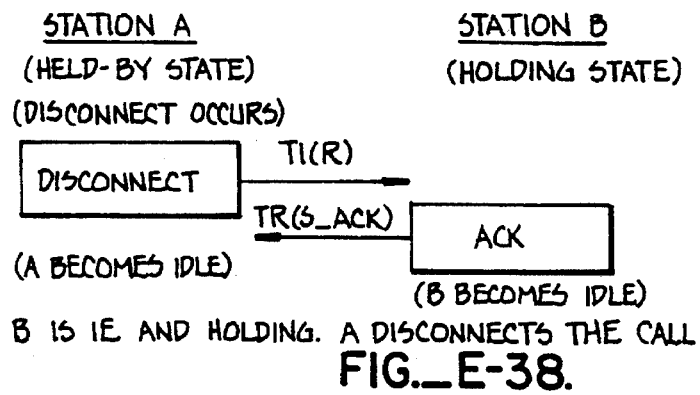
B IS IE AND HOLDING. A DISCONNECTS THE CALL
FIG._E-38.
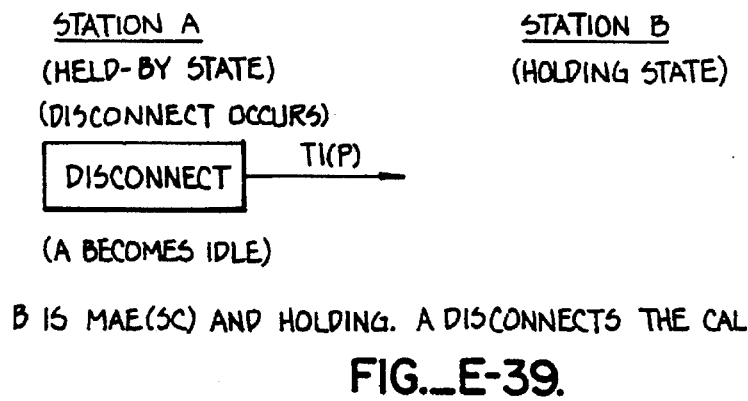
B IS MAE(SC) AND HOLDING. A DISCONNECTS THE CALL
FIG._E-39.

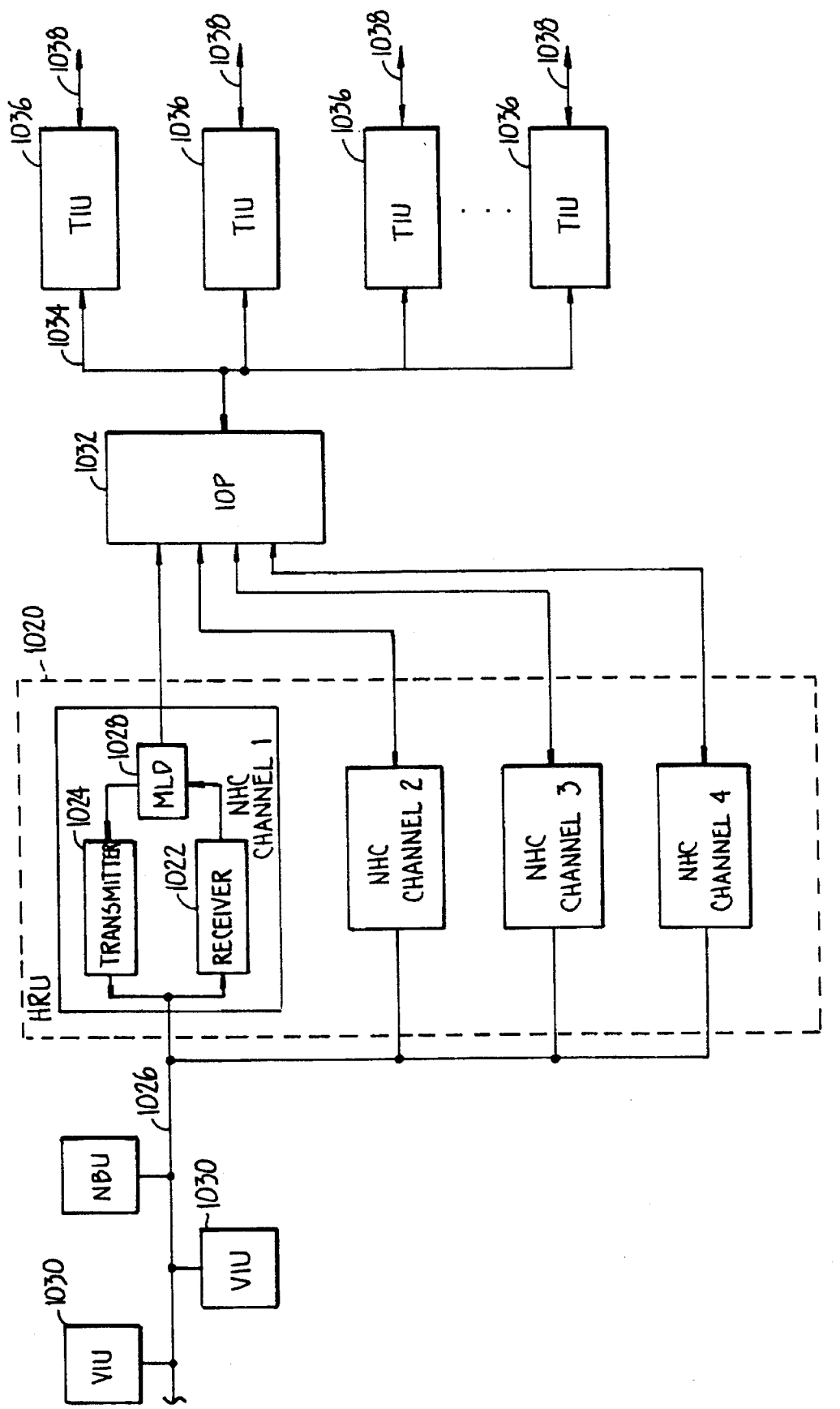
FIG._F-1.

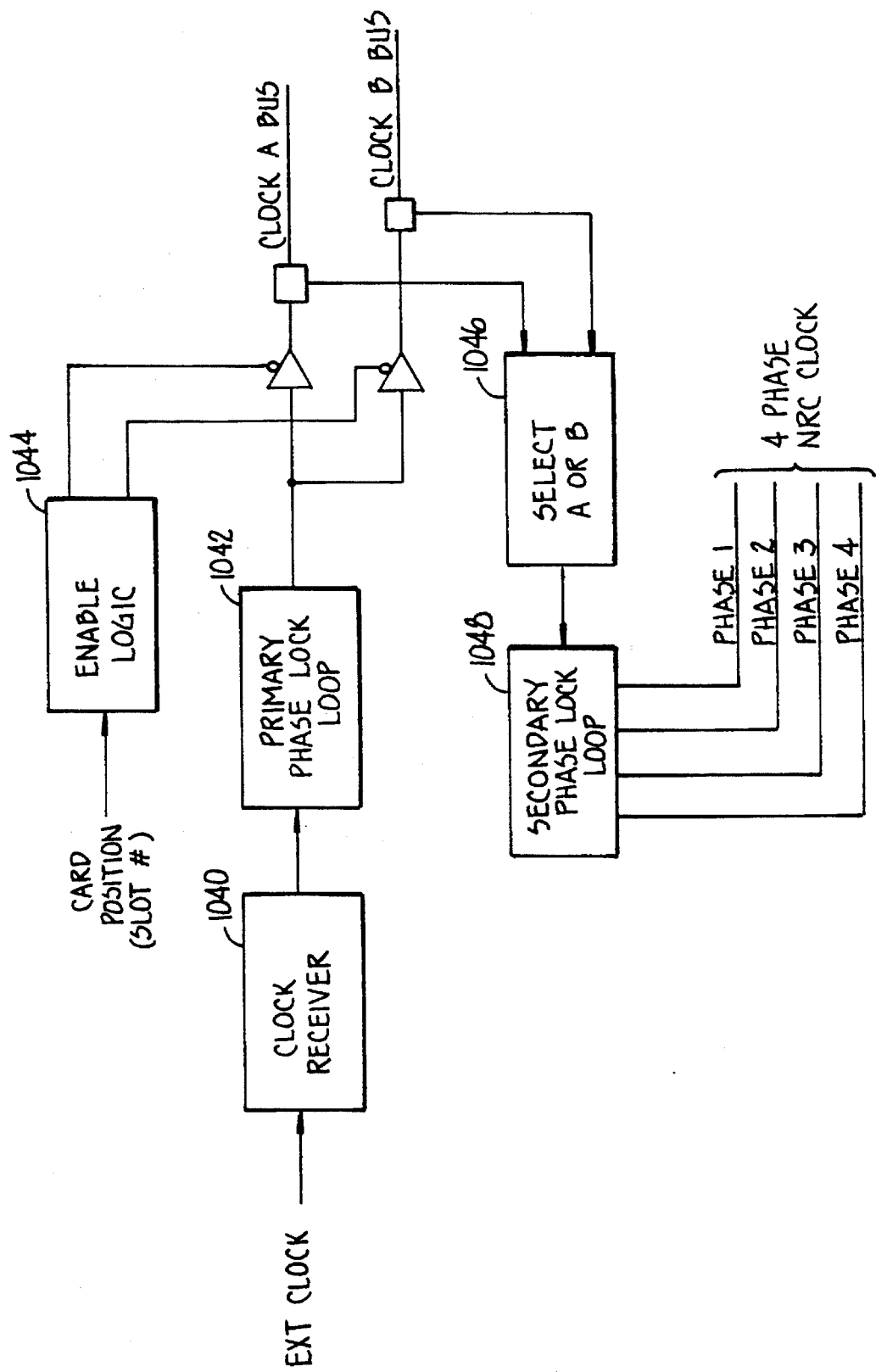
FIG._F-2.

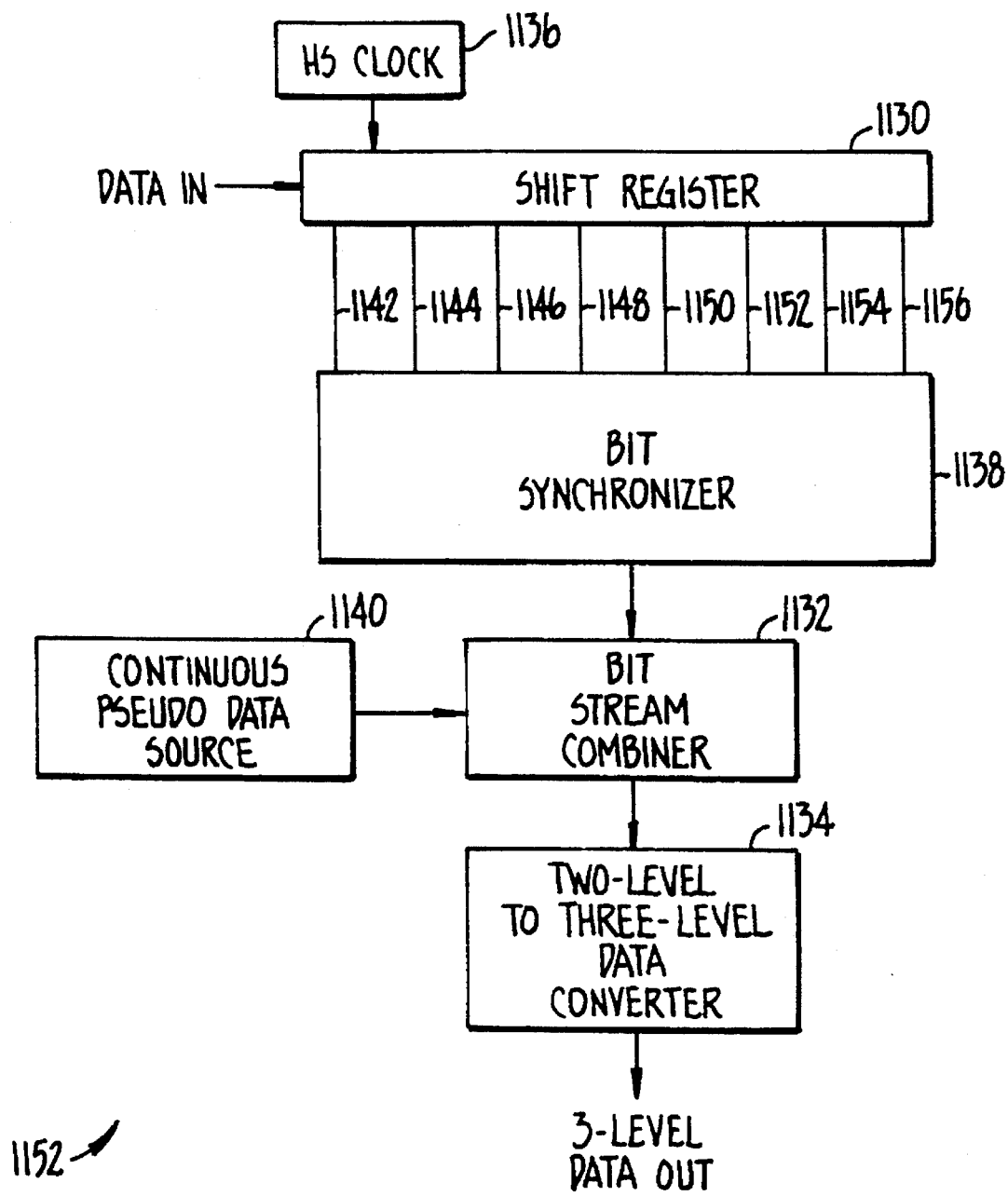
FIG._F-3.

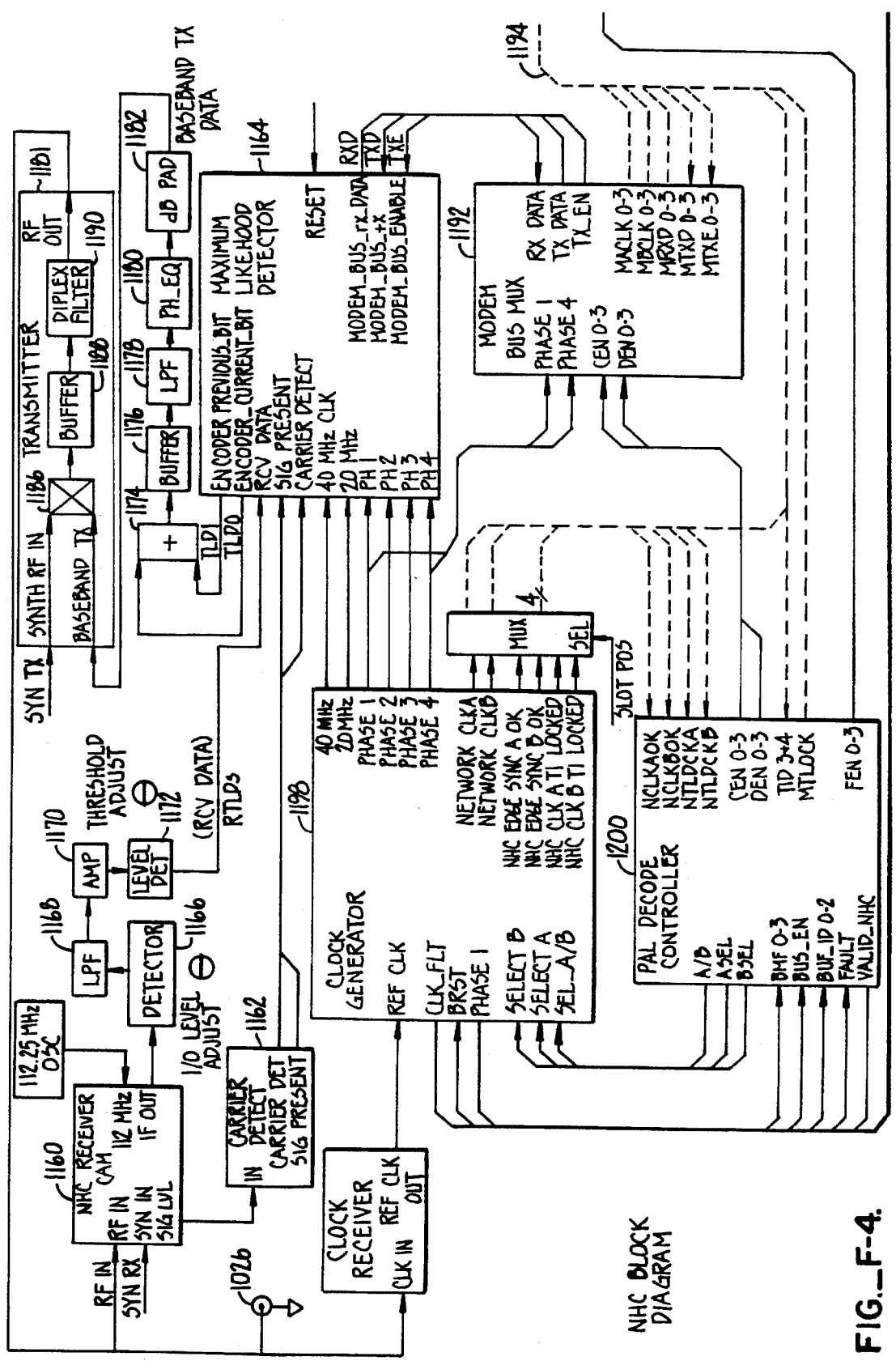
NHC BLOCK DIAGRAM
FIG._F-4.

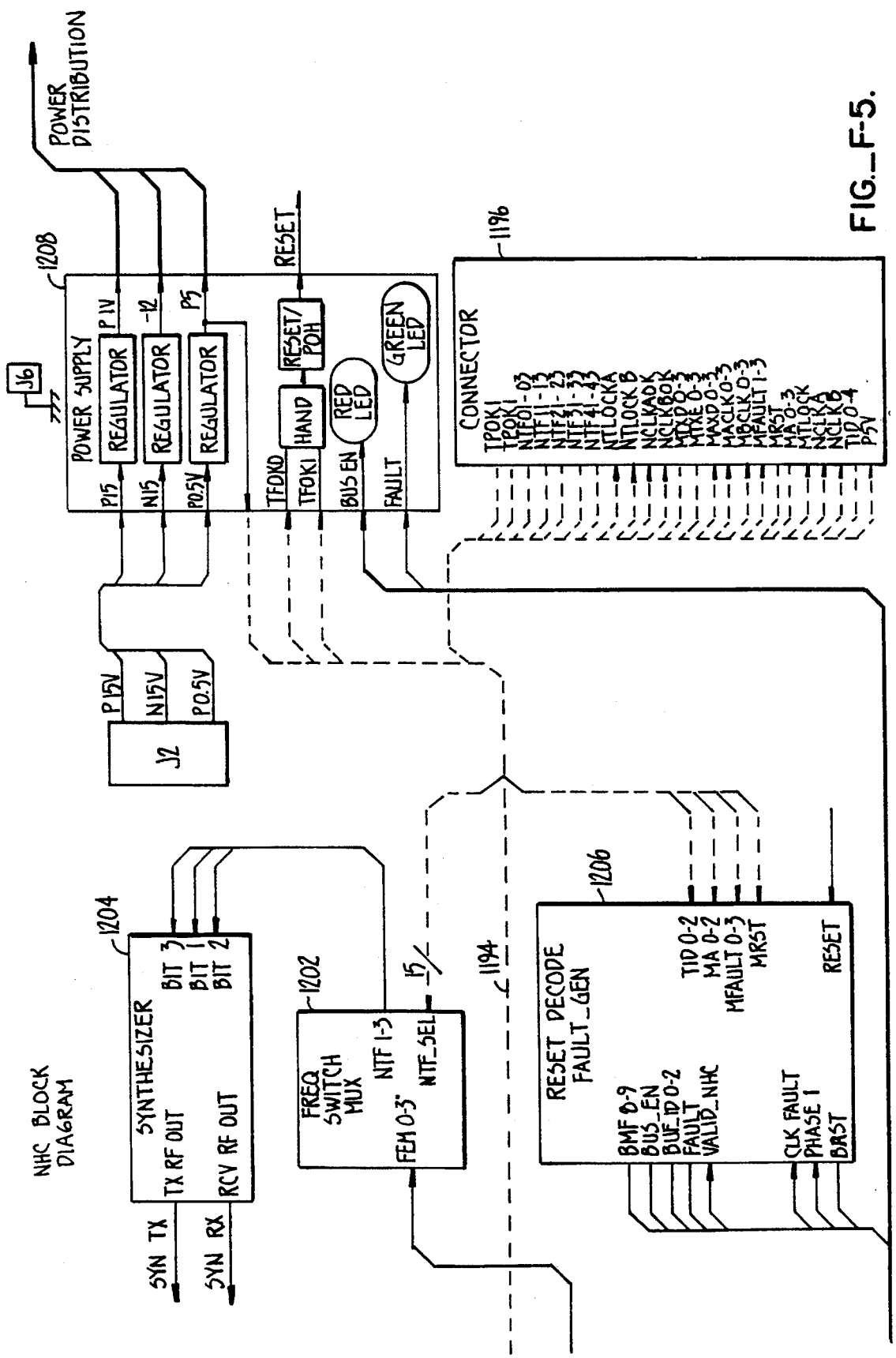
FIG._F-5.

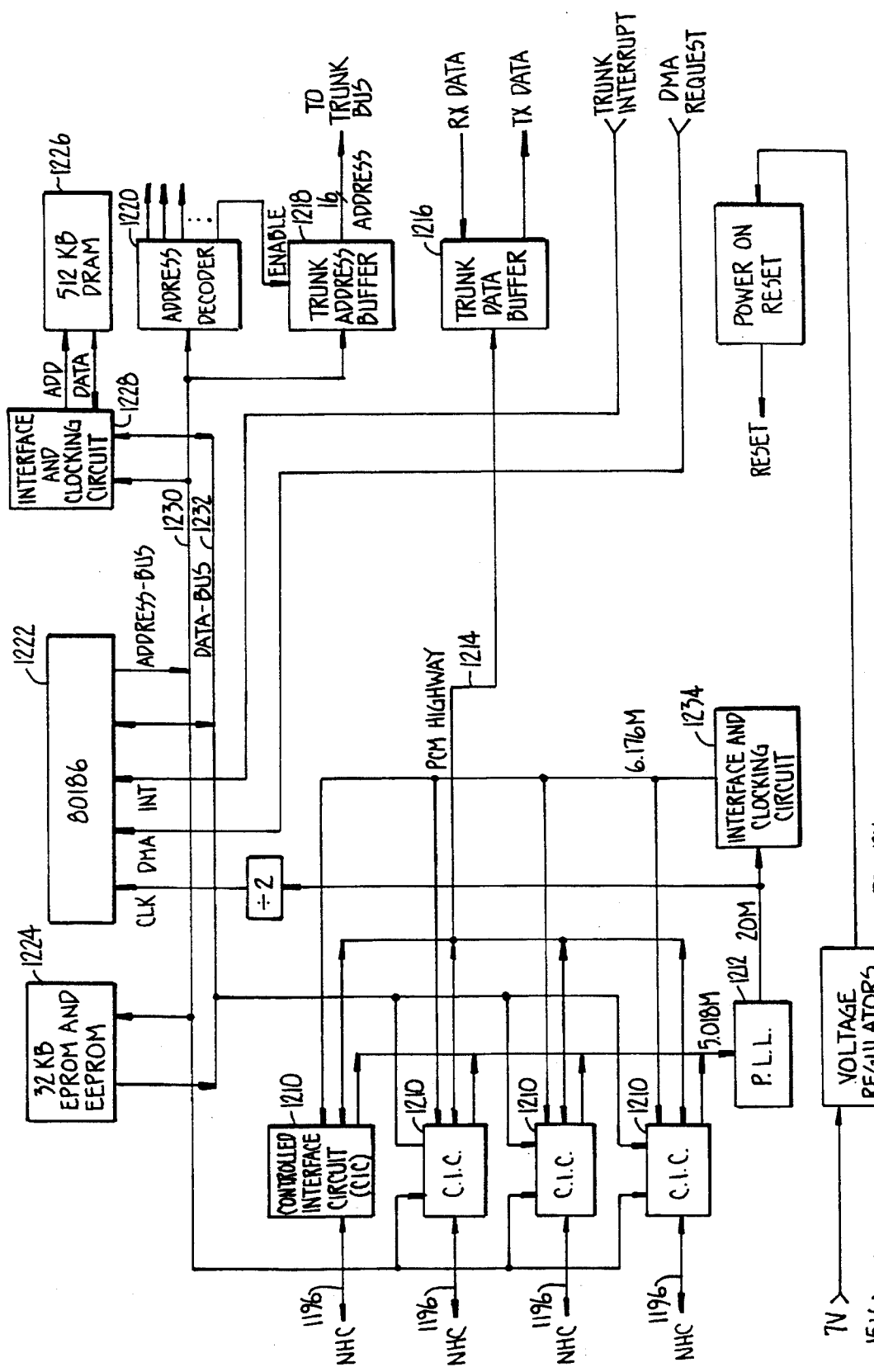
FIG._F-6.

DISTRIBUTED INTELLIGENCE NETWORK USING TIME AND FREQUENCY MULTIPLEXING

This application is a continuation of U.S. patent application Ser. No. 07/345,490, filed Apr. 28, 1989, now abandoned which is a continuation-in-part of U.S. patent application Ser. No. 07/170,968, filed Mar. 21, 1988, and entitled "Communication System Using Distributed Switching for Time-Division Multiplexing of Voice and Data", now abandoned.

BACKGROUND OF THE INVENTION

The invention relates to communication networks and, more particularly, to a distributed intelligence network using time and frequency multiplexing.

Many office telephone systems are based on a private branch exchange (PBX) wherein all telephones are connected to a central switching device ("switch"). The switch provides connections amongst the various on-site telephones (extensions) and connections between on-site telephones and the public switched networks. So that it may support the various features (call waiting, call forwarding, conferencing, etc.) that many users have come to expect and require, the switch has had to become a rather powerful computer with a large amount of complex software. The telephones have also become more complex, and software for certain of the features are programmed locally at each phone.

The PBX system works well for the most part. However, since every communication must go through the switch, a malfunction at that point may well have the effect of shutting down the entire system. Moreover, unless the system is configured with dual processors, modification of the switch software and configuration data may require that the whole system must be shut down.

For data communications, several different architectures are used. In a star network, all the terminals are coupled to a central point of the star, which provides centralized control of the flow of data. The central control on such a system can time-division multiplex data from different terminals by alternately holding data from one or the other transmitting terminal in a buffer until its timeslot is available. The central control unit provides the synchronization necessary to insert the data into the respective time slots. Unfortunately, the star network suffers from several disadvantages. The bandwidth available through the switch matrix is limited, as well the integrity of the data passing through the switch. Furthermore, it is difficult to lay out the wires, because a new wire from the central control to the telephone must be laid each time a new telephone is added. In addition, a failure of the centralized control system disables the entire system.

Another data system architecture, and one which is easier to lay out, is a ring network. In a ring network, a single cable passes through each and every data terminal, and thus, network bandwidth is shared. Rather than rely on assigned timeslots or the acquisition of timeslots, bandwidth multiplexing employs the token method. In this method, a token is passed from one terminal to another, with the terminal desiring to transmit holding onto the token. A terminal cannot transmit unless it has the token, and therefore only one terminal will be transmitting at a time. This type of time-division multiplexing thus transmits data in irregular bursts, rather than regular assigned timeslot lengths. This type of transmission is appropriate for data communications, which typically occur in infrequent, long bursts. Voice communications, on the other hand, require a continuous connection over an extended period of time.

An alternative architecture for preventing errors due to two users attempting to acquire the network bandwidth simultaneously is used in the Ethernet system. In this system, before a terminal may transmit it listens to see if the network bandwidth is being used. Then while transmitting, the data terminal listens to determine if the data transmitted is received in the same form. If the received data differs, then another terminal transmitted at the same time, resulting in a collision and thus scrambled data. The transmitting station then stops transmitting and retransmits a random amount of time later. Thus, central control of the network bandwidth acquisition of timeslots is not needed. Because data transmissions occur infrequently, the chances of a collision on the second transmission are low. The chance of a collision increase as the number of terminals coupled to the system increases. Such a system is ill suited for voice traffic since the number of collisions will increase for voice communications which require continuous transmissions over an extended period of time. Additionally, the delay through the network is not fixed.

One approach which combines voice and data not using the private branch exchange is disclosed in U.S. Pat. No. 4,470,140 to Coffey, entitled "Distributed Switching Network (DSN)." The DSN system is built around a multiple bus network. In the DSN system, the communication media consists of twisted pair. For the network to operate properly, at least three pairs of cabling must be laid out. This cabling acts as the backbone for the DSN system. One pair is used for transmitting information toward the Line Group Central Shelf and the other two pairs are used in a loop back arrangement for receiving transmissions from either other units or remote units through the Line Group Central Shelf. Each transmit and receive line is subdivided into frames and further subdivided into timeslots. Communication between any two units in this network requires that each unit seize a timeslot for its own transmission needs and that it receive and read the timeslot of the other to provide two way communication. One of the major assumptions of the DSN system is that the buses are synchronous, that is, no allowances are made on the bus for signalling overhead or time of flight. Each timeslot has been partitioned to accept one byte of information, and thus, there is no room for timing errors.

The DSN system itself consists of two major units, Parallel Access Communications Interface Blocks (PIBs) and the Line Group Central Shelf. The PIBs are used to interface communication equipment to the network. The PIBs are connected in parallel across the transmit lines and across the upstream portion of the looped back receive lines. The implication of the parallel access is significant in that when a PIB transmits onto the common transmit bus, the transmission is sent both upstream and downstream. The Line Group Interface Shelf (LGIS) is the terminus point for all of the cabling in the DSN System. The LGIS provides network timing, switching between transmit and receive lines, switching between in-house calls and the Public Switched Telephone Network, as well as all of the network control functions.

When a PIB wishes to transmit information, two events occur. The PIB Transmit Line first derives timing information so as to identify when to transmit on the transmit bus. This timing information is generated by the Line Group Central Shelf and sent out on the receive line. By examining the status of the receive and the transmit lines, the PIB is able to ascertain that a particular timeslot is available. This determination of whether a timeslot is available is completely dependent on the parallel connection of the PIB to both the transmit and receive lines.

SUMMARY OF THE INVENTION

General

The present invention is directed to a distributed communications network which provides numerous advantages over known communication systems. The apparatus and methods according to the present invention operate on a single communications medium yet provide a broad band network facility which can support all of the voice, data and video communications needs of a particular user. To do this, each node in the network may assign traffic type (voice, data and video) to a different portion of the network medium's RF spectrum. Each separate frequency band thus comprises a subnetwork. Subnetworks may be designed and engineered for specific services and a particular grade of service. For example, data networks can be designed and engineered for high speed transport, network availability, and/or data integrity. Partitioning the communication services in this way allows the subnetworks to be administered and run by separate entities (e.g. the telecommunications department and the data processing department) each independent of the other (provided, of course, that each does not overlap the other's frequency domain).

The apparatus according to the present invention is modular and incrementally expandable. The interconnect is designed for easy installation, and user equipment can be added or moved without trained service personnel, network reconfiguration, or software changes. Because of the distributed nature of the interconnect, any failure of a single element will not effect the operation of the remaining network. Thus, network additions, deletions, or modifications are transparent from an overall network performance and operational perspective. The independence of services between subnetworks also allows the interconnect to be expanded and modified independent of the other subnetwork services. For example, if a business' data requirements were to expand, additional network attachments may be made completely independent of the voice and video circuits already attached to the system. Older local area data networks (i.e. the network interface units, not the network medium) can be retired and replaced with newer, higher speed, more cost effective equipment, without effecting either the voice or video portions of the interconnect system.

In a preferred embodiment, the invention is implemented in a voice system that uses time domain multiplexing. A timing mark generator broadcasts periodic timing marks that define a series of frames; a leading portion of each frame defines a signalling packet interval and a later portion of the frame defines a number of timeslots. The frame rate and timeslot width are such that one direction of a voice communication can be supported on a single timeslot on alternating frames. The other direction is supported on the same timeslot on the interleaved alternating frames.

The intelligence is distributed and each node has its own operating software and configuration data, which are stored in RAM. This software and data may be updated from time to time, and may be lost in the event of power loss. Each node also has a boot ROM in which is stored a small amount of software to enable the node, at power up, to participate in the acquisition of the full operating software and data.

Boot Protocols

The present invention provides a technique for providing boot images (operating software and configuration data) to network nodes in a distributed commuting/communications environment. The protocols for providing boot images to nodes can be carried out with minimum disruption to ongoing network operation in the event that only some of the nodes require service. The boot process is both general and specific, it can boot either a specific node or the entire network concurrently.

The system includes one or more network boot units ("NBU's") whose function is to maintain the operating software and configuration data in non-volatile memory (such as hard disk), and transfer copies (referred to as boot images) to the nodes at power up or for updates. For boot operations, the timeslots, normally reserved for voice, are used for data transmission.

In order to transmit boot images to a selected group of network nodes, referred to as boot consumers, the NBU must receive a boot request from a boot consumer. The NBU then broadcasts a boot control signalling packet ("BCSP") having an image descriptor portion that describes the boot image to be transmitted and a control portion that identifies the packet as a BCSP, specifies the class of boot consumers, and designates the timeslot(s) in which the boot image is to be transmitted. During the transmission of a boot image, the NBU periodically sends out BCSP's so that boot consumers that were not in a position to receive the boot image at the beginning of the transmission can pick up in midstream.

A boot consumer requiring a boot image has executable code in boot ROM, whereupon it listens for BCSP's from the NBU, determines whether any detected BCSP's specify the desired type of boot image, and if so, causes data appearing in the appropriate timeslots to be read into local memory. Once the boot image has been read in, the node can begin executing it. If a BCSP specifying the desired type of boot image is not detected within a certain time, the boot consumer sends a boot request signalling packet ("BRSP"), and continues to listen for a BCSP specifying the desired type.

Each boot consumer is programmed to have a random wait period before sending out a BRSP. Thus, if there are many nodes requiring the same type of boot image, the earliest boot request will be responded to by the NBU, thereby obviating the need for further boot requests by other units programmed to make their requests later.

If the system contains more than one NBU, the first NBU to receive the request, assuming it has the requested boot image and is not currently downloading a boot image, services the request in the manner described above. NBU's arbitrate amongst themselves to determine which of them is to respond to a given incoming request. Each NBU sends a BCSP that identifies the sending NBU but specifies no time frames to be allocated. Each NBU then listens for BCSP's, and in the event that it first receives its own BCSP, it assumes responsibility. If it first receives a BCSP that originated from another NBU, it does not attempt to service the request.

Skew Calculation

The present invention provides a network having a wide bandwidth communications channel. This channel is organized architecturally as a time-ordered bus. All the nodes of the system are coupled to both the transmitting medium and the receiving medium. The network bandwidth is subdivided into timeslots. Timeslots are defined by a timing mark generator, with each node detecting the timing marks on only the receiving medium. The time between each timing mark defines a frame, with each frame consisting of a plurality of timeslots. In this network, each node may be a different physical distance from a central turnaround point or head-end, resulting in each node transmitting in a different time relative to the received timing mark due to the differences in transmission time to the head-end and back. Accordingly, each node transmits a test signal and measures the time after the transmission until it receives the test signal back again. This time, designated a skew time, is used for transmissions of information. In all subsequent transmissions, each node transmits at a time equal to the skew time in advance of the timeslot it is attempting to transmit into.

The network employed in this invention is medium independent. In one embodiment, the transmission medium is a broadband CATV cable with a transmitting and receiving channel defined by different frequency bands. The head-end of the system includes a frequency translator for translating the transmitted signal from the transmitting channel onto the receiving frequency band of the receiving channel. The system permits multiple channels, increasing the number of users that can be attached to the system. Information is transmitted asynchronously within a timeslot, thus eliminating the need for precise synchronization to place a transmission packet within a specified timeslot. Each channel may contain a plurality of signalling timeslots and voice transmission timeslots. Each frame preferably has a first portion assigned for signalling packets and then a plurality of timeslots for voice communications. When one node desires to call another, an identifying signal is transmitted in the signalling portion of the time-divided channel and is designated the signalling channel. When the called node receives the signal, it transmits an acknowledgment signal in the signalling portion. The calling node then signals a specified timeslot in which digitized voice or data is to follow. Either node may direct the other node to switch to another timeslot or channel for communication. This may be done, for instance, where one channel is extremely busy. Preferably, for two-way voice communication, the first node would transmit in the specified timeslot in every other frame, with the second node transmitting in the frames in between.

Data and digitized voice are both sent in the same manner, thus simplifying the circuitry required. The signalling channel employs a slotted ALOHA type collision detection system, with each node monitoring on the receiving line to determine if the signal transmitted is received in the same form. If a collision is detected, the node waits for a random amount of time and attempts to transmit again. Collisions within voice timeslots employ an ALOHA collision technique whereby a test signal is inserted into a supposedly vacant timeslot and the received signal is compared with the original. If the test signal is returned undamaged, the timeslot is considered seized. If an error is detected, the node waits, seizes another timeslot and the process continues again. Before transmitting, the node must determine that the timeslot is available for a series of frames. Once a node has acquired a timeslot by transmitting in it, it will retain that timeslot for the duration of the communication. Other nodes will detect data being transmitted in that timeslot, and will not attempt to acquire that timeslot.

Establishing Voice Telephone Link

Another aspect of the present invention is the unique method of claiming a voice timeslot by individual telephone stations in distributed intelligence network. One station generates a periodic timing mark, and the remaining stations monitor the timing mark and also monitor which timeslots following the timing mark are busy with transmissions. An individual station placing a call dynamicly chooses a free timeslot and begins transmission. In the event of a collision, another timeslot acquisition is attempted. Thus, there is no need for a central assignment of timeslots.

In particular, certain timeslots are set aside for control data, and others for voice data. A voice timeslot is first claimed, and then a signalling packet is sent in a control data timeslot. The signalling packet has destination address, and also contains data on the originator's address and the position of the claimed timeslot. The signalling packet is sent over a plurality of channels, and also specifies the correct channel (i.e., frequency channel) of the originator. The originator's channel is then monitored for a response. The receiving station will attempt to claim another timeslot having a predetermined relationship to the already claimed timeslot, for a response. Upon such a successful claiming an appropriate signalling packet is sent to the originating station, and voice communication can then commence by the placement of voice data in the appropriate timeslots.

Session Layer

The present invention provides a series of techniques for establishing, maintaining, and terminating voice communications between nodes in a network, and provides techniques for controlling communications when a user invokes features on a telephone.

In a preferred embodiment, the invention is implemented in a system that uses time domain multiplexing. A timing mark generator ("TMG") broadcasts periodic timing marks that define a series of cycles. Each cycle includes at least one interval that defines a signalling packet ("SP") interval while remaining portions of the cycle define a number of voice timeslots ("VTS"). The cycle rate and VTS width are such that one direction of a voice communication can be supported on a single VTS. Designated pairs of VTS's in a cycle define a voice circuit ("VC") capable of providing full duplex communication. Each node is interfaced to a common broadband medium, and may provide trunk interfaces or telephone interfaces. A typical telephone call entails an exchange of SP's between the nodes and a claiming process wherein vacant VTS's are claimed for the duration of the communication.

When a user takes a telephone off-hook and dials an extension, the node associated with that phone (first node) claims a first VTS of an apparently unused VC. The claiming entails having the node transmit a Claiming Voice Packet ("CVP") onto the VTS, and verifying that the node's own CVP comes back intact. Upon successfully claiming the first VTS, the first node transmits a Call Request SP addressed to the second node. The second node, upon receiving the Call Request SP, sends an ACCEPT SP, which the first node acknowledges with an ACK SP. When the designated phone at the second node goes off-hook, the second node claims the second VTS of the VC, thereby completing the voice circuit. Upon successfully claiming the second VTS, the second node sends an ANSWER SP to the first node, which the first node acknowledges with an ACK SP. Thereafter, each node transmits voice data in its claimed VTS and receives voice data from the VTS claimed by the other node. When either party goes on-hook, a disconnect SP is sent by the terminating station and the connection is terminated.

The invention contemplates an exchange of SP's to invoke various features. For example, a hold feature wherein an ongoing conversation may be suspended by the first node is invoked by having the first node send a HOLD SP to the second node while ceasing to receive, and when the second node acknowledges with an ACK SP, it stops transmitting into its claimed VTS. The first node may periodically transmit CONTINUE HOLDING SP's and the second node will respond with CONTINUE-TO-HOLD SP's. When the first node wishes to reestablish communication, it claims a new VTS, and sends an UNHOLD SP. The second node claims the remaining VTS of the VC and returns an ACK SP. The first node then transmits and receives and VP'S are exchanged.

Time-Frequency Multiplexing

Another aspect of the present invention is the unique method and apparatus for implementing time-division multiplexing. A plurality of different frequency channels are used, preferably four. Each channel has an upstream and a downstream frequency band. Transmissions from any node occur on a particular channel in a timeslot in that channel and are routed on the upstream frequency band to a head-end return unit, which translates the signals into the downstream frequency band of the channel, and transmits them on the downstream frequency band. A timing mark generator is coupled to the system so that it can simultaneously generate timing marks on all four channels, thus synchronizing the various frequency bands. Each channel circuit in the head-end unit has its own clock, which is phase locked to a master clock to synchronize all 4 channels. In addition, the head-end unit contains a fast digital phase lock loop to allow a quick phase lock on the first few bits of a data packet sent by a transmitting node. Each channel of the head-end return unit is phase locked to the same clock as the other channels, providing an additional element of synchronization. This combination of different synchronizing elements allows a practical time and frequency multiplexed system to operate.

Synchronization is maintained between timing marks through the use of a pseudo-silence pattern (alternating 1's and 0's) which is inserted at the head-end unit. This will allow a phase lock to be maintained at the individual nodes in-between timing marks by providing alternating data. The system thus allows each transmitting node to include only a single modem which can shift its frequency from one channel to another and still maintain synchronization. The only elements which need access to all channels simultaneously are the head-end return unit and the timing mark generator.

Maximum Likelihood Detector (MLD)

The digital phase lock loop is also referred to as a maximum likelihood detector (MLD). This device is necessary to quickly phase lock upon a data packet. A "pad" time where no transmissions occur is added by convention at the beginning of each packet to allow the MLD to reset. The MLD accepts the data after it has been demodulated and converted back into digital form. The data is provided into a shift register at a clock rate much higher than the data rate. A bit synchronizer then compares the various shifted outputs to determine which has an edge closest to the HRU clock. Once that determination is made, that shift register output is used for the remainder of the data packet, without further readjustment.

A further understanding of the nature and advantages of the present invention can be realized by reference to the remaining portions of this specification and the attached drawings.

BRIEF DESCRIPTION OF THE DRAWINGS

FIG. A-1 is a block diagram illustrating a typical physical organization of a communication network according to the present invention;

FIG. A-2 is a schematic diagram of portions of the network;

FIG. A-3 is a diagram showing the time structure of signals on the network;

FIG. A-4 is a schematic block diagram of a voice interface unit;

FIG. A-5 is a schematic block diagram of a network boot unit;

FIG. A-6 is a flowchart of the boot ROM code; and

FIGS. A-7A and A-7B are flowcharts of the NBU code;

FIG. B-1 is a schematic block diagram of the RxTx circuit shown in FIG. A-4;

FIG. B-2 is a schematic block diagram of the PCTL circuit shown in FIG. A-4;

FIG. B-3 is a diagram showing the general time structure for P-RAM access;

FIG. B-4 is a diagram showing signal input and output lines for the RxTx circuit, the PCTL circuit, and the P-RAM shown in FIG. A-4;

FIG. B-5 is a diagram showing time slot marker pulses;

FIG. B-6 is a diagram showing a delimiter search window;

FIG. B-7 is a diagram showing the relationship between transmit and receive frame timing;

FIG. B-8 is a diagram showing time slot pad times;

FIG. C-1 is a schematic diagram illustrating the transmission time differences to the head-end retransmission unit;

FIG. C-2 is a block diagram of the circuitry for a connection at a node of the system of FIG. A1;

FIG. C-3 is a diagram of the different frequency channels utilized in a communication system according to the present invention;

FIG. D-1 is a flow chart showing the claiming of a voice timeslot by an originating node;

FIG. D-2 is a flow chart showing the claiming of a reverse timeslot by a called node;

FIGS. E-1 to E-13 illustrate protocols for establishing and maintaining extension and trunk calls;

FIGS. E-14 to E-35 illustrate protocols for implementing features invoked by the user;

FIGS. E-36 to E-39 illustrate protocols for terminating calls;

FIG. F-1 is a block diagram of the HRU and its connection to the trunk interface units;

FIG. F-2 is a block diagram of the phase lock synchronization of the four HRU channels;

FIG. F-3 is a block diagram of a maximum likelihood detector (MLD);

FIGS. F-4 and F-5 are block diagrams of one channel of the HRU; and

FIG. F-6 is a block diagram of the interface between the HRU and the trunk cards.

BRIEF DESCRIPTION OF THE TABLES

Table A-1 is a list of abbreviations used in the application;

Table A-2 sets forth the packet formats;

Table A-3 is a map of the packet RAM ("PRAM");

Table A-4 sets forth the boot image format;

Table A-5 sets forth the boot request signalling packet ("BRSP") format; and

Table A-6 sets forth the boot control signalling packet ("BCSP") format.

BRIEF DESCRIPTION OF THE APPENDICES

The following appendices were filed with the present application, and are available in the file, but are not part of the printed patent.

Appendix 1 is a specification for the transport layer software, setting forth the different transaction types supported.

Appendix 2 is a specification of the software in the DRAM for controlling the communications.

Appendix 3 is a specification of the firmware for "Spike."

Appendix 4 is a detailed specification of procedures for registration and de-registration of Voice and Trunk Interface Units.

DESCRIPTION OF THE PREFERRED EMBODIMENT

Network Overview

Table A-1 provides a list of abbreviations used in the application.

FIG. A-1 is a block diagram illustrating a communication network 10 based on a bus medium 12. Bus medium 12 typically has the physical topology of a tree structure with a number of branches 12' to which various network nodes are coupled. The primary function of the network as described herein is to support voice communication among users on the network and between such users and the public switched network. However, network 10 may also be used for data and video as well. The network contains no central intelligence for allocating bus resource. Rather, each node has its own intelligence providing it the capability of vying for and claiming bus resource as needed.

The network nodes include a plurality of voice interface units ("VIU's") 20, each shown with one associated telephone 22, a trunk interface unit ("TIU") 25 having a plurality of trunk lines 27 for coupling to the public switched network, an attendant interface unit/console ("AIU") 35, one or more network boot units ("NBU's") 40, each with its associated non-volatile storage such as a hard disk 42, and one or more timing mark generators ("TMG's") 45. Bus medium 12 is coupled to a head end retransmission unit ("HRU") 50. An I/O processor ("IOP") 51 couples TIU 25 to HRU 50. A network manager workstation ("NMWS") 52 with an associated hard disk 53 is coupled to the NBU and its disk. A VIU may be single-port device with one phone as shown, or may be a multiple-port device (up to 24 ports) with each port capable of supporting a phone.

In a present implementation, NBU's 40 and HRU are physically located within the same cabinet as TIU, and timing mark generator 45 is incorporated into NBU 40. Thus there are no separate enclosures for TMG 45, NBU 40, or HRU 50.

Each node has associated address information. This includes a 6-byte physical unit address ("PUA") which is a hardware embedded serial number unique to that node with respect to any other node in any network made by the same manufacturer. Uniqueness with respect to nodes made by different manufacturers can be guaranteed by agreement between the manufacturers or the establishment of a central PUA issuing authority.

Nodes can also be assigned a 2-byte local unique address ("LUA") by the network manager. The LUA is unique with respect to other nodes at a given customer site. It is possible to address all nodes at the same time with a broadcast LUA having a hexadecimal value FFFF.

Nodes can also be assigned a 2-byte system link extension ("SLE"). The same SLE may be assigned to multiple nodes, thereby permitting group addressing. Conversely, a node supporting multiple phones may have more than one SLE.

Address comparison is performed as follows. Each node contains a 64-bit hash table for each of PUA, LUA, and SLE address comparison. Since there are more than 64 possible addresses, the hash table mechanism does not provide a unique selection, but rather a first-level filtering only. Additional address selection is carried out by higher level software. For the PUA and LUA hash tables, and for the SLE hash table where the node has a single SLE, one bit is set, that bit being in the position corresponding to the numerical value of the last 6 bits of the cyclic redundancy check of the node's PUA, LUA, or SLE, as the case may be. For a node with more than one SLE, the SLE hash table has bits set for the multiple SLE's, the positions being determined as described above. Due to the lack of uniqueness, the number of bits set may be less than the number of SLE's.

Associated with each phone is a 2-byte configuration identifier ("CID"), which is stored in RAM and identifies the configuration (feature set, extension) for that phone. CID's are created by the system administrator at the NMWS. A unit's phone extension number can be used as the CID but this does not necessarily need to be true. Since each phone needs a configuration, multiple-phone VIU's will have multiple CID's. A special CID (value 0) is used to identify a configuration that if loaded into a unit, limits the unit's operation to acquiring manually entered CID's.

Bus medium 12 is preferably a broadband coaxial cable capable of supporting a number of frequency channels, each defined by a carrier frequency on which signals can be superimposed. Each user device can broadcast its transmissions on the cable toward HRU 50. HRU 50 operates to receive signals on a first set of channels and retransmit them on a second set. Thus, two-way communications may be implemented on a single cable by frequency division multiplexing the available RF cable spectrum. The channels are preferably 6 MHz wide, with the transmitting channels in the range from 5–108 MHz and the receiving channels in the range of 175–400 MHz. In the preferred embodiment, there are four channels, each with an associated transmit frequency and receive frequency band, and each node is capable of operating on any of the channels. Each node is assigned a home channel on which it normally listens when not participating in a communication. Boot transmissions typically occur on a designated boot channel.

HRU 50 transmits a pseudo-silence pattern (PSP) (e.g. alternating 1's and 0's) when there is no incoming data. This allows the VIU's in the network to always have an incoming data stream, which adds to the stability of the PLL's in all of the VIU modems and provides a less expensive and more efficient receiver and bit sync circuit. Additionally, the PSP acts as a "not" carrier detect, and the VIU's may consider the given channel as free when the PSP is received.

HRU 50 implements a data reclocking scheme to provide a constant phase data signal to the nodes. Since the upstream transmission is supplied by an unknown source with regard to phase (since the relative phase of the incoming packets varies with the physical position of the originating node), HRU 50 uses a Maximum Likelihood Detector (MLD) to reclock the downstream transmission. The MLD detects the rising edges in the first four bits of packet preamble, and then delays the data path by a time of 0 to 1 bits (in increments of 0.062 bits) to properly align the center of the data bits and the edge of the sampling clock. With this method, no frequency lock is required since the downstream transmissions of HRU 50 are the system's source of master clock.

The described functions can be implemented with a high speed digital phase-locked loop that responds to the received packet's needs within a four-bit time span during the packet preamble. The selected delay will remain locked until a loss of carrier is detected at the headend which will be interpreted as an "End of Packet". HRU 50 will then begin transmitting pseudosilence and reset the MLD for the next packet.

Thus, while network 10 is physically and topologically organized as a tree, it is logically organized as a bus. The bus is logically a dual linear bus having transmit and receive channels 55 and 57 as shown schematically in FIG. A-2. While only two VIU's and two NBU's are shown, an actual system might have a hundred or more VIU's. The representation of FIG. A-2 is schematic only, since there are not actually two physical buses, but rather a single broadband communications medium capable of supporting a number of communication channels.

Network Timing

FIG. A-3 is a diagram showing the time structure of signals on the network. TMG 45 provides a series of timing mark packets ("TM's"), transmitted simultaneously on all four channels, at 1-ms intervals, thereby defining a series of 1-ms frames. The TM's also indicate whether they are on a boot channel, and provide the channel number.

The frames are logically grouped into pairs, each containing first and second frames, designated the forward frame and the reverse frame, with each pair defining a 2-ms cycle. Each frame consists of a 10-byte timing mark, a 71-byte (60 data bytes) signalling packet ("SP"), and 28 19.5-byte (16 data bytes) voice timeslots ("VTS's"), each capable of containing a voice packet ("VP"). Each packet interval consists of a preamble of alternating 1's and 0's, a delimiter, a data field, and a pad. The delimiter is a binary code specifying whether the packet is a TM, a VP, an SP, a claiming voice packet ("CVP"), or a boot packet ("BP"), and is distinguishable from the preamble in that any 3-bit string has at least two bits in a row the same. Table A-2 provides a list of the various packet formats.

VP's are used to provide voice communication and contain binary encoded (pulse code modulation— "PCM") speech from a specific phone conversation. They are transmitted every cycle during the course of the conversation. An ongoing telephone conversation entails having VP's for one direction of the communication carried on a VTS of the forward frame and for the other direction of the communication on the corresponding VTS for the reverse frame. VP's contain no computer recognizable information. They are merely reconstructed into voice at the receiving node. A special voice packet, the CVP, is used to reserve a VP timeslot for data transmission/reception.

SP's are used for communications between nodes and contain computer recognizable information pertinent to the control of the network. While specific types of SP's will be discussed below, it is noted that an SP contains a data portion which includes a link header and a transport header as well as information specific to the type of SP. The link header contains source and destination address information, specifically: 2 bytes of destination address information (enough for an LUA or an SLE); an address control byte containing two 2-bit codes specifying the destination and source address types (PUA, LUA, or SLE); a length byte; 4 bytes for the rest of the PUA if the destination address is a PUA; and 2 or 6 bytes of source address information.

BP's are used in boot operations to communicate configuration data and operating code from an NBU to other nodes. BP's are broadcast in the VTS's normally occupied by VP's.

Each node is characterized by a skew time related to its physical position on the bus. Skew time refers to the differential propagation delays resulting from the fact that the different nodes are at different distances from HRU 50. The nodes most remote from the HRU will receive the timing marks latest in time, and would, if they merely synchronized their transmissions to the timing mark, transmit relatively late compared to nodes nearer the HRU. Accordingly, the further a node is from HRU 50, the earlier it must transmit relative to the timing marks to be in synchronization. A procedure whereupon each node determines its own skew time is described later in this application. In essence, each node, on power-up, transmits an SP immediately upon receiving a timing mark, and counts the number of bit times (1/(5.018 MHz)) until it receives the same SP (as retransmitted by the HRU). This defines twice that node's skew time, and subsequent transmissions will be advanced by the skew time.

In the event that there are more than one TMG in the network, the TMG's arbitrate amongst themselves at power up to determine which is to become the master TMG. Each TMG waits a random length of time (up to about 50 ms), and then broadcasts TM's on all channels. If a TMG receives TM's that it sent, it assumes the status of master TMG. The other TMG's assume the status of backup TMG's and monitor the four channels to ensure that the master TMG is sending valid TM's. In the event that TM's on any channel stop for some number of consecutive frames, the backup TMG's arbitrate to become the new master TMG. The arbitration process is similar to that described above.

Basic Node Organization

The hardware for a given node in the network includes certain portions that are essentially common to all nodes and certain portions that are different for the different types of nodes. The description in this section will be in terms of one of VIU's 20 and one of NBU's 40.

FIG. A-4 is a block diagram illustrating one of VIU's 20, the function of which is to interface one or more phones to the network. VIU 20, like other nodes, must be able to communicate on any channel. Access to multiple channels (only one at a time) is provided by a frequency agile modem 70. VIU 20 further includes a CPU 72 and associated memories, a codec 75 and telephone interface 77, and a control/interface circuit 80.

Other types of nodes in the network share the same basic hardware organization in the sense of having the same control/interface circuit elements, CPU and associated memories, and modem. However, other types of nodes would not include codec 75 or telephone interface logic 77, and would have different operating software and configuration data stored in their associated memories. Some types of nodes (such as an NBU or a multi-port VIU) must be able to communicate on all channels at the same time, and are provided with a separate control/interface circuit and modem for each channel. Because each node uses the same basic set of network elements for all configurations, the network is modular and incrementally expandable for both small and large telephone systems.

The memories associated with CPU 72 (preferably an 80186 microprocessor) include a packet RAM ("PRAM") 2, a DRAM 85, and a boot ROM 87. Control/interface circuit 80 contains a receiver/transmitter ("RxTx") 90, a packet controller ("PCTL") 92, a 3-port memory controller 93, and a PCM highway 95. PCM highway 95 is a 1.544-MHz, serial, full duplex highway which provides 24 8-KHz 8-bit timeslots (much like a T1 carrier). Also included in control interface circuit is a timing mark state machine 97 (shown in phantom since it isn't used in the VIU). In a preferred embodiment, control/interface circuit 80 is implemented in a 2-chip set, one chip containing RxTx 90 and timing mark state machine 97, and the other containing PCTL 92, 3-port memory controller 93, and PCM highway 95.

Table A-3 provides a memory map of PRAM 82. The PRAM contains, among other things, transmit and receive ring buffers for the PCM highway timeslots, tables specifying which network VTS's are free and which are busy, and boot buffers 100a and 100b. Three-port controller 93 allows PRAM 82 to be accessed by RxTx 90, PCTL 92, and CPU 72. The 3-port controller is responsible for arbitration and control of all PRAM accesses, including accesses to buffers in PRAM 82 that hold incoming and outgoing packets.

RxTx 90 provides a 5.018-MHz serial interface to modem 70. It is at this interface that VP's and SP's are communicated. A phase-locked loop in modem 70 recovers the system clock information (5.018 MHz in two phases) and provides it to RxTx 90. The RxTx generates transmit and receive frame boundaries and the timeslot boundaries within each of the frames. In most cases it uses its received frame as the time base and starts its transmit frame a skew time before. RxTx 90 is also responsible for skew calculation, preamble insertion and removal, and delimiter insertion, removal, and recognition. RxTx 90 also interfaces to CPU 72.

PCTL 92 operates under control of RxTx 90 and is responsible for voice and tone buffering and routing between network 10 and PCM highway 95. PCTL 92 also supports tone generation (dial tone, ring back, DTMF). To send tones towards the handset, digitized samples of the tones are read from PRAM 82 and sent out on the codec bus. It also supports the transmission of tones to the network where DTMF tones may have to be sent.

A key function of control/interface circuit 80 is to route VP's, and to that end must keep track of the active VTS's on the network and map each of these active VTS's to one of the 24 voice ring buffers in PRAM 82. The ring buffers are then mapped one-to-one to the 24 PCM bus timeslots in order to establish a connection between the network VTS and the codec. For receiving data RxTx 90 removes the preamble and delimiter, performs a serial to parallel conversion, and passes the data to PCTL 92. The PCTL stores the data in the ring buffer and sends bytes to the codec as required. The ring buffers contain only the actual voice samples for VP's or boot data for BP's. For transmission, the PCTL receives PCM data samples from the codec, and stores them in the PRAM ring buffer. The PCTL thereafter provides the appropriate address information to RXTX 90, which appends a preamble and delimiter, performs a parallel to serial conversion, and transmits the data onto the network.

FIG. A-5 is a block diagram illustrating one of NBU's 40, the function of which is to download boot images (configuration data and operating software) to other nodes, referred to as boot consumers. As mentioned above, NBU 40 shares many common circuit elements with VIU 20 (and other nodes in the network). In particular, the NBU contains those elements described in connection with FIG. A-4 except codec 75 and telephone interface logic 77. While the NBU does not support telephones, it includes and uses the PCM highway to support conference calls. Those elements that do correspond are shown with the same reference numerals. Since, in the current implementation, timing mark generation is actually carried out by the NBU hardware, the NBU has four control/interface circuits and modems so as to be able to transmit TM's on all four channels simultaneously.

The NBU's CPU 72 interfaces with the NBU's associated hard disk 42 through a small computer system interface (SCSI bus interface) 105. The boot images are developed in an off-line development system and written onto floppy disks, which are loaded into NMWS 52 and stored on the NMWS hard disk. The boot images are then transferred to the NBU hard disk(s) independently of the network. Each NBU will typically have boot images for all of the nodes in the network.

General Software Organization

The software in a given node is organized in a layered structure based on the International Standards Organization ("ISO") Open System Interconnection Reference Model ("OSI"). The OSI model contemplates an organization having some or all of the following layers:

Physical;

Link;

Network;

Transport;

Session;

Presentation; and

Application.

As will be described below, some of the layers are implemented using both hardware and software. Moreover, certain of the protocols have attributes that do not allow them to be classified in any single layer. Each of the layers will be discussed briefly, while more expanded description will be reserved for those layers pertinent to the present invention.

The physical layer is concerned with the interaction between the nodes and the network communications medium. Thus, the physical layer encompasses the modem and cable.

The link layer supports communications between nodes on the network, and is implemented using both hardware (most notably control/interface circuit 80) and software. Some of the basic functions have been described above, some others will be described below in connection with the discussion of the operation of the network.

The link layer functions are as follows: monitoring TM reception for all nodes and supporting TM generation on certain devices; best effort delivery of SP's; selective filtering and verification of incoming SP's (using the hash tables); supporting boot buffer transfers; establishing, monitoring, and disconnecting voice circuits; transferring voice (with padding) from network to the codec; and transferring voice from the codec to the network; generating tone to the codec (with padding) and/or to the network; generating silence to the codec; performing diagnostics and reporting severe errors; and presenting statistics and minor errors gathered by the hardware.

The network layer provide a (channel) bridge for establishing communication between channels on the same cable, and between different cables, and will not be discussed further.

The transport layer is responsible for the reliable end-to-end delivery of data between host entities. This includes providing both best-effort and reliable datagram transfer services, built upon the service exported by the link layer. In a "pure" datagram delivery, transport makes a best effort to deliver an information (or a response) packet to the destination(s), but will not notify the requesting session entity if the delivery is not successful. A "reliable" datagram delivery entails delivery of a user information packet to the destination(s), with notification to the requesting session entity if transport is unable to deliver the packet. Transport also supports large data deliveries wherein a large data transfer request from a user entity is delivered to the destination(s) using a combination of both pure and reliable datagrams. If transport is unable to deliver the entire data without error, it will notify the requesting session entity. Appendix 1 is a specification for the transport layer software, setting forth the different transaction types supported.

The OSI model describes the session layer as the level that provides services required to establish and maintain connections between users across the network. It provides the following services: call establishment and disconnection functions between stations connected to a local area network; initiation and monitoring the voice communication path between the station set users; call establishment and disconnection functions for establishing voice communication between station users and the public switched network users; and implementing various end user features.

Depending on the type of node on which it is executed, the session layer has to provide different types of services to the higher layers. While it is possible to provide a common base code to some extent, the differences between such units as VIU's and NBU's make it difficult or impossible to use the same session software on these different types of nodes. However, all the nodes utilize the same set of services and interfaces provided by the lower layers.

The presentation layer is in general concerned with the user interface. With respect to the network software running in the VIU's, the presentation layer is concerned with the duration and format of all the tones a user may hear from the handset, as well as controlling keyboard interaction and the format of messages displayed on liquid crystal displays for those phone models so equipped. A substantial part of these functions is actually implemented in hardware.

In the TIU, the presentation layer is limited to tone generation and detection. On the NBU, the presentation layer functions are really incorporated in the NMWS.

The application layer is in general concerned with the user application. In the current embodiment, the only application level software implemented is the Network Manager. The Network Manager performs the following functions: node configuration, downloading of configuration and code images to the network; monitoring, display and storage of network events; network diagnostics; automatic route selection table generation; and remote network diagnostics.

The software for certain nodes (e.g., an AIU interface to a microcomputerized console or a VIU interfaced to a microcomputerized feature phone named "Spike") contains additional code to control the communications across the interface. Appendix 2 is a specification of the software in the DRAM for controlling the communications. Appendix 3 is a specification of the firmware for "Spike."

Call Setip, Maintenance, and Breakdown

Consider now a typical phone call from one VIU to another. A station set is taken offhook and a local extension number is dialed. Since there is no central intelligence assigning VTS's to the various nodes, the originating device must first capture one. The control/interface circuit keeps track of the status of all the VTS's (busy or free) and attempts to claim the forward half of a free VTS by transmitting a unique Claiming VP on that VTS and checking that it comes back intact. This assures that a VTS thought to be free is indeed free. All other nodes in the network see the Claiming VP on the VTS being claimed and change their PRAM-resident busy/free tables to specify that VTS as occupied.

Once the VTS is claimed, silence VP's are transmitted to maintain the circuit, and a Call Request SP is broadcast across the network. This SP is sent on all channels, and specifies the originator's home channel and the VTS that was claimed. This SP also contains information specifying the source LUA of the call originator and the desired group address (SLE) of the destination (since an extension number can appear at many stations, it is considered to be a group address type).

All other stations on the network receive the Call Request SP and compare the contents of the destination field within the packet to the extension numbers which are supported by the receiving station. The Call Request is ignored if no match exists. If the destination extension matches one of the extensions supported by the receiving station, and the destination is not busy, the destination sets itself to operate on the originator's home channel, after which an Accept SP is sent back to the originator with the receiving station's LUA.

Since the LUA of the accepting station is included in the Accept SP, the originating station will know the specific station which has accepted the call. Therefore, an Accept Acknowledgement SP is sent directly to the accepting station using LUA addressing to begin ringing at the destination station, and a ringback tone is sent to the originator's handset. When the destination station goes offhook, the reverse timeslot is claimed, indicating an answer. If the claiming is successful, an Answer SP is returned to the originating station. Silence VP's are now replaced with actual VP's. After the conversation is over and either party goes onhook, a Disconnect SP is sent by the terminating station and the connection is terminated. If the destination is busy, a Busy SP is returned to the originator and the exchange ends with the originator receiving a busy tone.

Network Boot Unit and Protocols

Nodes require the downloading of boot images when they are powered up, which occurs after a power failure, when they are first brought on line, or when they are disconnected and moved. Boot images are also downloaded when a new software release is to be installed on some or all of the nodes. Downloading typically occurs in two stages, first program code, and then configuration data. The program code is generally much longer than the data, and can be downloaded to a number of nodes at the same time. The configuration data is different for each node, and must be downloaded on an individual basis. As will be described below, a node, having received its code image requires its CID before it can request its configuration.

Table A-4 provides the format of a boot image file. Boot images are divided into blocks, with the size of each block depending on the size of boot buffers 100*a* and 100*b* in PRAM 82 (256 bytes each in the present implementation). As can be seen, the file contains an initial block having global information as to the boot image file, and a number of data blocks, each having the actual data and associated header information about the specific block (load address, block size, block number).

BP's, which occupy VTS's, are used to transmit boot images over the network. Each BP contains 16 bytes of data, which translates to a data rate of 64 kilobits/sec if only one VTS per cycle is used. In view of the possible large size of boot images, BP transmission and reception may occur on multiple VTS's, thereby providing higher data rates.

Boot transmissions occur in response to requests from boot consumers. Such requests are typically made when a node is powered up, either at the same time as the rest of the network, or after being connected to the network while the rest of the network has been running. A node requiring a boot image transmits a boot request SP ("BRSP") to request the image it needs. The NBU responds by sending boot control SP's ("BRSP") and BP's, as will be discussed in detail below.

Table A-5 sets forth the format for a BRSP. BRSP's are sent to an address permanently assigned to NBU's and contain image descriptor information specifying the memory image being requested.

Table A-6 sets forth the format of a BCSP. BCSP's are sent on all channels and contain boot control and image descriptor information. Boot control specifies which channel, frame, and VTS('s) are used to transmit the image. The image descriptor provides information about the memory image itself. This information is statically bound to each boot image and resides with the boot image on hard disk 42. It is generated in the development environment and included as the header of the boot image file. It is extracted by the NBU to create the BCSP.

On power up, the boot consumer executes the code stored in its boot ROM. FIG. A-6 is a flowchart of the boot ROM code. The node scans the various receiver frequencies to find a channel with timing marks. After identifying its unit type and boot channel, the node begins to receive and interpret SP's, waits for BCSP's identifying the necessary image, and transmits a BRSP if it does not receive the required BCSP within a certain random time interval (up to 50 ms). It performs its part of the boot operation according to the parameters specified in the BCSP.

FIGS. A-7A and A-7B are flowcharts of the NBU code. Before transmitting the boot image, the NBU claims one or more VTS' (in the same manner as the VIU claims a VTS in a voice call), and transmits (on all channels) boot control SP's ("BCSP's") containing boot control information and image descriptor information about the boot image being broadcast.

Multiple NBU's having the requested boot image arbitrate amongst themselves to decide which one is to respond to a BRSP. Upon receiving a BRSP, each NBU attempts to claim the service by adding the boot group address of the requested image and sending a BCSP with no VTS's allocated. If it receives its own BCSP (as determined by the source address) first, it will start the boot process by claiming one or more VTS's and sending a BCSP to the boot consumers. The downloaded image will satisfy multiple requests for the same image.

BCSP's are sent a predetermined amount of time before the actual transmission of the specified block so as to allow the boot consumers time to receive the image. They are also sent throughout the image transmission to allow other boot consumers to start receiving the image in the middle of the transmission, with a second transmission being used to fill in the missing parts. BCSP's are sent to group addresses, there being a group address assigned to each type of network unit. Boot ROM 87 in each unit, based on its unit type, can receive and filter for the corresponding BCSP.

There is also a procedure for downloading boot images to nodes that are not specifically requesting. This is initiated at NMWS 52, which causes the NBU to send an SP instructing nodes to take themselves out of service and then to come back up. On coming up, the nodes request the boot images as discussed above.

Boot packets are sent from and received into boot buffers 100a and 100b in PRAM 82. The control/interface circuit alternates between the boot buffers when retrieving or storing boot information, varying the delimiter to specify which buffer is to be used. There are two registers which control each direction of boot activity, the Tx and Rx boot buffer and boot pointer registers (referred to collectively as the boot registers). In actual practice, units will never both transmit and receive boot information, but this facility is provided for diagnostic purposes. The boot registers are typically zeroed by software before starting boot transmission or reception. PCTL 92 controls (writes to) these registers during the boot process, so software should not write to the boot registers while the boot operation is in progress.

The Tx boot buffer register specifies the boot buffer (0 or 1) from which the next BP is to be fetched. The Tx boot pointer register points to the location in that boot buffer of the next BP. The Tx boot buffer register is toggled immediately after the last byte in a given buffer is read by PCTL 92. The Rx boot buffer register points to the boot buffer (0 or 1) to which the next received BP is expected to be delivered. The buffer into which it is actually placed depends on the BP delimiter. The Rx boot buffer byte toggles after a BP is received which fills the current buffer, or immediately upon reception of a BP destined for the other boot buffer. The Rx boot pointer register always points to the next byte in the current boot buffer into which a BP is to be written.

As mentioned above, a node normally receives its code image first, followed by its configuration data. Before a node can request its configuration data it must have its CID. If the node has just been powered up, it doesn't have its CID. If the node is a TIU, it calculates the CID for each port based on its cabinet, slot, and port numbers. If the node is a VIU, it requests its CID from the NBU by sending a CID Request SP (with CID=0). A single-port VIU (needing only one CID) identifies itself by its PUA. A multiple-port VIU makes separate CID requests for each of its ports, identifying itself on each request by its cabinet and slot numbers as well as the port number. When all VIU's come up at once, they could flood the network with CID and configuration image requests. To alleviate network congestion, each device waits an amount of time based on its PUA before sending its CID request. If the requesting VIU has previously been installed on the system, the NBU has its CID in a table, and responds with a CID Response SP. The CID Response SP specifies the CID and a backoff time for the VIU to wait before sending its BRSP requesting configuration data. If the requesting VIU has come up for the first time, the NBU does not have its CID, and sends a CID Response SP (with CID=0).

The VIU then uses this zero value CID to get a special configuration that only allows CID entry from the phone; no phone calls are possible with this configuration. A user picking up the handset hears an "Enter CID" tone instead of a dial tone. The user must then invoke the feature code to enter a CID, and hears no tone until the CID is verified. The VIU software receives the CID, and sends a CID Request SP (with the non-zero CID) to register the CID with the NBU.

If the CID is unique on the network, the NBU responds with a CID Response SP that contains the CID. The VIU gives a "CID Confirmed" tone to the user. The VIU then requests the configuration image from the NBU. Once the configuration image has been received, the user gets a dial tone. If the CID is already registered by another device or is a reserved CID, the NBU sends a CID Response SP (with CID=0). This causes an error tone if the phone is still offhook. After the user hangs up, the "Enter CID" tone is produced when the phone is later taken offhook.

Once a single-port node has been registered on the network, that node, together with its phone, may be relocated to a different area and reconnected to the network. The attached phone will then automatically assume the same extension number and pre-configured features as at the previous location. The same is true if a multi-port VIU and all the attached phones are relocated, and also for any other kind of network node, regardless of whether they support phones, trunks or NBU's.

The network also supports de-registration and re-registration of nodes according to pre-configured criteria. Appendix 4 is a detailed specification of procedures for registration and de-registration of Voice and Trunk Interface Units. Varying modes of registration and re-registration are permitted. Thus, global registration and re-registration permits new phones to be added and existing phones to be re-registered at will, while the most secure mode permits nothing to be registered or re-registered.

RXTX/PCTL/PRAM Organization and Operation

FIG. B-1 is a more detailed diagram of RXTX 90. As shown therein, RXTX 90 comprises a modem interface 120, a modem receive state machine 124, a modem transmit state machine 128, a CPU interface 132, and a PCTL interface 136. RXTX 90 is synchronized to the network and therefore requests network-related data transfers.

Modem interface 120 packetizes and depacketizes all information going through control/interface circuit 80. This includes inserting/detecting delimeters and generating/ checking CRC's. The low level tasks of determining skew and maintaining the receive and transmit frame timing are also done here.

CPU interface 132 consists of interupt circuitry, command and status registers, and the microprocessor interface circuitry required to access them. In this embodiment, CPU interface 132 is designed to interface with the intel 80186 bus structure. To minimize the real-time load on CPU 72, CPU 72 is interrupted only when an event in which it is interested occurs.

PCTL interface 136 takes care of any buffering or timing considerations that might be necessary for receiving and transmitting data. PCTL interface 136 also communicates the necessary information with PCTL circuit 92 for accessing P-RAM 82. In this embodiment, PCTL interface 136 is directly coupled to the P-RAM 82 data bus.

Modem RX state machine 124 and modem transmit state machine 128 control the operations between modem interface 120, CPU interface 132 and PCTL interface 136. The operation of modem receive state machine 124 and modem transmit state machine 128 is governed by the timing inputs from modem interface 120 and the commands received from CPU interface 132. Modem receive state machine 124 and modem transmit state machine 128 interact with each other when a node is monitoring its own transmission (e.g. CVP's).

FIG. B-2 is a more detailed diagram of PCTL circuit 92. PCTL circuit 92 includes a RXTX interface 142, a network receive state machine 146, a network transmit state machine 150, a P-RAM interface 154, a PCM highway interface 158, a PCM highway state machine 162, and a CPU interface 166.

RXTX interface 142 is responsible for accepting commands from RXTX 90 and passing them to the appropriate network state machine 146 or 150. RXTX interface 142 also keeps track of the current network transmit and receive timeslots via network transmit and receive framing signals from RXTX 90.

Network receive state machine 146 translates the commands received from RXTX 90 involving network receive operations into the appropriate P-RAM 82 accesses. For example, one of these commands instructs network receive state machine 146 to deliver voice data to the P-RAM resident receive ring buffers from RXTX interface 142. Network receive state machine 146 is responsible for generating the required P-RAM addresses and for controlling the data flow between P-RAM 82, PCTL interface circuit 154, and RXTX interface 142. In addition, it maintains all state information necessary to perform these tasks, such as pointers into the TM, SP, CVP, and BP receive ring buffers. Network receive state machine 146 uses its own time slot interchange table to read the mapping between the network receive time slots and the receive ring buffers.

Network transmit state machine 150 translates commands from RXTX interface 142 involving network transmit operations into appropriate P-RAM 82 accesses. For example, one of these commands instructs network transmit state machine 150 to deliver voice data from the P-RAM resident transmit ring buffers to RXTX interface 142. Network transmit state machine 105 is responsible for generating the required P-RAM addresses and controlling the data flow between P-RAM 82, PCTL interface 154, and RXTX interface 142. In addition, it maintains all the state information necessary to perform these tasks, such as pointers into the TM, SP, CVP, and BP transmit ring buffers. The network transmit state machine 150 interprets the P-RAM resident time slot interchange which maps the network transmit time slots to the appropriate transmit ring buffer (and thus PCM highway timeslot). It then controls the actual data transfers from the P-RAM resident ring buffers to RXTX interface 142.

PCM highway interface 158 is responsible for keeping the PCM highway state machine 162 in sync with the PCM highway. It also controls transmissions onto the PCM highway. Data transmitted on the PCM highway should be encoded using mu-255 as per CCITT recommendation G.711.

PCM highway state machine 162 is responsible for transferring data between the P-RAM 82 ring buffers and PCM highway interface 158. As discussed below, there is one transmit and one receive ring buffer in P-RAM 82 for each of the 24 PCM highway time slots to buffer voice data between the network and the codecs. PCM highway state machine 162 interprets the mode command register in P-RAM 82 that selects idle, voice, or tone mode, and then transfers information as required. PCM highway state machine 162 also checks both transmit and receive ring buffers in P-RAM 82 on every access for overflow conditions, and takes appropriate action.

P-RAM interface 154 controls all accesses to P-RAM 82. It uses a slotted access scheme, reserving every other P-RAM access for PCM highway state machine 162. It reserves the remaining access slots for network transmit state machine 150 and network receive state machine 146 as shown in FIG. B-3. Each state machine must request each use of its access slots from P-RAM interface 154. Any slots not used by their owner are available for use by CPU 72.

CPU interface 166 services CPU requests to read from or write to command and status registers disposed within CPU interface 132. In addition, it routes requests to read from or write to P-RAM memory space to P-RAM interface 154. P-RAM interface 154 in turn provides a "ready" signal to CPU 72 when appropriate and transfers data as required. As the CPU operates using an unknown clock phase (and possibly frequency) compared to RXTX 90 and PCTL 92, all CPU requests are synchronized to the clocks within RXTX 90 and PCTL 92 before being executed.

FIG. B-4 is a more detailed diagram of the inputs and outputs for RXTX 90, PCTL 92, and P-RAM 82. The I/O terminals of modem interface 120 (FIG. B-1) in RXTX 90 (shown at the bottom of RxTx 90 in FIG. B-4), includes an M-5 input terminal 200 for receiving 5.018 megahertz clock pulses (used e.g. for data timing); an RXD input terminal 204 for receiving serial data (5.018 MBPS) from modem 70; a TXD output terminal 208 for transmitting serial data (5.018 MBPS) to modem 70; an ME output terminal 212 for providing a modem enable signal to modem 70; a RCH bus 216 for providing a 4-bit receive channel number to modem 70; a TCH bus 220 for providing a 4-bit transmit channel number to modem 70; an MF input terminal 224 for receiving a modem fault signal from modem 70; a MFR output terminal 228 for providing a modem fault reset signal to modem 70; an OSCE output terminal 232 for providing an oscillator enable signal; and a bidirectional M/SF terminal 236 for synchronizing the transmit frame with other RXTX circuits 90 at the node. M/SF terminal 236 is an output terminal when RXTX circuit is a master timing mark generator, and it is an input terminal when RXTX circuit 92 is a slave timing mark generator. Circuit timing will be discussed in more detail below.

The I/O terminals of CPU interface 132 (FIG. B-1) in RxTx 90 (shown at the top of RxTx 90 in FIG. B-4) include a bidirectional RTCPUD 242 bus for communicating 8-bit parallel status and command data with CPU 72; a RTCPUA bus 246 for receiving 5-bit addresses from CPU 72; an RTCS input terminal 250 for receiving a chip select signal from CPU 72; an INT output terminal 254 for providing interupt signals to CPU 72; an RDY output terminal 258 for providing "ready" signals to CPU 72; a BER output terminal 262 for providing bus error signals to CPU 72; an RTCPUR input terminal 266 for receiving CPU read pulses; and an RTCPUW input terminal 270 for receiving CPU write pulses.

The I/O terminals for PCTL interface 136 (FIG. B-1) in RXTX 90, and RXTX interface circuit 142 (FIG. B-2) in PCTL 92 include a TXS terminal 274 for communicating transmit frame synch pulses to PCTL 92 for marking transmit time slot boundaries; a TXFR terminal 278 for indicating to PCTL 92 whether the transmit frame is forward or reverse; an RXS terminal 282 for communicating receive frame synch pulses to PCTL 92 for marking receive frame time slot boundaries; an RXFR terminal 286 for indicating to PCTL 92 whether the current receive frame is forward or reverse; an RFL terminal 290 for indicating to PCTL 92 whether the receive frame is locked; a PW terminal 294 for providing signals to enable RXTX 90 to communicate directly with P-RAM 82; a synch terminal 298 for providing signals to synchronize the state machines within PCTL 92 with the state machines within RXTX 90; a 5-bit CMD bus 302 for communicating RXTX 90 commands to PCTL 92; and a bidirectional PD bus 306 which is an 8-bit data bus for accessing P-RAM 82. PD bus 136 is coupled to one port of 3-port controller 93. When more than one channel is to be accommodated in a device, multiple RXTX and PCTL circuits communicate with each other using the foregoing terminals. In that case, the terminals bay be broadly described as an interchannel bus (ICB).

The I/O terminals of CPU interface 166 (FIG. B-2) in PCTL 92 (shown at the top of PCTL 92 in FIG. B-4) include a bidirectional PCPUD bus 320 which communicates with the lower 8 bits of the 80186 data bus; a PCPUA bus 324 for receiving the address bits required to access PCTL internal registers and P-RAM 82; a CRS input terminal 328 for receiving signals indicating that CPU 72 is accessing P-RAM 82; a CPS input terminal 332 for receiving signals indicating that CPU 72 is accessing the PCTL 92 internal registers; a CRD input terminal 336 for receiving the CPU read signal; a CWR input terminal 340 for receiving the CPU write signal; a CRDY output terminal 344 for indicating to CPU 72 that the PCTL 92 internal register or P-RAM 82 access requested by CPU 72 has completed and valid data is available or has been accepted; and a PBER output terminal 348 for indicating that the PCTL 92 access requested by CPU 72 has not completed in a timely manner, thus ending the CPU cycle. The signals on PBER terminal 348 can be used either to generate a "bus error" or nonmaskable interupt to CPU 72.

The I/O terminals of PCM highway interface 158 (FIG. B-2) of PCTL 92 (shown on the right hand side of PCTL 92 in FIG. B-4) include an RPCM terminal 360 for transmitting data to codec 75; a TPCM terminal 364 for receiving data from codec 75; a PCLK input terminal 368 for receiving a 6.176 megahertz clock used to control the PCM highway interface; and a PCLK terminal 372 for establishing the 1.544 megahertz clock used to transmit and receive data on PCM highway 95. The signals on PCLK terminal 372 are output by PCTL 92 when a "PCM highway master" bit is set in a PCTL mode register discussed below. PCM highway interface 158 further includes a TSO terminal 376 for indicating that the PCTL 92 internal PCM highway time slot counter should be reset to time slot 0 on the next 6.176 megahertz rising clock edge. The signals on this line are output by PCTL 92 when a "PCM highway master" bit is set in the PCTL mode register. A TXEN terminal 380 provides signals to codec 75 indicating it should begin transmitting data on a current time slot; and a TOE terminal 384 provides signals to codec 75 to cause codec 75 to enable its output drivers to PCM highway 95. The signals on TOE terminal 384 typically are required when using codecs which cannot generate the required transmit PCM highway time slot timing using only the signals on TXEN terminal 380. A RXEN terminal 388 provides a signal which informs codec 75 to receive data from the PCM highway in a current time slot. A PTS bus 292 provides the current 5-bit time slot number on the PCM highway. A 4-bit PST bus 396 provide the current state of the PCM highway state machine. It is primarily used during chip test.

The I/O terminals for P-RAM interface 154 (FIG. B-2) in PCTL 92 include a 16-bit PA bus 402 for addressing P-RAM 82; a PCS terminal 406 for providing a chip select signal to P-RAM 82; a PWE terminal 410 for providing a write enable signal to P-RAM 82; and a POE terminal 414 for providing an output enable signal to P-RAM 82. These terminals are coupled to one port of 3-port controller 93.

Control/interface Circuit Commands

To understand how control/interface circuit 80 functions, and to understand the organization of P-RAM 82 and the command/status registers in RXTX 90 and PCTL 92, it is helpful to list the commands which occur within control/ interface unit 80. These commands may be separated into three categories: network commands processed by RXTX 90, PCM highway commands processed by PCTL 92, and RXTX/PCTL commands for communication between RXTX circuit 90 and PCTL circuit 92.

Network Commands

The following is a list of network commands:
Transmit timing mark (TX TM);
Transmit signalling packet (TX SP);
Transmit claiming voice packet (TX CVP);
Transmit voice packet (TX VP);
Transmit boot packet (TX BP);
Transmit silence (TX Silence);
Receive timing mark (RX TM);
Receive signalling packet (RX SP);
Receive voice packet (RX VP); and
Receive boot packet (RX BP).

PCM Highway Commands

The following is a list of PCM highway commands:
Transmit idle;
Transmit voice;
Transmit tone;
Transmit receive PCM highway data;
Receive idle;
Receive voice with gain switching;
Receive tone with gain switching;
Receive long tone without gain switching;
Receive short tone—terminate this cycle;
Receive long tone—terminal this cycle.
The RXTX/PCTL commands will be discussed later.

P-RAM ORGANIZATION

To support the foregoing commands, P-RAM 82 is organized as follows. As noted in Table A-3, the addresses are listed in hexadecimal. The numbers in parenthesis following the block definition is the number of bytes in the block.

| Page Number PA<13:18> | Function |
|---|---|
| 0 -> 7 | These pages contain the actual Tx and Rx ring buffers. There is one Tx and one Rx buffer for each timeslot on the PCM Highway. Each buffer is 32 bytes long. This prevents the bit shifting performed by the HRU 50 reclocking mechanism from causing the PCM highway to receive certain data samples twice and missing others entirely. The individual buffers are located as follows:<br>PA<10:6>= PCM Highway timeslot number<br>PA<5> =<br>0 - Transmit (to network) direction<br>1 - Receive (to codec) direction<br>PA <4:0>= Location (0 to 31) in each ring buffer |
| 8 | This page contains the 8 byte command blocks for each PCM Highway timeslot used by the PCM Highway state machine. These command blocks include the actual command as well as the ring buffer pointers and the vectors to tone and gain pad buffers. It is organized as follows: |
| | PA <7:3> - PCM Highway timeslot number<br>PA<2:0> =<br>0 - PCM Highway timeslot command<br>1 - Gain switching pad page number<br>2 - Tone page number<br>3 - Current pointer into tone buffer<br>4 - PCM Hwy Rx Rd pointer and state<br>5 - Network Rx Wr pointer<br>6 - PCM Hwy Tx Wr pointer and state<br>7 - Network Tx Rd pointer |
| 9 | This page contains four tables, located as follows:<br>PA <7:6> =<br>0 - Network Transmit active Table<br>PA<5> =<br>0 - Forward Frame timeslot<br>1 - Reverse Frame timesiot<br>PA<4:0>= Voice Timesiot Number (2 through 29)<br>1 - Network Receive Active Table<br>PA<5> =<br>0 - Forward Frame timeslot<br>1 - Reverse Frame timeslot<br>PA<4:0>= Voice Timeslot Number (2 through 29)<br>2 - Transmit Timing Mark Buffer. This buffer contains the data to be sent during a timing mark if this control/interface circuit is configured as a TM Master (discussed below). The bytes are written into this buffer by the CPU, starting at location 0, in the order they are to be sent.<br>3 - Receive Timing Mark Buffer. This buffer contains the data received during the last timing mark. The data is stored, starting at location 0, in the order it is received from the network. |
| OA | This page contains the SP transmit and receive data buffers. They are located as follows:<br>PA<7> =<br>0 - SP Transmit Data Buffer. This buffer contains the data to be sent out during the next Tx SP command. The data should be sorted, starting at location 0, in the order it is to be transmitted. The first three bytes are assumed to be two least significant bytes of the destination address and the control byte. Except for the first SP after a reset, all Tx'd SPs will transmit bytes 0 -> 59 from this buffer and then append a CRC.<br>1 - SP Receive Data Buffer. This buffer contains the last SP received from the network. If the "SP Rx'd" bit is set, the SP |

| Page Number PA<13:18> | Function |
|---|---|
| | has passed the Rx'd SP hash and its Rx'd CRC checked, and will not be overwritten by new Rx'd SPs until this bit is cleared. The Rx SP hash circuitry assumes the first three bytes of the SP are as mentioned above. |
| 0B | This page contains the following four tables: PA<7:6> = 0 - Busy/Free Table. This table indicates whether there is activity on each Network timeslot. The value in each entry is the consecutive number of cycles in which no activity has been sensed on the timeslot. This value pegs at 255. This table will not be valid until 255 cycles after a receive modem channel change (however it can be used after waiting the "Free threshold" number of cycles after the channel change). PA<5> = 0 - Forward Frame timeslot 1 - Reverse Frame timeslot PA<4:0> = Net Rx timeslot number 1- Receive SP Hash Table. These 32 bytes (256 bits) contain the hash tables for each of the four SP address spaces (one per channel). The hash table is computed and written by the CPU reflecting the network addresses for which it is listening. PA<5> = 0 PA<4:3> - Address Space number. PA<2:0>: - Hash value. 2 - Claiming Voice Packet Data buffers. The transmit buffer contains the data to be transmitted during the next Tx CVP command. The first 16 bytes of this buffer are transmitted onto the network during the CVP. The receive buffer contains the 16 bytes received from the network during the CVP. PA<5> = 0 - Transmit CVP buffer. 1 - Receive CVP buffer. 3 - TX'd CRC table. This table contains the CRCs of all packets transmitted the past frame. It is used exclusively by control/interface 80 to monitor collisions (TMs, SPs, and CVPs) and bit errors (normal VPs). |
| 0C | This page contains the 26 byte Transmit Boot Buffer 0. |
| 0D | This page contains the 256 byte Transmit Boot Buffer 1. |

| Page Number PA<13:18> | Function |
|---|---|
| 0E | This page contains the 256 byte Receive Boot Buffer 0. |
| 0F | This page contains the 256 byte Receive Boot Buffer 1. |
| 10 | This page contains the timeslot interchangers (TSIs) used by the Network Tx and Rx state machines to find the PCM Highway ring buffer it should use for a given network timeslot. It is organized as follows: PA<7:6> = 0 - Network Receive Machine TSI 1 - Network Transmit Machine TSI 2,3 - Unused PA<5> = 0 - Forward Frame timeslot 1 - Reverse Frame timeslot PA<4:0> = Network timeslot number Data<4:0> = Ring buffer to be used |
| 11 -> 1F+ | These pages are used to hold individual ones or gain tables. The CPU selects one of these pages, writes the tone or gain table in the page, and then places this page number in byte 1 or 2 of the desired PCM Highway timeslot command block in page 8. When the command itself is written to byte 0 of the same block, the PCM Highway state machine will use the referenced tone and/or gain table. In the case of receive-only tone modes, multiple pages are used to hold a single tone. |

As noted above, P-RAM 82 contains not only the ring buffers used for transmitting the actual data between codec 75 and modem 70, but a number of command and status byte locations. The following tables and descriptions provide the bit assignments for the latter.

PAGE 8

PCM Highway Timeslot Command (PA<2:0>=0)

| X | X | X | X | Lock1 | Lock0 | TM Window | C_M/S |
|---|---|---|---|---|---|---|---|
| b7 | b6 | b5 | b4 | b3 | b2 | b1 | b0 |

TABLE B-1

The bits are defined as follows:

| Bits | Name | Function |
|---|---|---|
| <2:0> | PCM Hwy Rx Timeslot | These bits command the PCM Highway state machine to perform a sequence of operations for this Receive PCM timeslot ("receive" from the codec's point-of-view). The options are:<br>0 - Idle; no transfers. Any voice data received from the network is discarded.<br>1 - Transfer Voice from this time-slot's receive (from Network) ring buffer through the gain pad Highway.<br>2 - Transfer Tone (from P-RAM tone buffer after passing through gain pad to PCM Highway).<br>3 - Transfer Long Tone (>256 bytes) to PCM Highway.<br>4 - Same actions as "0".<br>5 - Same actions as "1".<br>6 - Transfer Tone (from PRAM tone buffer) after passing through gain pad to PCM Highway - stop after this tone cycle.<br>7 - Transfer Long Tone (>256 bytes) to PCM Highway - stop after this tone cycle. |
| <4:3> | PCM Hwy Tx | These bits command the PCM Highway state machine to perform a sequence of operations for this Transmit PCM timeslot ("transmit" from the codec's point-of-view). The options are:<br>0 - Idle; no transfers. Any voice data received from a codec or SPU is discarded.<br>1 - Transfer Voice from PCM Highway to this timeslot's transmit (to Network) ring buffer.<br>2 - Transfer Tone retrieved for this timeslot's Rx Command (as read from tone buffer before level switching) to transmit ring buffer (If the Rx command is not one of the "tone" commands, this Tx command will place garbage in the transmit ring buffer).<br>3 - Transfer Receive PCM timeslot information to this timeslot's transmit ring buffer. (If this PCTL is transmitting onto the PCM Highway during the receive time-slot, this command loops the data back.) |
| 5 | Rx PCM Highway Output Enable | This bit, when set, enables PCTL to actually transmit onto the Receive PCM highway during this PCM timeslot. Hence, the receive information retrieved by the PCM Hwy state machine is shifted onto the receive highway destined for the codecs. If this bit is zero, any data retrieved by the state machine is not actually transmitted as the output buffer stays tri-stated. This bit must |

TABLE B-1-continued

| | | |
|---|---|---|
| | | only be set if this PCTL chip is to transmit onto this timeslot. At all other times it must be zero. If multiple PCTL chips are driving a single Receive PCM Highway, this bit must only be set in at most one PCTL's P-RAM for each PCM Highway timeslot. |
| 6 | Generate Codec Transmit Enbl | This bit, when set in the command byte of timeslot N, causes the PCTL chip to generate a transmit enable to the attached codec in timeslot N. These enables are actually given only if the appropriate bit in the PCTL Mode register is set (see below). |
| 7 | Generate Codec Receive Enable | This bit, when set in the command byte of timeslot N, causes the PCTL chip to generate a receive enable to the attached codec in timeslot N. These enables are actually given only if the appropriate bit in the PCTL Mode register is set. |

Gain Switching Pad Page Number (PA<2:0>=1)

| TM Int | X  | X  | X  | X  | Multi TMs | 1ms | TMs Missed |
|--------|----|----|----|----|-----------|-----|------------|
| b7     | b6 | b5 | b4 | b3 | b2        | b1  | b0         |

TABLE B-2

| Bits  | Name     | Function |
|-------|----------|----------|
| <7:0> | PAD Page Number | These bits form the page number of the gain switching PAD to be used for this PCM Highway timeslot. In the case of a receive-only tone command, which does not involve a PAD operation, this byte contains the first page of the tone. |

Tone Page Number (PA<2:0>=2)

| Cmd1 | Cmd0 | F  | R  | SP3 | SP2 | SP1 | SP0 |
|------|------|----|----|-----|-----|-----|-----|
| b7   | b6   | b5 | b4 | b3  | b2  | b1  | b0  |

TABLE B-3

| Bits  | Name             | Function |
|-------|------------------|----------|
| <7:0> | Tone Page Number | These bits form the page number of the Tone to be used for this PCM Highway timeslot command. In the case of a receive-only tone, which generates a tone requiring multiple pages of P-RAM, this byte is the tone page currently being read. |

Current Pointer Into Tone Buffer (PA<2:0>=3)

| Tx 3 | Tx2 | Tx1 | Tx0 | Rx3 | Rx2 | Rx1 | Rx0 |
|------|-----|-----|-----|-----|-----|-----|-----|
| b7   | b6  | b5  | b4  | b3  | b2  | b1  | b0  |

TABLE B-4

| Bits | Name | Function |
|---|---|---|
| <7:0> | Tone Pointer | This byte is the pointer into the tone buffer being used for this PCM Highway timeslot command. It points at the next tone sample to be read by the state machine and sent to the codecs and/or the transmit ring buffer. It is reset to zero when it reads a tone sample of 0 (negative full-scale). Hence, this value is used to start another cycle of the tone buffer. Any real samples equal to 0 in the tone should be changed to 01h before being used. The sample read as 0 will be transmitted as 0FFh (zero), so the tone should be written into the buffer such that its last sample is zero (0FFh). If a "stop after this cycle" tone mode is selected via the PCM Hwy Rx Timeslot Command, the tone will be sent out normally until the end of the current tone cycle; the pointer will then remain pointing at the 0 tone sample rather than being reset to zero, thus sending silence (0FFh) to the Rx PCM Hwy (and the Network if so selected) until the PCM Hwy Rx Timeslot Command is changed. |

PCM Hwy Rx Read Pointer and State (PA<2:0>=4)

| S Int | X | TX SSP | Not Seen | CRC MMatch | Tx Good | Rx Error | Rx Good |
|---|---|---|---|---|---|---|---|
| b7 | b6 | b5 | b4 | b3 | b2 | b1 | b0 |

TABLE B-5

The bits in the PCM Hwy Rx Read Pointer should be initialized to all zeros before setting up a connection for a given PCM Highway Receive timeslot. CPU 72 should not write to this location during the connection, as doing this could corrupt PCTL State Machine operation.

| Bits | Name | Function |
|---|---|---|
| <4:0> | PCM Receive Read Pointer | This is the next location to be read by the PCM Highway state machine from the receive ring buffer for this PCM Highway timeslot. |
| <6:5> | PCM Receive State | These bits indicate the state of the PCM Receive Read process for this timeslot. They are interpreted as follows:<br>0 - Idle state. Network Rx Write Pointer is equal to PCM Rx Read Pointer. Silence is given to codec, and the PCM Rx Read pointer is left unchanged.<br>1 - Filling ring buffer. This state is entered from state 0 when the pointers are detected not equal (i.e. the Network Rx Write Pointer has changed.) Silence is given to codec, and the PCM Rx Read pointer is left unchanged. State 2 is entered always the next time the PCM Highway state machine processes this timeslot.<br>2 - Normal mode. The Network Rx Write pointer is checked against the PCM Rx Read pointer - if they are equal, silence is given to the codecs and state 0 is entered. Otherwise, the PCM Rx Read pointer is used to read a byte of information from the receive ring buffer, the byte is sent to the codec, and the pointer is incremented (mod 32) and written back to P-RAM. |
| <7> | PCM Rx Read Slip | This bit, if set, indicates that state 0 has been entered from state 2 (see above) at least once since this connection was established. |

Network Rx Write Pointer (PA<2:0>=5)

| Cmd1 | Cmd0 | F/R | TS4 | TS3 | TS2 | TS1 | TS0 |
|---|---|---|---|---|---|---|---|
| b7 | b6 | b5 | b4 | b3 | b2 | b1 | b0 |

TABLE B-6

The bits in the Network Rx Write Pointer should be initialized to all zeros before setting up a connection for a given PCM Highway Receive timeslot. CPU 72 should not write to this location during the connection, as doing this could corrupt PCTL State Machine operation.

| Bits | Name | Function |
| --- | --- | --- |
| <4:0> | Network Rcv Write Pointer | This is the next location in the receive ring buffer to be written by the Network Rx State Machine. This machine always writes 16 bytes at a time, and updates the pointer after each burst write. Hence, its value should always be 0 or 16. |
| <7> | Network Rx Slip | This bit, when set, indicates that there has been at least one instance where the Network Rx State Machine was active and could not write an incoming VP into the appropriate receive ring buffer because the PCM Rx Read Pointer would be passed. The Network Rx State Machine, when logging this error, inhibits writes to the ring buffer and does not change the pointer. |

PCM Hwy Tx Write Pointer and State (PA<2:0>=6)

| CVP Int | X | X | X | Not Seen | Block | CRC MMatch | Tx Good |
| --- | --- | --- | --- | --- | --- | --- | --- |
| b7 | b6 | b5 | b4 | b3 | b2 | b1 | b0 |

TABLE B-7

| Bits | Name | Function |
| --- | --- | --- |
| <4:0> | PCM Transmit Write Pointer | This is the next location to be written by the PCM Highway state machine to the transmit ring buffer for this PCM Highway timeslot. |
| <5> | PCM Transmit State | This bit indicates the state of the PCM Transmit Write process for this timeslot. It is interpreted as follows:<br>0 - Idle state. Network Tx Read Pointer is equal to Pcm Tx Write Pointer. Received codec data is discarded, and the PCM Tx Write pointer is left unchanged.<br>1 - Normal Mode. This state is entered from state 0 when the pointers are detected not equal (i.e. the Network Tx Read Pointer has changed.) When this state is entered, the current PCM Tx Write pointer is summed with 19 modulo 32 (to place write pointer just ahead of read pointer), and the codec data is written to location. The PCM Tx Write pointer is then incremented from that value (mod 32) and written back to P-RAM.<br>Every subsequent time this timeslot is accessed, the PCM Tx Write pointer iscompared to the Net Tx Read pointer -if they are equal, the received codecdata is discarded and idle state (0)is entered. Otherwise, the PCM TxWrite pointer is used to write the codec information to the transmit ringbuffer. The pointer is then incremented (mod 32) and written back to P-RAM. |
| <7> | PCM Tx Write Slip | This bit, if set, indicates that state 0 has been entered from state 1 (see above) at least once since this connection was established. |

Network Tx Read Pointer (PA<2:0>=7)

| VP Int | X | X | X | X | RX F1F0 | Tx F1F0 | Disc |
| --- | --- | --- | --- | --- | --- | --- | --- |
| b7 | b6 | b5 | b4 | b3 | b2 | b1 | b0 |

45

TABLE B-8

The bits in the Network Tx Read Pointer should be initialized to all zeros before setting up a connection for a given PCM Highway Transmit timeslot. CPU 72 should not write to this location during the connection, as doing this could corrupt PCTL State Machine operation

| Bits | Name | Function |
| --- | --- | --- |
| <4:0> | Network Tx Read Pointer | This is the next location in the transmit ring buffer to be read by the Network Tx State Machine. This always reads 16 bytes at a time, and updates this pointer after this burst read. Hence, its value should always be 0 or 16. If data is requested for transmission when the corresponding PCM Hwy Tx Write Pointer's state is idle, data is delivered from the Tx silence buffer (rather than from the transmit ring buffer), and the Net Tx Rd Pointer |

TABLE B-8-continued

| | | |
|---|---|---|
| | | is updated as if data had been read. |
| <7> | Network Tx Slip | This bit, when set, indicates that there has been at least one instance where the Network Tx State Machine was active and could not read an outgoing VP from the appropriate transmit ring buffer because the PCM Tx Write Pointer would be passed. The Network Tx State Machine, when logging this error, inhibits reads from the ring buffer and gives data from the Tx Silence Buffer in responce to the RxTx requests. It also leaves the pointer unchanged. |

PAGE 9
Network Transmit Active Table Entry (PA<7:6>=0)

| BP Int | X | Switch Error | Rx Buf Num | Rx Switch | X | Tx Buf Num | Tx Switch |
|---|---|---|---|---|---|---|---|
| b7 | b6 | b5 | b4 | b3 | b2 | b1 | b0 |

TABLE B-9

| Bits | Name | Function |
|---|---|---|
| <1:0> | Tx Active Command | These bits indicate the action required by the Net Tx State Machine for this network timeslot. They are encoded as follows:<br><1:0> =<br>0 - Idle; no transmission or channel change required this timeslot.<br>1 - Transmit Voice Packet<br>2 - Transmit Boot Packet<br>3 - Use this timeslot to change Tx Modem channel (no transmit allowed). |
| <4:2> | Channel | These bits form the new Tx channel number to be loaded into the Tx RF modem channel register if command 3 is selected above. If any other Tx Active Command is given, these bits are not used. |
| <6> | Transmit Pseudo-Silence | This bit, if set in conjunction with a transmit command during Master-mode loopback, causes the RxTx chip to send network pseudo-silence to the loopback circuitry. |
| <7> | Transmit PCM Silence | If Tx Active Command 1 is selected via bits <1:0>, this bit, if set, causes PCTL to send data to the network from the Tx Silence buffer. If this bit is zero, data will be sent from the usual transmit ring buffer. |

Network Receive Active Table Entry (PA<7:6>=1)

| X | X | X | X | X | Test CRC | LB Delay | OFFlin LB En |
|---|---|---|---|---|---|---|---|
| b7 | b6 | b5 | b4 | b3 | b2 | b1 | b0 |

TABLE B-10

| Bits | Name | Function |
|------|------|----------|
| <0> | Allow Rx Boot Packet | This bit, if set, allows boot packets to be received from the network during this timeslot and placed in the current Rx Boot Buffer. In addition, a disconnect interrupt is generated and the Disconnect bit set if this timeslot goes free. If this bit is zero, any incoming boot packets during this timeslot are discarded and disconnects are ignored (provided bit<1> is also zero). This bit is cleared by the hardware if a disconnect is detected on this timeslot. |
| <1> | Allow Rx Voice Packet | This bit, if set, allows voice packets to be received from the network during this timeslot. This data may be passed to a receive ring buffer depending on the value of this timeslot's Rx Time Slot Interchange entry as well as the receive ring buffer's Net Rx Write Pointer. In addition, a disconnect interrupt is generated and the Disconnect bit set if this timeslot becomes free. If this bit is zero, any incoming voice packets during this timeslot are discarded (not written to any buffer) and disconnects are ignored (provided bit<0> is also zero). This bit is cleared by the hardware if a disconnect is detected on this timeslot. |
| <2> | Disconnect | This bit, if set, indicates that the timeslot became free while the Allow Rx BP or Allow Rx VP bits were set. This bit can only be cleared by CPU 72 PCTL 92 can only set it. If the bit is clear, no disconnect has occurred on this timeslot. Hardware automatically clears the Allow Rx BP and VP bits when setting the Disconnect bit. |
| <3> | Enable Tx CRC Check | This bit is used to enable comparison of transmitted and received CRC values to detect errors. If one is transmitting on network timeslot N, and wishes to have this comparison done and the CRC compare counter incremented based upon the results, this bit must be set in the Rx Active Entry for timeslot N+1. (If checking is required on VTS 29, the last VTS, this bit should be set in the "pseudo Rx Active Entry" for TS 0). If this bit is cleared, no CRC compare will be done for the previous timeslot. Obviously this bit should be clear for every Rx Active Entry following a timeslot on which this control/interface circuit is not transmitting. |

PAGE B
Network Busy/Free Table Entry

| B/F<7> | B/F<6> | B/F<5> | B/F<4> | B/F<3> | B/F<2> | B/F<1> | B/F<0> |
|--------|--------|--------|--------|--------|--------|--------|--------|
| b7 | b6 | b5 | b4 | b3 | b2 | b1 | b0 |

TABLE B-11

| Bits | Name | Function |
|---|---|---|
| <7:0> | Busy/Free Value | This quantity gives the number of cycles since activity (anything but network silence for the period from the beginning of the expected delimiter time until 4 bits into data byte 1 of the expected packet) has been detected on this network timeslot. Each time that activity is observed on this timeslot, this value is reset to zero. This value will not count past its maximum value of 255. This table is not valid for 255 cycles (about 0.5 seconds) following an Rx RF Modem channel change. |

Hash Table Entry

| HASH7 | HASH6 | HASH5 | HASH4 | HASH3 | HASH2 | HASH1 | HASH0 |
|---|---|---|---|---|---|---|---|
| b7 | b6 | b5 | b4 | b3 | b2 | b1 | b0 |

TABLE B-12

| Bits | Name | Function |
|---|---|---|
| <7..0>: | HASH | Set if device is a member of a particular address class. Each bit represents an address class. |

PAGE 10
Network Receive - PCM Timeslot Map Entry

| Active /Idle* | X | X | PCM Rx TS<4> | PCM Rx TS<3> | PCM Rx TS<2> | PCM Rx TS<1> | PCM Rx TS<0> |
|---|---|---|---|---|---|---|---|
| b7 | b6 | b5 | b4 | b3 | b2 | b1 | b0 |

TABLE B-13

These locations are written by CPU 72 to map Network timeslots on which data is being received to receive ring buffers and thus PCM Highway Receive Timeslots. The mapping should be set up by CPU 72 as part of establishing the connection. The Active/Idle* bit can be set or cleared at any time during a connection. This bit should be zero for all Network timeslots on which nothing should be received.

| Bits | Name | Function |
|---|---|---|
| <4:0> | PCM Receive Timeslot | The PCM Highway Receive timeslot and ring buffer used to store voice data received from the network during this (as indicated by address) network timeslot. |
| 7 | Active/Idle* | This bit, when zero, inhibits the Network Rx State Machine from writing incoming voice packets into the selected receive ring buffer or updating the Network Rx Write Pointer. When this bit is set, received voice packets are written into the selected receive ring buffer and the Network Rx Write Pointer is updated normally. |

Network Transmit -PCM Timeslot May Entry

| Active /Idle* | | | PCM Tx TS<4> | PCM Tx TS<3> | PCM Tx TS<2> | PCM Tx TS<1> | PCM Tx TS<0> |
|---|---|---|---|---|---|---|---|
| b7 | b6 | b5 | b4 | b3 | b2 | b1 | b0 |

TABLE B-14

These locations are written by CPU 72 to map Network Timeslots on which voice data is being transmitted to PCM Highway Transmit timeslots and ring buffers. The mapping should be set up by CPU 72 as part of establishing the connection. The Active/Idle* bit can be set or cleared at any time during a connection. This bit should be zero for all Network timeslots on which nothing is being transmitted (this bit does not actually control the Network Transmit, however the PCTL Network Tx State Machine makes fewer accesses to P-RAM if it is zero).

| Bits | Name | Function |
|---|---|---|
| <4:0> | PCM Transmit Timeslot | The PCM Highway Transmit timeslot and ring buffer used to retrieve voice data to be sent to the network during this (as indicated by address) network timeslot. |
| <7> | Active/Idle* | This bit, when zero, inhibits the Network Tx State Machine from reading voice packets out of the selected transmit ring buffer or updating the Network Tx Read Pointer. If the Net Tx Active Table indicates a voice transmission on this timeslot, data is fetched from the Tx Silence Buffer. When this bit is set and the Tx Active Table indicates a voice transmission on this timeslot, data is fetched from the selected transmit ring buffer and the Network Tx Read Pointer is updated normally. |

COMMAND AND STATUS REGISTERS

In addition to the command and status registers described for P-RAM 82, RXTX 90 and PCTL 92 contain command and status registers in their respective CPU interfaces 132 and 166. A description of these registers follows.

PCTL Registers

PCTL 92 contains several registers in CPU interface 166 which are accessible to CPU 72. They are used to select the operating modes of the circuit as well as gain useful status information. All command registers may be read as well as written by CPU 72. Status registers, of course, are read-only.

PCTL Transmit Status Register

| X | X | X | X | FIFO Error | Cur Buffer | Empty Buffer | Boot Switch |
|---|---|---|---|---|---|---|---|
| b7 | b6 | b5 | b4 | b3 | b2 | b1 | b0 |

TABLE B-15

| Bits | Name | Function |
|---|---|---|
| <3> | FIFO Error | This bit is set (=1) if the Tx Ring Buffer pointers (Net Tx Read Pointer and PCM Hwy Tx Write Pointer) are misaligned in such a way that data is overwritten or duplicated. |
| <2> | Cur Buffer | This bit tells the RxTx chip which Boot Buffer (0 or 1) has new data to be sent to the network. The RxTx will then know which boot delimiter to send. |
| <1> | Empty Buffer | This bit tells the RxTx chip which Boot Buffer (0 or 1) has just been emptied and therefore needs new data from the CPU. This bit is copied into a BP status register that the CPU can read. This bit is valid when the |

TABLE B-15-continued

<0> Boot Switch
Boot Switch bit is set.
This bit is set when the Boot Buffer pointer has just changed states. It tells the RxTx chip to generate an interrupt the next possible time.

PCTL Receive Status Register

| Disc | FIFO Error | X | TMs Missed | HASH Passed | Abnorm Switch | Full Buffer | Boot Switch |
|---|---|---|---|---|---|---|---|
| b7 | b6 | b5 | b4 | b3 | b2 | b1 | b0 |

TABLE B-16

| Bits | Name | Function |
|---|---|---|
| <7> | Disc | This bit is set if the connection to the far-end device is dropped. Disconnect is detected when a time slot has B/F=free AND the active table indicates a connection should exist. This bit tells the RxTx chip to set an interrupt. |
| <6> | FIFO Error | This bit is set when the Rx Ring Buffer pointers (the Net Rx Write Pointer and the PCM Hwy Rx Read Pointer) are misaligned and allows data to be overwritten or duplicated. |
| <4> | TMs Missed | This bit is set to indicate that the TM Missed threshold was reached - a critical failure. This bit is copied into a register that the CPU can read and an interrupt will be generated. The threshold is determined by the CPU and specified in a threshold register in Chapter 6. |
| <3> | Hash Passed | This bit indicates that the SP HASH was passed and tells the RxTx chip that the CRC match results are meaningful. |
| <2> | Abnorm Switch | This bit is valid only if the "Boot Switch" bit is set. It indicates if the boot buffer switch was expected. |
| <1> | Full Buffer | This bit gives the number of the Boot Buffer that has been recently filled. It is copied into a register that the CPU can read. It is valid only when the "Boot Switch" bit is set. |
| <0> | Boot Switch | This bit is set when the boot buffer pointer changes states. It is copied into a register that the CPU can read and, with the "Abnorm Switch" and "Full Buffer" bits, the CPU has enough information to determine whether the latest boot reception was successful. |

Mode Register

This register is used to place control/interface circuit 80 in its various operating modes. The bits are organized as follows:

| PCM TS OE | Cntr Test | Codec OE | PCM Hy Master | 5M Clk OE | Codec Mode | PCM Hy Enable | Reset |
|---|---|---|---|---|---|---|---|
| b7 | b6 | b5 | b4 | b3 | b2 | b1 | b0 |

TABLE B-17

The register is cleared (i.e all bits are reset to 0) when the PCTL reset signal is activated. All bits in this register may be read as well as written by CPU 72. The bits are defined as follows:

| Bits | Name | Function |
|---|---|---|
| <0> | Reset | This bit, when cleared, places PCTL 92 in Reset mode. In this mode, all state machines are held in a reset state and can not perform accesses to P-RAM 82. CPU 72, however, can still access P-RAM 82. When this bit is set to "1", PCTL 92 operates normally. |
| <1> | PCM Highway Enable | This bit, when cleared, inhibits PCTL 92 from actually driving the PCM Highway output bus, regardless of what it is told by the PCM Hwy state machine 162. |
| <2> | Codec/SPU Mode | This bit is used to select the type of codec enables to be generated by PCTL. A "0" selects PCM Highway transmit and receive enable signals compatible with National TP3054 and Intel 2913/4 codec/filter chips and TI 32020/320C25 Signal Processors. A "1" selects enable signals compatible with Motorola MC14400 series codec/filter chips. |
| <3> | 5 MHz Clock Output Enable | This bit, when set, enables the driver which sends PCTL's Master Clock to the 5.018 MHz clock out pin. When the bit is cleared, the driver is tri-stated. |
| <4> | PCM Highway Master | This bit, when set, enables the drivers which transmit the PCM Highway State Machine's "Reset to PCM Timeslot 0" and "1.544 MHz Clock" signals to the corresponding PCTL input/output pins. pin. When the bit is cleared, the output drivers are tri-stated. |
| <5> | Codec Control Output Enables | This bit, when set, enables PCTL's PCM Highway transmit and receive codec/filter control signals. If this bit is zero, these pins are tri-stated. |
| <6> | Counter Test Mode | This bit, when set, places PCTL in its counter test mode. In this mode, PCTL allows all of its error counters to increment as if errors are being received. When this bit is cleared, all error counters operate in their normal mode. |
| <7> | PCM Timeslot Counter Output Enable | This bit, when set, commands PCTL to drive its PCM Highway Timeslot Counter output pins. If this bit is zero, these pins are tri-stated. |

Threshold Register

This register is used to select two thresholds. The first is the number of consecutive cycles a Network timeslot must be unoccupied before the timeslot is declared to be free and a disconnect generated (if required). The second is the number of consecutive receive Timing Marks which must be missed before an interrupt is given to the CPU. The bits are organized as follows:

| X | X | X | X | Missed <1> | Missed <0> | Free <1> | Free <0> |
|---|---|---|---|---|---|---|---|
| b7 | b6 | b5 | b4 | b3 | b2 | b1 | b0 |

TABLE B-18

The register is cleared (i.e. all bits are reset to 0) when the PCTL reset signal is activated. All bits in this register may be read as well as written by CPU 72. The bits are defined as follows:

| Bits | Name | Function |
|---|---|---|
| <1:0> | Free Threshold | These bits set the Busy/Free "Free" threshold as follows for all network timeslots:<br><1:0> =<br>0 - 8 consecutive silent cycles<br>1 - 16 consecutive silent cycles<br>2 - 32 consecutive silent cycles<br>3 - 64 consecutive silent cycles |
| <3:2> | Rx TM Missed Threshold | These bits set the consecutive Rx TM missed interrupt threshold:<br><3:2> =<br>0 - Interrupt on 16 consecutive missed receive Timing Marks.<br>1 - Interrupt on 32 consecutive missed receive Timing Marks.<br>2 - Interrupt on 64 consecutive missed receive Timing Marks.<br>3 - Interrupt on 128 consecutive missed receive Timing Marks. |

RX SP Buffer Status Register

| Rx SP BfFull | Missed SP<6> | Missed SP<5> | Missed SP<4> | Missed SP<3> | Missed SP<2> | Missed SP<1> | Missed SP<0> |
|---|---|---|---|---|---|---|---|
| b7 | b6 | b5 | b4 | b3 | b2 | b1 | b0 |

TABLE B-19

Bit 7 of this register may be read and written by CPU 72; the remaining bits are read-only. Bits<6:0> of this register are cleared after a CPU read - they are unknown after a hardware reset. The bits are defined as follows:

| Bits | Name | Function |
|---|---|---|
| <6:0> | Missed Rx SP Count | These bits contain the number of SPs received by this control/interface circuit 80 which passed the Rx address hash but were not accepted because the Rx SP data buffer was full. It will not count past its maximum value of 127, and is reset to zero after each CPU read access. This quantity may only be read; writes to this register will not affect these bits. |
| <7> | Rx SP Data Buffer Full | This bit, when set, indicates that a valid SP has been received by this control/interface circuit 80 and placed in the Rx SP Data Buffer. An SP is valid if its CRC was good and the destination address hash was passed. RXTX 90 will not place another Rx SP into the Rx SP data buffer until this bit has been cleared by software. This bit can be read and written by CPU 72. |

Transmit Boot Buffer Register

| X | X | X | X | X | X | X | Tx Bt Buffer |
|---|---|---|---|---|---|---|---|
| b7 | b6 | b5 | b4 | b3 | b2 | b1 | b0 |

TABLE B-20

This register is cleared (i.e. reset to 0) when the PCTL reset signal is activated. The bit is defined as follows:

| Bits | Name | Function |
| --- | --- | --- |
| <0> | Current Tx Boot Buffer | This bit gives the current transmit boot buffer being used (or to be used) by PCTL 92. A "0" indicates boot buffer 0 is currently selected, while a "1" means buffer 1 is being used. This bit can be written as well as read by CPU 72. It should not be written, however, while Tx BPs are being transmitted. |

Receive Boot Buffer Register

| X | X | X | X | X | X | X | Rx Bt Buffer |
| --- | --- | --- | --- | --- | --- | --- | --- |
| b7 | b6 | b5 | b4 | b3 | b2 | b1 | b0 |

TABLE B-21

This register is cleared (i.e. reset to 0) when the PCTL reset
signal is activated. The bit is defined as follows:

| Bits | Name | Function |
|------|------|----------|
| <0> | Current Rx Boot Buffer | This bit gives the current receive boot buffer being used (or to be used) by PCTL 92. A "0" indicates boot buffer 0 is currently selected, while a "1" means buffer 1 is being used. This bit can be written as well as read by software. It should not be written, however, while Rx BPs are being received. |

Transmit Boot Pointer Register

This register contains the pointer into the currently selected
transmit boot buffer. It is used to read the next 16 bytes of
boot information from the selected boot buffer during a Tx BP
timeslot. It can be written and read by CPU 72, although it
should not be written while Tx BPs are being sent by this PCTL
circuit. The entire 8 bits of this register form the pointer,
as each boot buffer is 256 bytes long.

Receive Boot Pointer Register

This register contains the pointer into the currently selected
receive boot buffer. Its is used to write the next 16 bytes of
boot information to the selected receive boot buffer during a
Rx BP timeslot. It can be written and read by the software,
although it should not be written while Rx BPs are being
received by this PCTL circuit. The entire 8 bits of this
register form the pointer, as each boot buffer is 256 bytes
long.

Rx Timing Mark CRC Error Register

This register contains the number of Timing Marks received
with CRC errors since this register was last read by CPU 72.
It is reset to zero after each CPU read. The contents of this
register are valid for control/interface circuits in either
Master of Slave Timing Mark mode.

Missing Rx Timing Mark Register

This register contains the number of Timing Marks missed since
last read. A Timing Marks is defined as "missed" when the
receiver cannot detect a valid Timing Mark delimiter within 4
bit times of where it is expected OR when a valid TM delimiter
is received but the CRC does not check. This register is valid
in either Master or Slave Timing Mark mode. It is reset to zero
after every CPU read access.

Consecutive Missing Rx TM Register

This register contains the number of Timing Marks which have
been missed consecutively. It is reset to zero when a Timing
Mark with a valid CRC is received. It is also cleared by a CPU
read, allowing another "Consecutive Missed Rx TM" Interrupt to
be generated at this counter goes past the Missing TM threshold
set in the Threshold Register.

Rx TM Out-of-Sequence Register

This register contains the number of Timing Marks received out-
of-sequence since last read. a received Timing Marks is deemed
"out-of-sequence" when it is received with a valid CRC and a
frame number which is not the value expected based on the pre-
vious received Timing Mark. This register is valid in either
Master of Slave Timing Mark mode. It is reset to zero after
every CPU read access. Non-zero values in this register
generally indicate that more than one network unit is
generating Timing Marks.

Consecutive Rx Valid TM Register

This register contains the number of consecutive valid Timing
Marks received. It is reset to zero by any missing Timing Mark
or Timing Mark with an unexpected frame number. A valid Timing
Mark is defined as a TM with a good CRC and the expected frame
number. Note that this register is not cleared during reset;
hence its contents are unknown for the first 255 cycles the
control/interface circuit is in Receive Frame lock (with the
Interconnect).

Tx Packet Bit Error Register

TABLE B-21-continued

This register contains the number of transmitted packets, including regular VPs, which were received back from the network in error. This check is done by computing a CRC on each packet transmitted, and computing a CRC on the same packet coming back from the network. If the two CRCs do not match, AND the corresponding "Enable Tx CRC Check" bit is set in the Rx Active Table entry, the Tx Packet Bit Error Counter will be incremented. It is reset to zero after every CPU read.

Voice Slip Register

This register contains the number of slips which have occurred in this PCTL chip since last read. A slip is a missed read or write of PCM data which occurs because ring buffer read and write pointers have attempted to cross each other. If the PCM Highway 6.176 MHz clock is frequency-locked to the network 5.018 MHz clock, there should be no slips recorded. This register is reset to zero after every software read. A bit in the read and write pointer register of each ring buffer can be used to detect whether a slip has occurred on a particular PCM Highway timeslot in a given direction.

Master Clock Monitor Register

This register is used to obtain information on PCTL's Master Clock, which is received from the Rx Modem. This monitor operates using the 6.176 MHz from a "guaranteed good" source of 20.072 MHz clock, such as a PLL which is known to be present and operating.
The register consists of two 4-bit counters. The least significant 4 bits of this register contain the number of 6.176 MHz rising clock edges seen since the 5.018 MHz PCTL clock was last high; the most significant 4 bits contain the number of 6.176 MHz rising clock edges seen since this clock was last low. Both counters will not count past their maximum count of 15. If the PCTL Master clock is operational, each nibble of this register should contain 0, 1, or 2 at any time it is read by software. Higher values in either or both nibbles indicate this clock is not good. If the clock is not there at all, one nibble should be pegged at 15. Each half of this register is only cleared by the appropriate level on PCTL Master clock.

RXTX Registers

The TXTX circuit 90 contains several register which are accessible to CPU 72. This registers are as follows.

TM Master/Slave Register

| X | X | X | X | X | X | X | M/S |
|---|---|---|---|---|---|---|---|
| b7 | b6 | b5 | b4 | b3 | b2 | b1 | b0 |

TABLE B-22

| Bits | Name | Function |
|---|---|---|
| <0> | M/S | 1 - Master<br>0 - Slave (condition after reset)<br>The M/S bit determines if the device will transmit TMs. This bit is set only if the device is a master TMG or contending to become one. This bit is 0 after reset. |

Tm Command/Lock Status Register

| X | X | X | X | Lock1 | Lock0 | TM Window | C_M/S |
|---|---|---|---|---|---|---|---|
| b7 | b6 | b5 | b4 | b3 | b2 | b1 | b0 |

TABLE B-23

| Bits | Name | Function |
|---|---|---|
| <3:2> | Lock<1..0> | 11 - 128 consecutive good TMs<br>10 - 64 consecutive good TMs<br>01 - 32 consecutive good TMs<br>00 - 16 consecutive good TMs<br>These bits determine the number of consecutive good TMs that must be received before the RxTx "locks" the Rx frame. Locking is explained below. |
| <1> | TM Window | 1 - 16-bit window during predicted time<br>0 - "Wide open" window (condition after reset)<br>This bit determines how the RxTx 90 searches for a TM delimiter during a frame. After reset this bit is cleared. This allows RxTx 90 to continuously search for TMs and realign the frame whenever a good TM packet is found. This means that frame "lock" does not exist yet and time slot boundaries are not determined.<br>After the lock threshold is passed (determined by bits 3 and 2, above), circuitry in the RxTx chip will automatically set the bit to 1. TMs will only be detected during the predicted times and the rest of the frame can be used as intended (time slot boundaries are now in place).<br>The CPU can clear the bit whenever it wishes; the RxTx chip has no means of clearing this bit except during reset. The CPU can set the bit if it is necessary to recognize the lock condition sooner than the specified threshold. The CPU can read this bit at any time to determine if the Rx frame is locked. |
| <0> | C_M/S | 1 - Master control/interface circuit<br>0 - Slave control/interface circuit (condition after reset)<br>This bit selects a "master" control/interface circuit 80 among the ones in a particular device. This bit is valid only if the TM Master/Slave bit (above) is a 1 since it is used to determine which control/interface circuit's "TxTM Sync" signal is used to synchronize all of the control/interface circuits when transmitting a TM. The master control/interface circuit should be chosen before arbitrating to become a master TMG (said another way, C M/S should be valid before M/S). Naturally, if there is only one control/interface circuit in a device and it is transmitting TMs, this bit is set. In the predominant TMG case, where there are four control/interface circuits one is chosen by the software and changed only if the chosen Chocolate's clock fails. |

TM Status Register

| TM Int | X | X | X | X | Multi TMs | 1ms | TMs Missed |
|---|---|---|---|---|---|---|---|
| b7 | b6 | b5 | b4 | b3 | b2 | b1 | b0 |

TABLE B-24

| Bits | Name | Function |
|---|---|---|
| <7> | TM Int | This bit is set when there is an interrupt pertaining to Tms, making the information in this register valid. |
| <2> | Multi TMs | This bit is set when there were multiple good TMs (i.e. no CRC errors) received within 1 ms. This error will occur only when the Rx frame is not "locked." An interrupt will be generated if interrupts are enabled. |
| <1> | 1ms | If the Rx frame is locked and the 1 ms interrupt is enabled, this bit will be set and an interrupt will be generated every millisecond. It does not depend on the reception of good TMs; an interrupt will be generated even if a Tm is missed. If the Rx frame is NOT locked and the 1 ms interrupt is enabled, this bit will be set and an interrupt will be generated every 1 ms if there are no "Multi TM" errors (see above). |
| <0> | TMs Missed | This bit is set when the threshold for consecutive TMs missed has been reached - a critical failure. This threshold is set by software in the PCTL chip. An interrupt will be generated if TM missed interrupt is enabled. |

SP Command Register - MS Byte

| Cmd1 | Cmd0 | F | R | SP3 | SP2 | SP1 | SP0 |
|---|---|---|---|---|---|---|---|
| b7 | b6 | b5 | b4 | b3 | b2 | b1 | b0 |

TABLE B-25

| Bits | Name | Function |
|---|---|---|
| <7:6> | Cmd<1..0> | 11 Transmit SP<br>10 Illegal cPU command - used by the hardware<br>01 Illegal CPU command - used by the hardware<br>00 No Command (condition after reset)<br>Cmd <1..0> is cleared by the RxTx state machine after the expected SP delimiter time has passed (whether or not it was received). This insures that the command is processed only once. After reset and after the off-line loopback is engaged or disengaged, Cmd<1..0> is set to "11" so that a skew SP can be sent automatically to calculate the skew. |
| <5:4> | F and R | 11 Transmit on either forward or reverse frame<br>10 Transmit on next forward frame<br>01 Transmit on next reverse frame<br>00 Transmit an SSP on next frame (fwd or rev) |
| <3:0> | SP | Each bit chooses one of the four SP partitions for transmission. Any combination of SP partitions can be chosen and the SP will be sent on the next eligible one.<br>Programming Note: Do not write into the SP Cmd Reg (MS byte) if there is a command pending (i.e. when Cmd <1..0> does NOT equal "00"). The best time to issue a new SP command is after the previous command is acknowledged by an interrupt or after reading the SP Cmd Reg to insure that bits Cmd <1..0> is "00." Failure to comply will result in either overwriting the first command (if the writing of the second command falls in a non-SP time slot) or |

TABLE B-25-continued the second command will be ignored (if the writing of the second command falls in an SP time slot).

SP Command Register - LS Byte

| Tx3 | Tx2 | Tx1 | Tx0 | Rx3 | Rx2 | Rx1 | Rx0 |
|-----|-----|-----|-----|-----|-----|-----|-----|
| b7  | b6  | b5  | b4  | b3  | b2  | b1  | b0  |

TABLE B-26

| Bits | Name | Function |
|------|------|----------|
| <7:4> | Tx | This selects the transmit frequency for the SP time slot. |
| <3..0> | Rx | This selects the receive frequency for the SP time slot. These bits are valid only when there is a command to transmit an SP. The Tx and Rx frequencies should correspond to the same network channel. The default frequencies are reinstated after the SP time slot. |

SP Status Register

| S Int | x | TX SSP | Not Seen | CRC MMatch | Tx Good | Rx Error | Rx Good |
|-------|---|--------|----------|------------|---------|----------|---------|
| b7    | b6 | b5    | b4       | b3         | b2      | b1       | b0      |

TABLE B-27

Bits <5..2> are meaningful when a device is receiving its own SP. Bits <1..0> are used primarily when the received SP is from a different device, but are also valid when the SP has come from the same device.

| Bits | Name | Function |
|------|------|----------|
| <7> | SP Int: | This bit is set if there is an interrupt pertaining to SPs, making the information in this register valid. |
| <5> | Tx SSP: | This bit is set if the transmitted SP was for determining skew (an SSP). This bit is read only to the CPU, but is affected by reset and the loopback bit. This bit is set when there is a reset and when the loopback bit is engaged OR disengaged. During these times, the skew must be calculated. After the skew is known, this bit is cleared. |
| <4> | Not Seen: | This bit is set when the SP sent was not detected. |
| <3> | CRC MMatch: | This bit is set when the transmitted CRC does NOT match ("MisMatch") the received CRC. This is used to help determine if the received SP is in fact the one transmitted. Note that it is possible to have a good CRC (bit 0 = 1) and a CRC mismatch at the same time. |
| <2> | Tx Good: | This bit is set when the transmission was successful. This means that CRC MMatch=0 AND there were no bit errors in the received packet (the CRC checker indicates no errors). |
| <1> | Rx Error: | This bit is set if the received SP (typically from another device) has passed the HASH, but has a CRC error. An interrupt may be generated as a result if the CPU has enabled interrupts for reception of bad SPs (see Interrupt Command Register, Section 5.3.1.7) |
| <0> | Rx Good: | This bit is set if the received SP (typically from another device) has passed the HASH and has a good CRC. An interrupt is always generated in this situation. |

CVP Command Register

TABLE B-27-continued

| Cmd1 | Cmd0 | F/R | TS4 | TS3 | TS2 | TS1 | TS0 |
|------|------|-----|-----|-----|-----|-----|-----|
| b7   | b6   | b5  | b4  | b3  | b2  | b1  | b0  |

TABLE B-28

| Bits | Name | Function |
|---|---|---|
| <7:6> | Cmd | 11  Transmit CVP<br>10  Illegal CPU command - used by hardware<br>01  Illegal CPU command - used by hardware<br>00  No Command (condition after reset)<br>Cmd<1 . . 0> is cleared by the RxTx state machine after the expected CVP delimiter time has passed (whether or not it was received). This insures that the command is processed only once.<br>If CVP transmission is "blocked" (see CVP Status Register), Cmd <1 . . 0> is cleared. |
| <5> | F/R: | This bit determines whether to claim a time slot in the forward or reverse frame. |
| <4:0> | TS | These bits specify the time slot to be claimed.<br>Note that unlike the SP Command Register, Tx and Rx frequencies need not be specified since CVPs always claim time slots in the default channel. |

CVP Status Register

| CVP Int | X | X | X | Not Seen | Block | CRC MMatch | Tx Good |
|---|---|---|---|---|---|---|---|
| b7 | b6 | b5 | b4 | b3 | b2 | b1 | b0 |

TABLE B-29

| Bits | Name | Function |
|---|---|---|
| <7> | CVP Int | This bit is set if there is an interrupt pertaining to CVPs, making the information in this register valid. |
| <3> | Not Seen | This bit is set if there was no CVP detected during the specified time slot. |
| <2> | Block | This bit is set if the B/F free table entry indicates that the time slot was busy before the claim was initiated. CVP transmission was blocked because the time slot was already busy. This condition will clear Cmd <1 . . 0> of the CVP Command Register. |
| <1> | CRC MMatch | This bit is set if the received CVP CRC does not match the transmitted CRC, thus indicating collision or some other form of transmission error. |
| <0> | Tx Good | This bit indicates a successful seizure of the time slot. |

VP Status Register

The command register for processing VPS exist in the P-RAM Active Table. There is, however, a VP Status Register.

| VP Int | X | X | X | X | Rx FIFO | Tx FIFO | Disc |
|---|---|---|---|---|---|---|---|
| b7 | b6 | b5 | b4 | b3 | b2 | b1 | b0 |

TABLE B-30

| Bits | Name | Function |
|---|---|---|
| <7> | VP Int | This bit is set if there is an interrupt pertaining to VPs. The only bit that generates an interrupt is the Disc bit, the others are for status only. |
| <2> | Rx FIFO | This bit is set if the Rx Ring Buffer pointers are misaligned. |
| <1> | Tx FIFO | This bit is set if the Tx Ring Buffer pointers are misaligned. |
| <0> | Disc | This bit is set if the connection is dropped. An interrupt is generated after a disconnect. During the interrupt routine, the CPU must read all Rx Active table entries to determine which time slot(s) have disconnected. |

BP Status Register

As with the VPs, the command register for processing BPs is in the PRAM Active Tables. Similarly, there is a BP Status Register.

| BP Int | X | Switch Error | Rx Buf Num | Rx Switch | X | Tx Buf Num | Tx Switch |
|---|---|---|---|---|---|---|---|
| b7 | b6 | b5 | b4 | b3 | b2 | b1 | b0 |

TABLE B-31

| Bits | Name | Function |
|---|---|---|
| <7> | BP Int | This bit is set if there is an interrupt pertaining to BPs, making the information in this register valid.<br>Bits 5 to 3 pertain to the reception of BPs, while bits 1 and 0 are for the transmission of BPs. They work independently of each other and reflect the latest status of the transmitted and |

TABLE B-31-continued

| | | |
|---|---|---|
| | | received BPs. |
| <5> | Switch Error | This bit is set if the Boot Buffer switch in the Rx direction was unexpected. This means that the delimiter received did not correspond to the boot buffer pointed to by the buffer pointer. "Rx Switch" must be set for this bit to be valid. |
| <4> | Rx Buf Num | This bit gives the number of the Boot Buffer that was just filled by the network and needs to be emptied by the CPU. "Rx Switch" must be set for this bit to be valid. |
| <3> | Rx Switch | This bit is set when there was an Rx Boot Buffer switch. This will generate an interrupt. |
| <1> | Tx Buf Num | This bit gives the number of the Boot Buffer that was just emptied by the network and needs to be filled by the CPU. "Tx Switch" must be set for this bit to be valid. |
| <0> | Tx Switch | This bit is set when there was a Tx Boot Buffer switch. This will generate an interrupt. |

Test Command Register

| X | X | X | X | X | Test CRC | LB Delay | OFFlin LB En |
|---|---|---|---|---|---|---|---|
| b7 | b6 | b5 | b4 | b3 | b2 | b1 | b0 |

TABLE B-32

| Bits | Name | Function |
|---|---|---|
| <2> | Test CRC | When set, the CRC generator will induce CRC errors. This is used to test the system's behavior in the event of a CRC error. |
| <1> | LB Delay | When set, the loopback path will not have any delay. When reset, the loopback path will insert a 4-bit delay. |
| <0> | OFFlin Lb En | This bit is set to enable the OFF-line tests that will tie the transmitted data to the received data. There are two variations of loopback, determined by the TM Master/Slave bit. Master LB will loopback the entire frame. Slave LB will loopback only during the time slots that the device is transmitting. This is described in more detail in Chapter 4, "Maintenance and Diagnostic commands" section. |

RXTX Transmit Status Register

| No Tx | Tx TM | Tx SSP | Tx SP | Tx BP1 | Tx BP0 | Tx CVP | Tx VP |
|---|---|---|---|---|---|---|---|
| b7 | b6 | b5 | b4 | b3 | b2 | b1 | b0 |

TABLE B-33

A bit is set if the corresponding packet will be sent to the network. "No Tx" is set if there is no transmission or if network pseudo-silence is transmitted (possible only during Master-loopback mode).

RXTX Receive Status Register

| Junk Rx'd | CVP Tx'd | Silen. Rx'd | SP Rx'd | TM Rx'd | BP1 Rx'd | BP0 Rx'd | VP Rx'd |
|---|---|---|---|---|---|---|---|
| b7 | b6 | b5 | b4 | b3 | b2 | b1 | b0 |

TABLE B-34

A bit is set (=1) when the corresponding delimiter is detected. Only one of the least significant 5 bits will be set at any time. "CVP Tx'd" is set only when a CVP was transmitted by the same device. The "Junk" and Silen Rx'd" bits may be set when the "CVP Tx's" bit is set. "Junk Rx'd" is set when anything but the expected delimiter is received. This bit tells the PCTL chip to ignore the incoming data.

Packet Status Register

TABLE B-34-continued

| b7 | b6 | b5 | b4 | b3 | b2 | b1 | b0 |
|----|----|----|----|----|----|----|----|
| X | X | X | X | Frame Error | X | CRC MMatch | CRC Error |

TABLE B-35

| Bits | Name | Function |
|------|------|----------|
| <3> | Frame Error | Set when the Mod 8 frame number in the received TM packet changes the Frame counter in the RxTx chip by any number but one. This error can only be detected during slave mode. |
| <1> | CRC MMatch | This bit indicates whether the 16-bit CRC received during the previous time slot is equivalent to the CRC sent (1 = Not equivalent or MisMatch). With the exception of Timing Marks, this is used whenever a device is listening to its own |

TABLE B-35-continued

| | | transmission. It is, for example, for VPs during bit error rate testing (a device loops back a time slot for on-line diagnostics) and for SPs since a device always receives its own SP. |
|---|---|---|
| <0> | CRC Error | When set, this bit indicates that the CRC is correct based on the packet received rather than on a saved CRC value as in "CRC MMatch," above. This is used for TMs (slave mode) and SPs. |

Current Channel Register

| b7 | b6 | b5 | b4 | b3 | b2 | b1 | b0 |
|----|----|----|----|----|----|----|----|
| Tx3 | Tx2 | Tx1 | TX0 | Rx3 | Rx2 | Rx1 | Rx0 |

TABLE B-36

| Bits | Name | Function |
|------|------|----------|
| <7:4> | Tx | Specifies the current Tx frequency for the VP and TM time slots; the frequency may be different for the SP time slot. This value can be changed by a "Change Channel" command in the Active Table. |
| <3:0> | Rx | Specifies the current Rx frequency for the VP and TM time slots; the frequency may be different for the SP time slot. |

TABLE B-36-continued

The two frequencies MUST be for the same network channel. The RxTx chip does not check if this is true; it is up to the software to insure this.
This register is not used in TIMs since the Modem cards are shared between several TIMS. The Modem cards have a register for selecting the Tx and Rx frequencies.

Hash Address Register

| b7 | b6 | b5 | b4 | b3 | b2 | b1 | b0 |
|----|----|----|----|----|----|----|----|
| CTL1 | CTL0 | CRC5 | CRC4 | CRC3 | CRC2 | CRC1 | CRC0 |

TABLE B-37

| Bits | Name | Function |
|------|------|----------|
| <7:6> | CTL | Chooses 1 of 4 HASH Table pages |
| <5:3> | CRC | Chooses 1 of 8 rows in the HASH Table page |
| <2:0> | CRC | Chooses 1 of 8 bits in the HASH Table entry |

Interrupt Command Register

| b7 | b6 | b5 | b4 | b3 | b2 | b1 | b0 |
|----|----|----|----|----|----|----|----|
| Int Enable | X | X | X | X | TM Mis Int En | SP Err Int En | 1ms Int En |

TABLE B-38

| Bits | Name | Function |
|------|------|----------|
| <7> | Int Enable | Enables all control/interface circuit interrupts except for the following which requires additional bits to be set. |
| <2> | TM Mis Int En | When set, this bit allows interrupts to be generated every time the threshold is passed for the number of consecutive TMs missed. The "Int Enable" bit must be set also. |
| <1> | SP Err Int En | When set, this bit enables interrupts for reception of SPs which pass the HASH, but have CRC errors. The "Int Enable" bit must be set also. |
| <0> | 1 ms Int En | When set, this bit enables 1 ms interrupts as described in the I1ms" bit of the TM Status Register. The "Int Enable" bit must be set also. |

Reset Command Register

| b7 | b6 | b5 | b4 | b3 | b2 | b1 | b0 |
|----|----|----|----|----|----|----|----|
| X | X | X | X | X | X | X | Reset |

TABLE B-39

| Bits | Name | Function |
|------|------|----------|

TABLE B-39-continued

| | | |
|---|---|---|
| <0> | Reset | This bit is cleared after reset and stays cleared until the CPU sets it. When cleared, the RxTx chip will stay in a reset state. In the absence of a clock input to the RxTx chip, the chip can be reset by first writing a 1 then a 0. This sequence will hold the chip in reset. |

Skew Register MSB

TABLE B-39-continued

| Skew 8 | X | X | X | X | X | X | X |
|---|---|---|---|---|---|---|---|
| b7 | b6 | b5 | b4 | b3 | b2 | b1 | b0 |

TABLE B-40

Skew Register LSB

| Skew 7 | Skew 6 | Skew 5 | Skew 4 | Skew 3 | Skew 2 | Skew 1 | Skew 0 |
|---|---|---|---|---|---|---|---|
| b7 | b6 | b5 | b4 | b3 | b2 | b1 | b0 |

TABLE B-41

| Bits | Name | Function |
|---|---|---|
| <7:0> | Skew | The combined bits in both Skew Register MSB and Skew Register LSB show the value of the skew calculated by the RxTx chip. |

Rx Frame Register

| RCyc7 | RCyc6 | RCyc5 | RCyc4 | RCyc3 | RCyc2 | RCyc1 | RCyc0 |
|---|---|---|---|---|---|---|---|
| b7 | b6 | b5 | b4 | b3 | b2 | b1 | b0 |

TABLE B-42

| Bits | Name | Function |
|---|---|---|
| <7:0> | RCyc | These bits show the value of the Rx Cycle |

TABLE B-42-continued

| | | |
|---|---|---|
| | | (FRAME) number. This register will show the value of the Rx Cycle number in the received TM packet if the TM had no CRC errors. If the received TM packet was bad, the last Rx Cycle number will be incremented. |

Fault Register

| Fault | X | X | X | X | X | X | X |
|---|---|---|---|---|---|---|---|
| b7 | b6 | b5 | b4 | b3 | b2 | b1 | b0 |

TABLE B-43

| Bits | Name | Function |
|---|---|---|
| <7> | Fault | This bit can be read to see if the modem has generated a fault. A fault will exist if the modem has been transmitting for an exceedingly long period (i.e. in the order of an entire frame.) Writing anything to this address will generate a fault reset pulse which will restart the modem circuitry. |

Oscillator Enable Register

| X | X | X | X | X | X | X | Osc Enable |
|---|---|---|---|---|---|---|---|
| b7 | b6 | b5 | b4 | b3 | b2 | b1 | b0 |

TABLE B-44

| Bits | Name | Function |
|---|---|---|
| <0> | Osc Enable: | When set, this bit enables the modem oscillator. It can be read to confirm the status. |

RXTX/PCTL Commands

Now that the organization of PRAM 82 and the RXTX 90/PCTL 92 internal registers have been described, the various commands between RXTX 90 and PCTL 92 may be described.

The command number and a short description is stated. The data field describes what should appear on the PRAM data bus as a result of the command. The source and destination tells where the data comes from and which devices use it.

COMMAND 0 (00000):

Description: No operation

Data Field: Don't Care

Source: PD <7 . . . 0> is tri-stated.

Destination: PD <7 . . . 0> is tri-stated.

The Commands will be NOPs (Command 0) until the Rx frame is locked (i.e. the TM threshold is reached).

The following commands are specifically for the transmit or receive direction.

Commands Issued when Transmitting Data to Modem 70

COMMAND 1 (00001):

Description: Read Tx Active Table for present time slot.

Data Field: See Table B-9

Source: P-RAM
Destination: RxTx chip and PCTL chip

COMMAND 2 (00010):
Description: Read Net Tx PCM Timeslot Map Entry. This register maps a network voice time slot to a PCM highway time slot.
Data Field: See Table B-13
Source: P-RAM
Destination: PCTL chip COMMAND 3 (00011):
Description: Read Net Tx Read Pointer. This register holds the Xmt Ring Buffer address which points to the first byte to be transmitted in this time slot.
Data Field: See Table B-8
Source: P-RAM
Destination: PCTL chip COMMAND 4 (00100):
Description: Read PCM Hwy Tx Write Pointer. This register holds the first Xmt Ring Buffer address which will be written into by the PCM Hwy during this time slot.
Data Field: See Table B-7
Source: P-RAM
Destination: PCTL chip COMMAND 5 (00101):
Description: Read PCTL Transmit Status.
Data Field: See Table B-15
Source: PCTL chip
Destination: RxTx chip COMMAND 6 (00110):
Description: Send RXTX transmit Status to PCTL. The RxTx sends status to the PCTL, stating the type of packet that will be transmitted.
Data Field: See Table B-33
Source: RxTx chip
Destination: PCTL chip COMMAND 7 (00111):
Description: Transfer appropriate data. This command is used whenever packet data is needed from the P-RAM.
Data Field: The data byte to be transmitted in the current packet.
Source: P-RAM
Destination: RxTx chip COMMAND 8 (01000):
Description: Write the first byte of the last time slot's CRC.
Data Field: Least significant CRC byte.
Source: RxTx chip
Destination: P-RAM (OBCO-OBFF)

COMMAND 9 (01001):
Description: Write the second byte of the last time slot's CRC.
Data Field: Most significant CRC byte.
Source: RxTx chip
Destination: P-RAM (OBCO-OBFF)

COMMAND 10 (01010):
Description: Transfer CVP time slot number from RxTx to PCTL.
Data Field: Least significant 6 bits of the octet is the frame bit (forward or reverse) and the 5-bit slot number. (Table B-28, bits <5:0>)
Source: RxTx chip
Destination: PCTL chip COMMAND 11 (01011):
Description: Read Busy/Free table of CVP time slot. The CVP Command Byte (see Table B-25) specifies forward or reverse frame. The RxTx chip will issue this command every frame, but the data field will be used only during the designated frame (forward or reverse).
Data Field: See Table B-11
Source: P-RAM
Destination: RxTx chip COMMAND 14 (01110):
Description: Update Network Tx Read Pointer
Data Field: See Table B-8
Source: PCTL chip
Destination: P-RAM ICB Commands for the Rx Direction COMMAND 16 (10000):
Description: Update Rx Active entry to report Disconnect.
Data Field: See Table B-10
Source: PCTL
Destination: P-RAM COMMAND 17 (10001):
Description: Read Rx Active entry for current time slot.
Data Field: See Table B-10
Source: P-RAM
Destination: RxTx and PCTL chip COMMAND 18 (10010):
Description: Read Net Rx-PCM Timeslot Map Entry. This register maps a network voice time slot to a PCM highway time slot.
Data Field: See Table B-13
Source: P-RAM
Destination: PCTL chip COMMAND 19 (10011):
Description: Read Net Rx Write Pointer. This register holds the Rcv Ring Buffer address where the first data byte is stored. When issued during a TM or SP time slot, the TM or SP pointer is just cleared since these packets always start at the same buffer address.
Data Field: See Table B-6
Source: P-RAM
Destination: PCTL chip COMMAND 20 (10100):
Description: Read PCM Hwy Rx Read Pointer. This register holds the first Rcv Ring Buffer address which will be read by the PCM Hwy during this time slot.
Data Field: See Table B-5
Source: P-RAM
Destination: PCTL chip COMMAND 21 (10101):
Description: Read PCTL Receive Status
Data Field: See Table B-16
Source: PCTL chip
Destination: RxTx chip COMMAND 22 (10110):
Description: Send Delimiter Status. The RxTx sends status to the PCTL, stating the type of packet that was received.

Data Field: See Table B-34
Source: RxTx chip
Destination: PCTL chip

COMMAND 23 (10111):
Description: Transfer appropriate data, This command is used whenever actual information is sent to the P-RAM.
Data Field: The data byte received in the current time slot.
Source: RxTx chip
Destination: P-RAM COMMAND 24 (11000):
Description: Read the first byte of the last time slot's CRC.
Data Field: Least significant CRC octet.
Source: P-RAM (OBCO-OBFF)
Destination: RxTx chip COMMAND 25 (11001):
Description: Read the second byte of the last time slot's CRC.
Data Field: Most significant CRC octet.
Source: P-RAM (OBCO-OBFF)
Destination: RxTx chip COMMAND 26 (11010):
Description: Read Busy/Free Table Entry of current time slot.
Data Field: See Table B-11
Source: P-RAM
Destination: PCTL chip COMMAND 27 (11011):
Description: Update Busy/Free Table Entry of current time slot.
Data Field: See Table B-11
Source: PCTL chip
Destination: P-RAM COMMAND 28 (11100):
Description: Send HASH address to PCTL.
Data Field: See Table B-37
Source: RxTx chip
Destination: PCTL chip COMMAND 29 (11101):
Description: Read HASH table entry.
Data Field: See Table B-12 Note this byte is used by the PCTL chip only.
Source: P-RAM
Destination: PCTL chip COMMAND 30 (11110):
Description: Update Network Rx Write Pointer
Data Field: See Table B-6
Source: PCTL chip
Destination: P-RAM COMMAND 31 (11111):
Description: Send Packet Status. The RxTx sends status to the PCTL, stating any errors detected after the entire packet has been received.
Data Field: See Table B-35
Source: RxTx chip
Destination: PCTL chip

RXTX/PCTL OPERATION

In this section it is assumed that multiple channels are supported, and the terminals coupling RXTX 90 with PCTL 92 are broadly referred to as the interchannel bus (ICB).

Timing Mark Generation

Upon initialization, it is necessary to establish system timing. To do this, CPU 72 sets the M/S bit in the TM Master/Slave Register (Table B-22) for each control/interface circuit which CPU 72 desires to be a potential TMG. Each potential TMG waits a random length of time (up to about 50 milliseconds) and then its timing mark state machine transmits TM packets on all channels.

In the tables that follow, the time period refers to the current octet on the node input (not the octet on the ICB). Also note that the commands in some delimiter time periods are labeled "early," "late," or "normal." An "X" means either a 0 command or no command at all is sent (the delimiter or pad time period was curtailed).

Tx time slots start during the pad of the previous time slot. At this point, the time slot counters in the RxTx chip and PCTL chip are incremented (using the signal on ync Terminal 298). The Tx state machine is allowed two commands for every octet. Since all pads except TM pads are 12-bits wide, there can be up to 3 commands during these times.

| Time Period | Command | Comments |
|---|---|---|
| Pad time before timeslot (12 bits) | (1,2,3) | Enable Tx Modem 4 bits before start of Tx frame. Cmds 1–4 automatically issued, but they are ignored for TMs. |
| Send Preamble (8 bits) | (4,6) | TM master/slave bit (Table 22) determines if the Tx modem is enabled. If not, nothing is sent, but the command sequence continues. |
| Send TM delimiter (F0h) (8 bits) | (7,8) | Fetch frame number from an RXTX register. CMDs 8 & 9 are for CRC (frame number) checking of last time slot. Not applicable to first TM. |
| Send Frame number (8 bits, data byte 1) | (7,9) | Start CRC accumulation on Tx'd packet with this byte. Fetch first byte of TMG ID information from P-RAM TxTM buffer. |
| Send TMG ID #1 (8 bits, data byte 2) | (7,0) | Fetch second byte of TMG ID information from P-RAM Tx TM buffer. |
| Send TMG ID #2 (8 bits, data byte 3) | (7,0) | Fetch first byte of boot control information from P-RAM Tx TM buffer. |
| Send Boot Control #1 (8 bits, data byte 4) | (7,5) | Fetch second byte of boot control information. |
| Send Boot Control #2 (8 bits, data byte 5) | (14,0) | CMD 14 is issued but is meaningless for TM transmission. |
| Send CRC LSB (8 bits) | (0,0) | No command activity while CRC is sent. |
| Send CRC MSB (8 bits) | (0,0) | Save CRC in PRAM CRC buffer. Turn off TX modem at end of CRC. |

If a control/interface circuit 80 receives the TM packet that it sent intact, it assumes the status of master TMG. The other control/interface circuits clear the M/S bit, assume the status of slave TMGs, and monitor their respective channels to ensure that the master TMG is sending valid TM packets.

The following is performed when receiving TMs:

| Time Period | Command | Comments |
|---|---|---|
| Rx TM Preamble | (17,18) | CMD#17,18,19,20 are automatically issued but are ignored by the PCTL for TMs. |
| Rx TM Delimiter | early (19,X) normal (19,0) late (19,0,X) | |
| Rx Frame Number (Data Byte 1) | (20,22) | Start CRC accumulation. Here, the delimiter status is known. The RxTx will continue issuing commands regardless of whether a delimiter is detected or not. If not, the PCTL will ignore data xfer commands (#23) |
| Rx TMG ID Byte #1 (Data Byte 2) | (23,21) | Write Frame Number into P-RAM Rx TM Buffer. Also save (at least) 3 lsbs of frame in temp register. The Frame Number appears on the ICB. TM history reported (# missed & # good). |
| Rx TMG ID Byte #2 | (23,24) | Write TMG ID Byte #1 into P-RAM Rx TM Buffer. CMDs 24 & 25 are issued to support CRC checking on the last time slot. |
| Rx Boot Control #1 (Data Byte 4) | (23,25) | Write TMG ID Byte #2 into P-RAM Rx TM Buffer. |
| Rx Boot Control #2 (Data Byte 5) | (23,30) | Write Boot Control #1 byte into P-RAM Rx TM Buffer. CMD#30 is issued while the last data byte is arriving, but is ignored here. |
| CRC LSB | (23,0) | Last TM data byte transferred. Write boot control #2 byte into P-RAM Rx TM Buffer. The Tx'd CRC of previous time slot is compared to Rx'd CRC (stored in RxTx). Results in CMD#31. |
| CRC MSB | (0,0) | |
| PAD before SP slot | early (31,0,X) normal (31,0) late (31,X) | TM status reported. The TM has an 8-bit pad instead of 12. Check Rx'd CRC register for zero immediately after incoming CRC is shifted through. If CRC checks, load receive frame #(Mod 8) into RxTx's Rx Frame Register. Set "TM Rx'd" bit in RXTX Receive Status Register if slave mode is selected, and increment consecuive Rx Valid TM register. If CRC is bad, increment Rx Frame register and increment RX TM CRC error register. If this TM is received < 1 ms after the previous TM, set Multi-TMs and TM Int bit in TM status register. If no TM was detected at all, increment missing RXTM register and consecutive missing RXTM register, and set pending interrupt in TM Status register if missing TM threshold has been reached. If a good TM was received but the frame count is out-of-sequence, increment TM out-of-sequence register. |

In the event that TM packets on any channels stop for some number of consecutive frames (as determined by the Threshold register (Table B-18) and the Consecutive Missing TM register), the backup TMGs arbitrate to become the new master TMG.

Since the TM is much smaller than the other packets, CMDs #26, 27, 16, 28, & 29 are not issued.

Receive Frame Timing

Once the master TMG is established, each control/interface circuit 80 must establish proper receive and transmit frame timing. This is done by first capturing and locking into the incoming TM packets. Both master and slave TMGs perform this function. After coming out of reset or after the TM window bit in TM Command/Lock Status register (Table B-23) is set to zero by CPU 72, RXTX 90 will begin searching continuously (i.e. the search window is "wide open") for good TM packets. During this time, no other packets are recognized. It is possible to detect several good TM packets within a millisecond, since there may be different devices arbitrating to become the master TMG. Errors will be recorded to prevent a false lock. Once a steady stream of TM packets is detected with TM packets spaced about a millisecond apart, with good CRCs and good frame numbers, RXTX 90 will lock the incoming frame by setting the TM Window bit to one. This means that RXTX 90 will search for TM packet delimiters during a small window at a predicted time (every millisecond). This leaves the rest of the frame for servicing other packets, and RXTX 90 can function normally. Furthermore, looking for TMs only when they are expected prevents occasional voice data which mimic TMs with valid CRCs from causing receiver synchronization malfunction.

CPU 72 sets the "TM lock threshhold" in the TM command register (see Table B-23) to determine how many consecutive good TM packets must be detected before the frame is locked. RXTX 90 will lock the frame automatically when this threshhold is reached. If the chosen threshhold is too long, CPU 72 can lock the frame manually by setting the TM Window bit to one. In this embodiment, RXTX 90 cannot automatically declare loss of frame and open the search window by itself to reestablish it. Even if several frames have passed without good TM packets, RXTX 90 must continue to predict frame boundaries until the device is reset or CPU 72 gives an explicit command to open the window.

After the TM lock threshhold is reached, the receive frame is established upon reception of the next good TM packet. After checking the CRC of the incoming TM packet and determining that the packet is free of errors, RXTX 90 counts the number of bits of the TM pad time and creates a bit-wide pulse during the last bit of the TM pad. See FIG. B-5. A number of bits in an SP is then counted, and the first voice time slot is marked by a pulse. This continues until the next TM time slot where the pulse is lengthened to 8 bits to mark the beginning of a new frame. Once the receive frame is locked, the receive frame time pulses are meaningful. These timing pulses are shared with PCTL 92 (via RXS terminal 282) and allows control/interface circuit 80 to receive information within distinct time slot boundaries.

In this embodiment, if the TM packet received has a CRC error, the beginning of the SP time slot is determined from the last good TM packet. That is, RXTX 90 continues predicting time slot boundaries even if the TM packet is bad. A separate signal indicates whether the present frame is forward or reverse. This is determined by the LSB of the received frame number of a good TM packet (in this embodiment, if the TM packet is bad, the signal is toggled). This signal will be valid after the TM CRC is checked for the SP time slot.

The pulses of the receive frame signals mark the predicted time of arrival of a preamble. In actuality, a packet may arrive four bits earlier or later (because of reclocking by HRU 50). Because of this, a 16-bit window is established in which the delimiter may be found. See FIG. B-6. A delimiter that lies partly or wholly outside this window must be ignored so that neighboring time slots are not affected. After the receive frame is locked, the TM and VP slots use 16-bit windows. The SP slots use 16-bit windows also unless the SSP is expected. The pulse for the next time slot does not change if a delimiter of the current time slot is early or late. This is because the source of transmission of the next time slot is independent. The shift in timing caused by an early or late delimiter is absorbed by the preamble or the pad (one or the other is shortened).

Skew Calculation

As explained in the discussion of Network Timing, the Tx frame must start a skew time before the Rx frame. Therefore, before Tx frame timing may be established, skew must be calculated. This is done by transmitting and receiving a skew signalling packet (SSP). The skew is represented by the number of bit times (of the 5.018 Mhz clock) it takes for the round trip delay. To account for skew variations during operation, skew for a particular device is recalculated every time it sends an SP.

A Signalling Packet is sent out during the SP timeslot, according to the SP Space and Tx Channel bits of the command. In addition, this transmitted packet is received and the CRCs of each are calculated and compared to detect collisions. An interrupt is given after this receive check is performed giving the results. The hardware clears the command after the packet is transmitted to ensure the same packet is not transmitted again.

All SPs transmitted are either 14 bytes long or 60 bytes long from the end of the delimiter to the start of the CRC (i.e. control/interface circuit 80 always transmits one of these lengths). The short packets are used to set the skew so that they do not interfere with the first voice timeslot if the actual skew of the control/interface circuit is great. The maximum length packets are used at all times thereafter.

A new skew calculation is performed whenever a Tx SP command is given by CPU 72. The new value is only accepted by control/interface circuit 80 if the SP was received correctly.

The command sequence is generally the same for SPs and SSPs so both will be described now. RxTx 90, however, will generate and send a CRC after the 14th byte of an SSP. The Tx modem will be disabled after the CRCs are sent, but the command sequence will continue as if a regular SP is being processed. All commands issued after the SSPs CRC are ignored.

Since different types of SPs may have different priorities, SPs are placed in eight different partitions in this embodiment. The partitions are determined by a modulo eight frame counter (modulo four cycle counter) transmitted by the master TMG. CPU 72 specifies, via the SP command register, in which one or more of the eight partitions it can be sent. RXTX 90 then transmits the SP on the next allowable frame. This partitioning scheme is simple enough to be implemented in hardware, thus freeing CPU 70 for more important tasks.

| Time Period | Command | Comments |
|---|---|---|
| Channel Change Pad (3 bytes) | (0,0) | Re-tune Tx frequency time synthesizer to transmit channel specified in Tx SP command register LSB. |
| Pad time before SP (12 bits) | (0,0,0,1,2,3) | Inspect both SP command Registers (MSB and LSB) If command pending, check Spbits to see if it can beXmt'd this frame. If so, set flags to tell Rxstate machine that an SPis being sent this frame, and its length (short orlong). Then enable TxModem 4 bits before transmission is tobegin. If no SP is to betransmitted this frame, no furthur Tx SPprocessing is required. Cmds 1–4 are ignored forSPs. |
| Send Preamble (8 bits) | (4,6) | Clear CMD bits of SP command register, making it inactive so it is not executed again. The SP Command Regs determine fi the Tx modem is enabled. If not, nothing is sent, but the command sequence continues. |
| Send SP Delimiter (CCh) (8 bits) | (7,8) | Read first byte of SP from Tx SP buffer (assumed to be LSB of destination address). CMDs 8&9 are for CRC checking of previous time slot. |
| Send SP Data bytes (14 total if SSP, 60 total if normal SP) | | Read next byte to be transmitted during the transmission of the previous byte. |
| Data Byte 1 (Destination address LSB) | (7,9) | Start accumulating CRC on destination address LSB. Also start Skew Counter as first data bit is shifted out to the network. |
| Data Bytes 2–58 | (7,0) | |
| Data Byte 14 or 59 | (7,5) | |
| Data Byte 60 or 14 | (14,0) | CMD 14 is issued but is meaningless for SP transmission. |
| Send CRC (2 bytes) | (10,11, 0, 0) | Save value of CRC register in PRAM for use by Receive State machine in doing collision detection. Turn off Tx Modem at end of CRC. CVP processing (CMD 10, 11) takes place but is meaningful only if there is a CVP command and if the frame is correct (fwd or rev). See the |

| Time Period | Command | Comments |
|---|---|---|
| | | command sequence for CVPs. |
| Idle Time (SSPs only - up to 46 bytes) | (0,0) | |
| Channel Change Pad (3 bytes) | (0,0,0,0,0,0) | Re-tune Tx frequency Synthesizer to normal transmit frequency as specified in RxTx register. |

Control/interface circuit 80 will receive any SP sent on the channel to which it is listening, except when that control/interface circuit is transmitting an SP on another channel during that frame.

The receive sequence for SPs and SSPs are the same except for the length of the data byte field. The RxTx will know if it had just sent an SSP because it will have set the TX SSP bit in the SP Status Register. Since the SSP is much smaller in length than an SP, it may be received in a much larger window during the SP time slot. Because of this, there may be a long sequence of NOPs (Command 0) when waiting for the arrival of an SSP packet.

| Time Period | Command | Comments |
|---|---|---|
| Channel Change (3 bytes) | (0,0,0,0,0,0) | No ICB activity. RxTx 90 is changing channels. |
| Rx SP Preamble time | (17,18) | Active and timeslot map regs are read but ignored for SPs. |
| Rx SP Delimiter time | early (19,X) normal (19,0) late (19,0,X) very late (19,0, . . .,0,X) | For SSPs ONLY Send CMD 0's until delim is found or until window is closed. |
| Rx SP Dest. Address (Data Byte 1) | (20,22) | CMD #20 is ignored for SPs. Here the delimiter status is known. The RxTxwill continue issuing commands regardless of whether a delimiter is detected or not. If not, the PCTL will ignore CMD#23. Start accumulating Rx CRC with this byte, which is the least significant byte of the destination address. Read "SP BF Buffer Status Register Full" bit. If full, do not transfer any bytes of incoming SP to the Rx SP Buffer and stop processing. Increment missed RXSP count bits if address hash passes. |
| Rx SP Dest. Address (Data Byte 2) | (23,26) | Write LSB of destination address to Rx SP Buffer - increment pointer into P-RAM. The first Data byte appears on the ICB. CMDs 26 and 27 are ignored for sps. |
| Rx SP Control Field (Data Byte 3) | (23,27) | Write 2nd LSB of Address to Rx SP Buffer - increment pointer. Latch bits <0:5> of Rx CRC calculation after first 4 bits of Control byte shifted into CRC checker. |
| SP Data byte 4 [Remainder of physical address treated as Data by hardware.] | (23,16) | Write SP Control Field to Rx SP Buffer - increment pointer. CMD 16 is ignored. |
| Data Byte 5 | (23,28) | After 3 data bytes (2 address, 1 control) is known, the address HASH is calculated |
| Data Byte 6 | (23,29) | Using first bits of control field concatenated with bits <0:2> of latched CRC as the address into the P-RAM resident hash Table (PA<4:3>), read appropriate byte. Use bits <3:5> to select a single bit in the Hash table entry (PA<2:0>). If this bit is set, the packet has passed the address hash. Terminate Rx SP processing if address hash does not pass. |
| Data Byte 7 | (23,21) | Here, the HASH results are reported. The RxTx continues to issue commands regardless of whether the HASH is passed or not. |
| Data Byte 8 | (23,24) | The Tx'd SP CRC is compared with the Rx'd CRC (stored in RxTx). |
| Data Byte 9 | (23,25) | |
| Data Bytes 10-59 or DBs 10-13 for SSPs | (23,0) | |
| Data Byte 60 or DB 14 for SSPs | (23,30) | CMD#30 is issued while the last data byte is arriving, but is ignored for SPs. |
| CRC LSB | (23,0) | Place data byte 60 into Rx SP buffer. |
| CRC MSB | (0,0) | |
| Idle time (SSP ONLY) (up to 46 bytes) | (0,0) | Depending on when an SSP is rx'd, there may be idle time. |
| Channel Change (3 bytes) | (31,0,0,0,0,0) | Packet status is reported. RxTx is changing channels. |
| PAD time before VTS | early (0,0,X) normal (0,0) late (0,X) | If CRC checks (i.e. Rx CRC calc. equals zero after received CRC shifted through), set the "SP BF Full" bit, the Rx Good bit in the SP status register, and set the SP interrupt bit. If CRC does not check, set the CRC MMatch bit and increment the RxSP CRC Error register and generate an interrupt if enabled. Update the skew registers (MSB and LSB) with the skew value. |

Changes in skew values will not generate interrupts to the CPU. The skew registers however, can be read by the CPU, in case variations need to be monitored.

Transmit Frame Timing

In this embodiment, the Tx frame is generated two different ways depending on whether control/interface circuit 80 is a master TMG or a slave. For a slave, the start of the Tx frame depends on when the TM was received and the length of the skew. For a master, the Tx and the Rx frames are independent.

Slave Mode

Slaves are all control/interface circuits except for the device that is a master TMG. As noted above, the Tx frame must start a skew time before the Rx frame. However, the control/interface circuit needs to know the beginning of the Rx frame to establish the beginning of the Tx frame. One way to circumvent this dilemma is to establish the beginning of the next

Tx frame

Each Rx frame is given a frame number by the master TMG. The Rx frame with frame number N will establish the beginning of the Tx frame with frame number N+1 (See FIG. B-7). The beginning of the TX frame is determined by counting down from a fixed point in the Rx frame until this counter equals the skew count register. This fixed point must be far enough from the end of the Rx frame so that the maximum possible skew that the system will tolerate can be supported. This point is thus called the maximum skew point or MSP.

The time slot boundaries of the Tx frame are slightly different from that of the Rx frame. Instead of starting during the last bit of the previous packet's pad time, the pulse occurs at the beginning of the pad time. This allows RxTx 90 to prepare for data transmission well before the upcoming preamble (See FIG. B-8).

Master Mode

If a control/interface circuit is the Master TMG or if it is contending to become the TMG (during power up or the loss of the Master TMG), the start of the Tx frame is independent of the Rx frame. The start of the Tx frame is dependent, however, to the start of the Tx frame of other TMGs in the system. The control/interface circuits can work by themselves, but in this embodiment, all TMGs are synchronized (via the C-M/S bit in the TM Command/Lock Status register (Table B-23) and SYNC terminal 298) so that transmissions of TMs occur simultaneously.

The pulses for the Tx frame during Master Mode is the same as for Slave Mode. That is, the beginning of a time slot is marked by a pulse at the beginning of a previous time slot's pad time.

Notice that the Rx timing differs from Tx timing in that Rx time slot boundaries are predicted values. Frame boundaries are aligned after receiving a good TM, but since each time slot contain information from varied sources, the first byte of the packet, the preamble, may actually appear 4 bits earlier or later than the predicted time slot boundary. (The theoretical limit for error is plus or minus 2 bits, but the RxTx chip will accept up to plus or minus 4 bits of error).

Because of this discrepancy, it cannot be guaranteed that there will be a total of four commands during the preamble/ delimiter time. Worst case, a time slot can receive a packet 4 bits earlier than predicted. Since the time slot counter changes at the predicted preamble time, half of the preamble time will have already passed if a packet comes early. This, effectively, allows for only one command during the preamble time. If the preamble is late by (worst case) 4 bits, there may be up to three commands during the preamble.

Since it is not known whether a packet is early or late until the delimiter is detected, this discrepancy is taken care of during the delimiter window. Two ICB commands will be sent during the predicted preamble time, but during the delimiter time one, two or three commands are sent depending on whether the packet is early, on time or late, respectively.

The PAD is affected also. If the packet is late the pad time is shortened; hence, there may be only two commands instead of three during the 12 bit pad of voice time slots and only one command instead of two for the 8-bit pads of TM and SP time slots. If the packet is early, the pad time is lengthened; hence, there may be up to four commands during voice time slot PADs and up to three for TM and SP PADs.

Other Network Commands

After the appropriate timing parameters have been established, normal command processing may take place. A more detailed description of the other network commands and how they are processed using the RXTX/PCTL commands shall now be described.

Transmit Claiming Voice Packet (Tx CVP)

The CVP command register is used to determine if there will be CVP transmission in the present time slot. The command instructs control/interface circuit 80 to send a single VP out on the selected VP timeslot and check the transmission coming back to detect collisions. If this one shot packet is transmitted and received with no errors, this unit has successfully claimed the selected VP timeslot, and can set up a normal Tx VP command. If not, the unit can try to claim another timeslot.

The control/interface circuit checks the selected VP timeslot's busy/free table entry before sending the CVP (during SP processing) to eliminate race conditions on a claim. If it is found to be already busy, the control/interface circuit inhibits the CVP transmission, sets a status bit, and reports this condition via an interrupt. If the claim was actually sent, the busy/free entry is left free. This allows units involved in CVP collisions to arbitrate between themselves for the timeslot. Other units will not be able to claim the slot as their busy/free tables will indicate that the timeslot is busy. This feature is especially useful for multiple responders.

| Time Period | Command | Comments |
| --- | --- | --- |
| Pad time before each VTS | (1,2,3) | Check CVP command register to see if a claim is to be made this timeslot; if so, CMDL is ignored. (Claim over-rides normal voice transmission). Read Busy/Free table entry for this timeslot during SP command processing. If the timeslot is already busy (Busy/Free entry is not above threshold), set the Block and CVP Int bit in the CVP status register to inhibit transmission of claiming VP. If the timeslot is free, enable TX Modem 4 bit times before start of preamble. Also clear the CMD bits |

| Time Period | Command | Comments |
|---|---|---|
| | | to prevent the CVP from being sent again next cycle. |
| Claim VP Preamble | (4,6) | Send Preamble. |
| Claim VP Delimiter (33h) | (7,8) | Send VP Delimiter. Read byte number 1 of TX CVP buffer. CMDs 8 & 9 are for CRC checking of previous time slot. |
| Send Data Byte 1–16 of claim VP | | Start CRC accumulation on first data byte. During each data byte from 1 - 15, read next byte to be Tx'd from Tx CVP buffer. |
| Data Byte 1 | (7,9) | |
| Data Bytes 2–14 | (7,0) | Transfer remaining data bytes. |
| Data Byte 15 | (7,5) | Check PCTL transmit status. |
| Data Byte 16 Pointer back to P-RAM. CRC computed on data | (14,X) | Write new Net Tx Rd Save bytes 1 - 16 until next PAD, at which time it will be written to P-RAM. |

The results of CRC checking are not known until the following time slot since the CRC matching is done then. RxTx needs to remember the transmit time slot to send the CVP (n) and the receive time slot to check it (n+1). If the CVP is transmitted, it is received and its status reported with an interrupt. The possible conditions are successful claim (Rx'd packet matched Tx'd packet), collision detected, or nothing detected.

Transmit Voice Packet (Tx VP)

This command, given via the Tx Active Table entry for the selected voice timeslot, instructs control/interface circuit 80 to transmit 16 bytes of voice data onto the network during this timeslot each cycle. It gets this voice data from the P-RAM via PCTL 92, which has been previously set up by CPU 72 to deliver data from the correct PCM Highway timeslot or tone buffer.

This command is not used until the selected voice timeslot has been successfully claimed, hence there is no need to check for collisions. For maintenance reasons, however, a CRC will be computed on both the transmitted and received 16 byte data field. These values will be compared for each transmission, and any error will be logged in the Tx Packet Bit error register.

| Time Period | Command | Comments |
|---|---|---|
| Pad time before each VTS | (1,2,3) | Store calculated Tx CRC of packet sent in previous timeslot (in P-RAM) in case required by Rx State Machine for Tx and Rx comparison (e.g. SP, CVP). Read Active table and prepare pointers. The Tx modem is enabled 4 bits before the start of the preambleif active. If not, nothing is sent, but the command sequence continues. |
| | | If channel change bit set, load new Tx modem channel into current channel register and do notallow a transmit this slot. |
| VP Preamble from Tx Silence | (4,6) | Send Preamble. Also, get Net Rd pointer for PCM Highway timeslot transmit ring buffer in P-RAM. If the active/idle bit in mapping register indicates silence be sent, send da buffer instead of from transmit ring buffer. |
| VP Delimiter (33h) | (7,8) | Send VP Delimiter. Get the first data byte from the P-RAM using Net Transmit Read Pointer. Increment this pointer |
| (only inside PCTL). VP Data Byte 1–15 | | Send VP Data. During transmit of byte N, fetch byte N + 1 from P-RAM, and increment pointer inside PCTL. Compute CRC on data bytes. |
| Data Byte 1 | (7,9) | CMDs 8&9 are for CRC checking of previous time slot. |
| Data Bytes 2–14 | (7,0) | Transfer remaining data bytes. |
| Data Byte 15 | (7,5) | Check PCTL status. |
| Data Byte 16 | (14,X) | Send VP Data. Write new Net Tx Rd Pointer back to P-RAM. Save CRC computed on data bytes 1–16 until next PAD, at which time it will be written to P-RAM. |

Receive Voice Packet (Rx VP)

This command, given in the Receive Active Table entry for the selected timeslot, instructs RxTx 90 to receive incoming packets during this timeslot and transfer them to P-RAM 82 under control of PCTL 92. PCTL 92 has been previously set up by CPU 72 (through P-RAM) to deliver data to the correct PCM Highway timeslot receive ring buffer.

| Time Period | Command | Comments |
|---|---|---|
| Rx VP Preamble [or TM preamble, if last VTS] | (17,18) | Read Receive Active Table entry for this VTS. If timeslot is not active, continue processing only until busy/ free table update is performed. If a CVP was sent during this Tx timeslot, perform sequence and busy/free update specified under Tx CVP command. |
| Rx VP Delimiter | early (19,X) normal (19,0) late (19,0,X) | |
| Rx VP Data Byte 1 | (20,22) | If anything but silence is recognized, clear busy/free to zero and write this byte back to P-RAM. If only silence is recognized by the time data byte 1 should be |

85
-continued

| Time Period | Command | Comments |
|---|---|---|
| | | shifted into RxTx, add one to busy/ free byte (unless already 255), and write back to P-RAM. If Rx active table entry indicates voice or boot is active, and the busy/free entry has just passed its "free" threshold as set in the threshold register, set the disconnect bit in the PCTL Receive status register and clear the active bits in the Rx active byte. Also write this byte back to the Rx Active table and set the Disc and VP Int bits in the VP status register. Start CRC calculation on this byte. Here, the delimiter status is known. The RxTx will continue issuing commands regardless of whether a delimiter is detected or not. If not, the PCTL will ignore CMD#23 below. |
| Rx VP Data Byte 2 -> 16 | | During reception of byte N, write byte N-1 to Receive ring buffer in P-RAM and then increment Net Rx Write Pointer as stored in PCTL. |
| Rx Data Byte 2 | (23,26) | The first data byte appears on the ICB. |
| Data Byte 3 | (23,27) | B/F and active table commands issued to PCTL chip. If a delimiter is found, the B/F = busy except for CVPs. For CVPS, B/F = free until the VPs are rx'd in the time slot. |
| Data Byte 4 | (23,16) | |
| Data Byte 5 | (23,28) | The HASH commands are issued but results are ignored. |
| Data Byte 6 | (23,29) | |
| Data Byte 7 | (23,21) | |
| Data Byte 8 | (23,24) | If Tx VP CRC checking is enabled for last timeslot, read CRC calculated on Tx'd VPfor that time slot. Compare to Rx CRC calculated on last Rx'dVP (stored in RxTx temp. register). If these do not match, increment the Tx Packet Bit Error Register. |
| Data Byte 9 | (23,25) | |
| Data Bytes 10–15 | (23,0) | |
| Data Byte 16 | (23,30) | Write pointer updated while last DB is still arriving. |
| PAD before next TX | early (23,31,0,X) normal (23,31,0) late (23,31,X) | Write byte 16 to Receive ring buffer and increment pointer stored in PCTL. Write new Net Rx Write Pointer back to P-RAM. Save Rx'd CRC calculated on data bytes of this VP |

86
-continued

| Time Period | Command | Comments |
|---|---|---|
| | | in temporary register for use during next timeslot to recognize VP CRC errors. Store 0 if no packet was Rx'd - i.e. no VP delimiter was detected. This ensures the TX Packet Bit error register records a bit error in the delimiter. |

Transmit Boot Packet (Tx BP)

This command, given via the Transmit Active Table entry for the selected voice timeslot (and enabled via a boot mode bit), instructs control/interface circuit 80 to send the next 16 bytes of the currently selected boot buffer (0 or 1) out during this timeslot, using the corresponding boot delimiter. If this 16 bytes completes the buffer, control/interface circuit 80 will automatically switch to the other buffer, set status bits, and interrupt the CPU.

| Time Period | Command | Comments |
|---|---|---|
| Pad time before each VTS | (1,2,3) | If boot bit in table is set and boot mode is enabled, enable Tx modem 4 bits before the beginning of the preamble. If not, it is disabled, but the command sequence continues. CMD#2 & 3 are ignored. |
| BP Preamble | (5,6) | CMD#5 is issued instead of 4 to get current boot buffer from the PCTL transmit status register. This decides the delimiter. |
| BP Delimiter (FCh or 03h depending on the boot buffer used) | (7,8) | Send delimiter of current boot buffer in use (0 or 1) as indicated by the CUR buffer bit. Read next boot data byte to be sent from current boot bufferusing the transmit boot pointer register. Increment boot pointer. |
| BP Data byte 1–15 | | Send boot data byte. Read next boot data to be sent and increment boot pointer in PCTL. |
| Data Byte 1 | (7,9) | CMDs 8&9 are for CRC checking of previous time slot. |
| Data Bytes 2–14 | (7,0) | Transfer remaining data bytes. |
| Data Byte 15 | (7,5) | Check PCTL status. |
| BP Data byte 16 | (14,X) | Send boot data byte. If boot pointer has rolled around to 0 (from 255), toggle current boot buffer bit, set boot switch and empty buffer bits. Set the TX switch, Tx Buf Num and BP Int bits in the BP status register to generate an interrupt. |

Receive Boot Packet (Rx BP)

The following is performed for a Rx BP command by the Receive State Machines.

| Time Period | Command | Comments |
|---|---|---|
| Rx BP Preamble | (17,18) | |
| Rx BP Delimiter | early (19,X) | |
| | normal (19,0) | |
| | late (19,0,X) | |
| Rx BP Data Byte 1 | (20,22) | Here, the delimiter status is known. The RxTx will continue issuing commands regardless of whether a delimiter is detected or not. If not, the PCT1 will ignore CMD #23. If boot delimiter type matches current Rx boot buffer in use, leave current boot pointer intact. If the new delimiter is different, toggle the current boot buffer bit, and reset the receive boot pointer to 0. |
| Rx BP Data Byte 2 -> 16 | | While BP data byte N is being Rx'd, write BP byte N-1 to the current boot buffer in P-RAM. Increment boot pointer in PCTL. |
| Data Byte 2 | (23–30) | The first data byte appears on the ICB. |
| Data Byte 3 | (23,27) | |
| Data Byte 4 | (23,16) | |
| Data Byte 5 | (23,28) | The HASH commands are issued but results are ignored. |
| Data Byte 6 | (23,29) | |
| Data Byte 7 | (23,21) | |
| Data Byte 8 | (23,24) | The Tx'd CRC of previous time slot is compared to Rx'd CRC (stored in RxTx). Results in CMD#31 |
| Data Byte 9 | (23,25) | |
| Data Bytes 10–15 | (23,0) | |
| Data Byte 16 | (23,30) | Write pointer updated while last DB is still arriving. |
| PAD before next VTS | early (23,31,0,X) | Write BP byte 16 to current boot buffer. Increment boot pointer, modulo 256. If carry out occurs, toggle current boot buffer bit and set an interrupt pending, with status indicating buffer was filled when switch occurred. Also latch boot buffer number (0/1) before the switch so that software knows which buffer to process. |
| | normal (23,31,0) | |
| | late (23,31,X) | |

Transmit Silence (Tx Silence)

This command is implemented via a normal Tx VP command, combined with the active/idle bit in P-RAM's Network Transmit—PCM Timeslot Map Entry for the timeslot.

Packet Controller—PCM Highway Commands

This section briefly describes the operation of the Codec State Machine process. The Codec State Machine is responsible for the following:

Buffering Voice and/or Tone data from/to the codec bus to/from the network for each of the 24 codec bus timeslots.

Sending tones to codec bus timeslots and network timeslots from P-RAM 82. These tone patterns are written by CPU 72 before initiating the tone, and are read out continuously by the codec state machine to the desired timeslots.

Gain level switching of voice and tones toward the codec bus. Voice data from the network and tones destined for the codec bus can be attenuated or amplified as desired via a digital pad controlled by the codec state machine. CPU 72 writes the 256 byte-long PCM translation table into P-RAM 82, and when commanded, the codec state machine will use each voice or tone sample as an address into this table, and send the contents of that location to the codec bus.

Codec Bus Control. The codec state machine provides the transmit and receive enables to control a codec (or SPU) on the codec bus. The timeslot(s) at which it is enabled is programmable by CPU 72 via P-RAM 82. Additionally, the codec state machine provides the enables which allow its PCTL chip to transmit on the codec bus. These are also set by CPU 72 via P-RAM 82.

The codec state machine (hereafter called CSM for short) is a time division multiplexed state machine. It performs operations for each of 24 codec bus timeslots. All of the CSM's commands, data ring buffers, ring buffer read and write pointers, tones, tone pointers, and gain tables are stored in P-RAM 82. All software commands and associated data (such as tones and gain tables) are written into P-RAM 82 directly, as P-RAM 82 is dual-ported between PCTL 92 chip and CPU 72. All required arbitration logic is in PCTL 92. In addition, various status information can be accessed by CPU 72 via P-RAM 82.

The CSM executes a set of actions for each codec bus timeslot. The machine reads a control byte from P-RAM 82 at the beginning of each codec bus timeslot. This byte tells the CSM which actions should be performed for this timeslot in both the receive (to codec) and transmit (toward network) directions, as well as which codec enables, if any, should be given.

The following describes each of the data transfer modes the CSM will support, and gives explanations of each mode. As noted above, PCTL 92 operates on PCM data coded in the mu-255 standard. Hence, the value commonly referred to as "zero" in sign-magnitude is coded as FFh for PCTL 92. Likewise, negative full-scale is coded as 00h, while positive full-scale is coded as 80h.

Receive PCM Highway Commands (to codecs)

Idle

If Idle mode is selected for a given timeslot, the CSM performs no data transfer operations. This mode should be selected for every unused receive codec bus timeslot.

Receive Voice with Gain Switching

This mode is selected for normal voice transfer from an incoming network timeslot to a PCM Hwy Rx timeslot. The CSM performs the following operations:

1. Read Receive (from Network) ring buffer read and write pointers from P-RAM 82.

2. Read a byte from the Receive ring buffer, performing required checks for under or overflow.
3. Update Receive ring buffer read pointer information to P-RAM 82.
4. Read location of gain table for this codec timeslot from P-RAM 82.
5. Send byte read from Receive ring buffer through gain table (use it as address into the 256 byte gain table).
6. Send result of this read operation to codec bus (if enabled).

Receive Tone with Gain Switching

This mode is selected for sending a short tone (less than 256 samples per cycle) to a PCM Hwy Rx timeslot.

This mode can be used in conjuction with a Transmit PCM Hwy command to generate a tone to the network only by filling the gain table with zeros (0FFh), thus sending silence to the codec bus.

The CSM performs the following operations:
1. Read page number (256 byte block in P-RAM) of tone buffer.
2. Read current offset into tone buffer.
3. Read next tone sample to be sent out, using the previous two bytes as address into P-RAM 82.
4. If tone sample is negative full-scale value (deemed illegal), make tone sample=0FFh and write tone offset back into P-RAM as 0. Otherwise, keep tone sample as read, add 1 to offset and write this value back to P-RAM 82.
5. Read location of gain table for this codec timeslot from P-RAM.
6. Send tone sample through gain table (use it as address into the 256 byte gain table).
7. Send result of this read operation to the codec bus (if enabled).

Receive Long..Tone without Gain Switching

This mode supports tones with cycles longer than 256 bytes, but it does not perform gain switching. The CSM performs the following actions:
1. Read current tone page number from P-RAM 82.
2. Read current tone offset in page from P-RAM 82.
3. Read tone sample from P-RAM 82 using above bytes as address.
4. Read beginning tone page number from P-RAM 82.
5. If tone sample is negative full-scale value deemed illegal), make tone sample=0FFh, write current tone offset back into P-RAM as 0, and write beginning tone page number back to P-RAM as current tone page number. Otherwise, keep tone sample as read, add one to 14 bit quantity current tone page and offset, and write the resulting least significant 8 bits back as current tone offset, most significant 6 bits as current tone page number.
6. Send tone sample to codec bus (if enabled).

Receive Short Tone—Terminate this Cycle

This command is identical to the Receive Tone with Gain Switching command except that it will not start another cycle through the tone buffer. It remains at the end of the current tone buffer, constantly reading out the last (illegal) value and sending silence to the Codecs. CPU 72 uses this command to transition between normal tone generation and idle state.

After software switches from a Receive Tone with Gain Switching to this command, it should allow PCTL 92 to finish the current tone cycle before starting another tone or switching to idle. CPU 72 can deduce that the cycle is completed by reading the tone offset pointer in P-RAM 82 a few times and noticing it is at the terminal value (multiple reads are performed to guard against the case where the Terminate this Cycle command is given just after the command word is read for the last tone sample in the cycle. For a short time the terminal value is in the tone offset pointer, but since PCTL 92 is executing a previous command, it will wrap around to zero).

An alternate method is to simply wait 32 milliseconds after issuing the Terminate this Cycle command—this is the longest it could take to finish a 256 byte tone pattern.

The CSM performs the following operations:
1. Read the page number (256 byte block in P-RAM 82) of the tone buffer.
2. Read current offset into tone buffer.
3. Read next tone sample to be sent out, using the previous two bytes as address into P-RAM 82.
4. If the tone sample is negative full-scale value (deemed illegal), make tone sample=0FFh and DO NOT write the tone offset back into P-RAM 82. Otherwise, keep tone sample as read, add 1 to the offset and write this value back to P-RAM 82.
5. Read location of gain table for this codec timeslot from P-RAM 82.
6. Send tone sample through gain table (use it as an address into the 256 byte gain table).
7. Send the result of this read operation to the codec bus (if enabled).

Receive Long Tone—Terminate this Cycle

This command is identical to the Receive Long Tone without Gain Switching command except that it will not start another cycle through the tone buffer. It remains at the end of the current tone buffer, constantly reading out the last (illegal) value and sending silence to the Codecs. The CSM performs the following actions:
1. Read current tone page number from P-RAM 82.
2. Read current tone offset in page from P-RAM 82. 3. Read tone sample from P-RAM 82 using the above bytes as the address.
4. Read the beginning tone page number from P-RAM 82.
5. If the tone sample is negative full-scale value (deemed illegal), make tone sample=0FFh, but DO NOT write current tone offset back into P-RAM as 0, and DO NOT write the beginning tone page number back to P-RAM 82 as the current tone page number. Otherwise, keep the tone sample as read, add one to 14 bit quantity current tone page and offset, and write the resulting least significant 8 bits back as the current tone offset, and the most significant 6 bits as the current tone page number.
6. Send tone sample to codec bus (if enabled).

Transmit PCM Highway Commands (from Codecs)

Idle

If Idle mode is selected for a given timeslot, the CSM performs no data transfer operations. This mode should be selected for every unused transmit codec bus timeslot.

Transmit Voice

This mode is selected for normal voice transfer from a PCM Hwy Tx timeslot to an outgoing network timeslot via a transmit ring buffer. The CSM performs the following operations:

1. Read Transmit (to Network) ring buffer read and write pointers from P-RAM 82.
2. Write the byte received during this codec bus timeslot from the Tx PCM Highway (the codec transmit bus) to the transmit ring buffer, performing required checks for under or overflow.
3. Update Transmit ring buffer write pointer information to P-RAM 82.

Transmit Tone

This mode is selected to transmit the Tone (without gain switching, regardless of which receive tone mode was used) retrieved for the Receive direction to the transmit ring buffer and thus the outgoing network timeslot. If the Receive command was not one of the two Tone Commands, this command will place meaningless information in the transmit ring buffer. The CSM performs the following operations:

1. Read Transmit (to Network) ring buffer read and write pointers from P-RAM 82.
2. Write the tone sample (using non-gain switched value) to the transmit ring buffer, performing required checks for under or overflow.
3. Update Transmit ring buffer write pointer information to P-RAM 82.

Transmit Rx PCM Highway Data

This mode places the data from the corresponding Rx PCM Highway timeslot into the transmit ring buffer. If this PCTL chip is transmitting Rx data onto the Rx PCM Highway, this mode loops that data back towards the network. If another PCTL is driving the Rx PCM Highway during this timeslot, the data placed in the transmit ring buffer is from another control/interface circuit (and hence a different network channel). Thus this mode can be used to bridge VPs between network channels. The CSM performs the following operations:

1. Read Transmit (to Network) ring buffer read and write pointers from P-RAM 82.
2. Write the byte received during this codec bus timeslot from the Rx PCM Highway (the codec receive bus) to the transmit ring buffer, performing required checks for under or overflow.
3. Update Transmit ring buffer write pointer information to P-RAM 82.

Skew Calculation

In the most general case, the HRU receives signals on upstream leg of the network and rebroadcasts them on the downstream leg of the network. The HRU provides a constant phase data signal to the downstream frequency band by adding fractional bit delay to upstream packets, as their relative phase upon reaching the HRU varies with the VIU's physical position on the network, and by inserting a pseudo-silence pattern for times in which there is no upstream data. The HRU uses a digital phase-locked loop (DPLL), well known in the art, to insert this variable fractional bit delay.

A phase-locked loop (PLL) located in the VIU modem recovers the system clock from this downstream signal, and the Receiver/Transmitter circuit uses that clock for receiving downstream data as well as transmitting upstream data.

FIG. C-1 shows a pair of voice interface units (VIUs) 1002 and 1004. The upstream frequency band on the broadband cable is shown schematically as a transmission line 1006, with the downstream frequency band being shown as a receiving line 1008. Each of VIUs 1002 and 1004 transmits in the upstream band (line 1006) as shown by arrows 1010, 1012. Similarly, each of VIUs 1002 and 1004 receives signals in a downstream frequency band (line 1008) as shown by arrows 1014, 1016. A series of timing marks 1018 which appear in the downstream frequency band are shown beneath line 1008 in FIG. C-1.

As can be seen, VIU 1002 is a distance L1 from HRU 1020, while VIU 1004 is a distance L2 from HRU 1020. If VIU 1002 attempted to transmit in a timeslot defined to begin N microseconds after a timing mark 1018 by actually starting the transmission N microseconds after the timing mark is detected, the transmission would actually be received by VIU 1002 at a time t(skew) later. Time t(skew) is $(2*L_1/C)+t_0$, where $L_1$ is the distance to HRU 1020, C is the speed of the signal on the transmission medium and $t_0$ is any delay incurred through the HRU. A transmission from VIU 1004, on the other hand, will be delayed by $(2*L2)+t_0$. Accordingly, data transmitted by VIU 1002 will actually fall farther behind timing mark 1018 than data transmitted by VIU 1004.

This problem has been solved in the past by using a clock on the transmit line as in the ring network, or using the parallel transmit clock as in the Coffey patent discussed earlier. According to the present invention, each VIU upon booting up will determine its particular skew time by transmitting a test data packet and calculating the amount of time before it receives the test data packet. This time then is designated as a skew time, and each information packet transmitted thereafter will be transmitted an amount of time equal to the skew time earlier than the time that the specified timeslot will be detected on receiving line 1008 at that particular VIU. Test packets are transmitted immediately after the reception of the frame timing mark. For example, if a VIU determines a skew time of 38 microseconds, this represents a network of approximately 3 miles in radius (assuming a delay of 6.25 microseconds per mile for an electromagnetic wave in the coaxial medium).

Timing marks 1018 are preferably generated by a timing mark generator located with the HRU or in a separate timing mark generator which is coupled to some point along the transmission line. The timing mark generator can be at any location on the cable, but must broadcast within all of the frequency bands. The timing marks then will be translated into the downstream frequency band by HRU 1020.

FIG. C-2 is a block diagram of the circuitry of any node connected to the system. A media interface unit couples the node to the media and to the control logic. An application interface unit couples the particular application to the control logic and the media. This core technology makes modularity possible and drastically reduces the complexity and time required for new application product development, enabling delivery of high quality, reliable products far more quickly.

A timing mark transmitted by a Timing Mark Generator Unit, is broadcast once per millisecond, establishing the link frame structure. Each VIU's RxTx circuit, after checking the timing marks for integrity, locks its internal counters to the framing established by the timing marks.

The VIU's CPU commands the RxTx and PCTL circuits to send signalling packets in the timeslot immediately following the timing mark. RxTx measures the skew time of the first such SP and adjusts its transmit frame to start (SKEW) bits before the next timing mark is received (i.e., before its receive frame starts). Thus, any signalling or voice packets transmitted by a VIU will appear at the HRU at the correct instant referenced to the timing mark.

Establishing Voice Telephone-Link

To establish a telephone call, a user picks up a phone 22 of FIG. A-4, and dials an extension number or an outside line. If an outside line is dialed, trunk interface unit 25 of FIG. A-1 is the destination, and will act like the other voice stations as described below in establishing a connection to the originating station. The trunk interfacing then performs the necessary translation to send a call out on the outside telephone line.

FIG. D-1 shows a flow chart of the sequence of events of the originating telephone station and FIG. D-2 shows a flow chart of the sequence of events of the receiving telephone station. When microprocessor 72 detects the off-hook condition of phone 22 and the dialled number, it initiates a program stored in DRAM 85 to establish a telephone link.

When off-hook, the telephone sits on its "home" channel, which is one of the four frequency channels on the network, as assigned during a boot operation. The microprocessor, under control of its program, causes the circuitry of FIG. A-4 to monitor timing marks and identify the position of timeslots, and then monitor the timeslots for the presence of pseudo silence. Pseudo silence is a series of alternating 1's and 0's which is inserted by the HRU to maintain synchronization. If other than pseudo silence is detected, this means that a transmission is occurring in a particular timeslot by another station. A table is kept in PRAM 82 of the busy and free timeslots.

The program routine initiated by a telephone call first calls a function designated "claim-new" in order to claim a new timeslot. A random one of the free timeslots in the busy/free table in PRAM is chosen. The timeslot will be free in PRAM if no transmissions have been detected for 8 cycles or more. A dummy transmission packet (CVP—claiming voice packet), containing a unique identifier will then be transmitted in the selected free timeslot. The channel is then monitored to detect the return of the dummy packet on the receiving end of the selected channel as a result of the retransmission by the HRU. The received packet is compared to the originally sent packet, and if it is the same, no collision has occurred with another station trying to transmit.

If the CVP (claiming voice packet) is successful, subsequent occurrences of the timeslot are then filled with dummy data packets to maintain ownership by the originating station. If a collision has occurred, the process is repeated with a random selection of another free timeslot. At the same time that dummy packets are being inserted into the claim timeslot, a signalling packet is sent out on the same channel in the signalling packet position of a frame. This signalling packet specifies the originator's home channel and the position of the voice timeslot that was claimed, in addition to the originator's LUA address and the destination address. Again, the signalling packet is monitored on the return channel to ensure that no collision has occurred. If a collision has occurred, a retransmission is done after a random amount of time. After a successful transmission of the signalling packet on the home channel, modem 70 of FIG. A-4 is switched to the next channel and another signalling packet is sent in the same manner. This process is repeated until a signalling packet has been sent on all channels. The modem is then returned to the home channel to monitor the channel for a response.

At the receiving end, the address node is constantly monitoring for signalling packets addressed to it, even if it is involved in a conversation. These signalling packets (SPs) are filtered by hash tables as discussed earlier. Each node contains a 64 bit hash table for each of its PUA, LUA and SLE addresses. As SPs are detected, the last six bits of the cyclic redundancy check of the address is used to produce a number corresponding to a position in the hash table. If a bit is set in this position, the signalling packet is then examined by software to determine if the address is for this node. If the bit is not set, the SP is ignored. Thus, the hash table provides a quick, initial filtering.

If the node has been addressed, and it is busy, a signalling packet will be sent to a trunk interface unit (TIU) with instructions for it to be retransmitted on the originator's home channel to inform the originator that the called node is busy. Since the modem of the receiving phone is busy, it cannot itself switch to another channel to send the response directly.

If the called node is not busy, it will switch its modem to the caller's home channel and monitor the transmissions to fill its busy/free table. The called node will then attempt to claim the timeslot in the reverse frame of the one occupied by the calling party. The reverse frame is simply an alternate frame, with originating party only occupying every other frame. The definition of which is the forward and which is the reverse frame is accomplished simply by the timeslot being claimed by the originating party being designated the forward frame, and thus could vary.

A timer is set to provide sufficient time for the busy/free table to become valid. When the timer expires, the timeslot of the originating node is examined to see if it is still occupied. If it is not, it is assumed that the call has been terminated. If it is still occupied, the called station attempts to claim the reverse timeslot in the same manner as the originating station claims the initial timeslot. If such a claim is unsuccessful after several tries, a new timeslot is claimed and the originating station is informed in the same manner as if the called station were the originating station. The originating station will attempt to move to the reverse frame of the newly specified timeslot.

Once there is a successful claiming of the reverse timeslot, the called station transmits an indication to this effect to the originating station in a signalling packet. Thereafter, voice transmissions are sent in the voice packets.

Session Layer

As described above, the session layer provides services required to establish and maintain connections between nodes on the network.

Depending on the application and presentation supported on the different types of nodes, session has to support different interface functions. In the case of the VIU and AIU, presentation functions are performed by the codec in the AIU and hardware and software controlling the VIU. The application layer function is to support the common telephone interfaces to the end user. The codec chip provides analog to digital conversion (and vice versa). Hence the services provided by the VIU and AIU sessions also include the following:

(a) Accept and interpret the keyed-in information. Keyed-in information will be suitably decoded by the presentation layer before providing it to the session layer.

(b) Provide the appropriate digital information to the codec to generate suitable tones to the user to indicate call progression.

(c) Monitor the hook-switch changes and take appropriate actions.

(d) Control the flow of digitized voice between the codec and the network.

(e) Provide digital information for the VIU software to display the appropriate status of the calls and feature activations.

In addition to providing services as outlined above, the session layer must rely on certain services from other layers. This includes exchanging signalling information (transport layer), reserving voice circuits (link layer), and tone generation (link layer).

The nodes connected to the network exchange the signalling information using (SP's). In order to communicate with other session layers using these SP's, a session layer must be able to set certain requirements on the way in which an SP is transferred over the network. In general session must be able to specify the RF channel(s) on which a signaling packet has to be transmitted, whether it should be notified of the delivery of the SP or not, cancelling of the SP transmission request etc. In addition it must also receive the notification of any SP received for its consumption. The transport layer provides these services to the session layer.

The transport level supports the following transaction types required by the session layer.

TI(R) is a transaction information frame. It is transmitted as a "reliable" datagram, and will carry session data. An acknowledgement is expected from the receiving session. If no acknowledgement is received within the set time-out, sending session will get notification from the transport.

TI(P) is a transaction information frame. It is transmitted as a "pure" datagram and will carry session data. It requires no acknowledgement from the receiving session. Best effort will be made (by the link layer) to transmit the packet.

TI(R_ACK) is a transaction information frame similar to TI(R). It is transmitted as a "reliable" datagram and carries session data. In addition it will acknowledge the receipt of a transaction being received by the session.

TI(P_ACK) is a transaction information frame similar to TI(P). Transmitted as a "pure" datagram and carries session data. In addition it will acknowledge the receipt of a transaction being received by the session.

TR(S_ACK) is a transaction response frame generated by the session. It is transmitted as "pure" datagram. It will carry no session data and acknowledges the receipts of a TI(R) or TI(R_ACK). In addition, receipt of this frame indicates that the receiving session has accepted the service request. Receiving transport will notify the receipt of this frame to the session.

TR(S_NACK) is a transaction response frame generated by the session. It is transmitted as a "pure" datagram. It will carry no session data and acknowledges the receipt of a TI(R) or TI(R_ACK). In addition, receipt of this frame indicates that the receiving session has rejected the service request. Receiving transport will notify the receipt of this frame to the session.

TR(T_ACK) is a transaction response frame generated by the transport. It is transmitted as a "pure" datagram and acknowledges the receipt of a transaction in proper sequence by the transport. This acknowledgement is for the transport layer and will not be passed to the session.

TR(T_NACK) is similar to TR(T_ACK). However it informs the transport that an out of sequence message was received by the transport.

The digitized voice between two communicating nodes is transmitted on dedicated VTS's. In order to establish a voice communication, a node must be able to reserve a pair of VTS's for its exclusive use. When a node initiates a call request through a SP, it will inform the other node(s) that a particular VTS has been reserved. It will also indicate to that node, which time slot of the reserved VTS pair is going to be used by the requesting node for transmission of digitized voice. If more than one node is willing to communicate, then they must able to contend for the response time slot (the remaining time slot in the reserved VTS pair). The node which is successful in contending for this time slot will get the right to complete the communication with the requesting node.

In order to provide the above function, session layer requires the following services from the link layer:

(a) The ability to reserve a VTS pair. This VTS pair is referred to as a voice circuit ("VC") and is used for full duplex voice communication between the two nodes.

(b) The ability to contend for the response time slot (one of the time slots within the reserved VTS pair).

(c) The ability to specify a delay factor while contending for a VTS. This will give the capability to prioritize the claiming between the contending nodes.

(d) The ability to specify the transmission of either silence or voice on a VTS.

(e) The ability to specify transmission (either voice or silence) without contending for the responding VTS. This will be used when the node is aware of the fact that other nodes are not competing for completing the communication path.

(f) The capability to detect the absence of data on a VC (either silence or voice) for disconnect purpose.

In order to support the standard telephone interfaces to the user, session must be able to provide the codec with the digital data required to produce the appropriate call progression tones. In order to provide this, session requires the following services from the link layer:

(a) The ability to specify the type of tone and direct it to either codec or network or both.

(b) The ability to stop the tone.

(c) The ability to interrupt an active voice path and provide a tone for a specified amount of time and then continue with the voice communication.

(d) The ability to initialize and change the tone buffers used by PCTL 92 for tone generation at run time.

There are 1000 available SP time slots per second, on which a node can transmit a SP. However this SP space is partitioned into eight spaces and a session sending a SP can specify the partition(s) on which this particular SP has to be transmitted. Since the SP space is available to all the nodes, it is possible that more than one node may transmit simultaneously, which will result in collision. These collisions will be detected and suitable actions will be taken by the lower layers. The session layer will be able to specify the transaction type for transmitting the SP. It is the responsibility of the transport layer to guarantee the reliable delivery of a SP (if desired by the session). The SP's will be transmitted by the transport as one of the transaction frames described earlier.

SP's are used by the session layer for the purpose of establishing a call between nodes. SP's are also used for the purpose of activating or cancelling some end user features and for negotiating some special services for the users. It should be noted that a VIU session will generate SP's for AIU, TIU, or NBU sessions (or vice versa). Therefore protocols are described according to the session which initiates the SP flow. Hence the responding node could be of the same or different type. The destination address field in the SP header will determine the node(s) to which a SP is intended for.

Call Processing Protocols

A user action on a VIU (either an attempt to establish a call or activate/cancel a particular feature) may result in a set of protocols (i.e. exchange of different SP's). The discussion below will describe these protocols. When a VIU user initiates a call request (by dialing digits), depending on the digits dialed it will result in one of the following set of protocols. In general when a user intends to make a call request (either to another station on the network or to a off-net number) a CALL_REQUEST SP will be generated. As a general rule the following conventions are observed before transmitting a CALL_REQUEST SP.

(a) Reserve a VC (a pair of VTS's).

(b) Determine the channel (or channels) on which the CALL_REQUEST has to be sent. In general if the CALL_REQUEST is intended for the other similar type of node which has only one modem (an AIU or another VIU), then the CALL_REQUEST SP is sent on all the available RF channels. If the destination node has one modem per RF channel (e.g., TIU's and NBU's), then CALL_REQUEST SP is sent only on one specified channel.

(c) Specify the RF channel on which it expects responses (usually the channel on which the VC has been reserved).

Only CALL_REQUEST SP's will be broadcast on all available RF channels. Other SP's will be transmitted on only one of the RF channels as determined by the CALL_REQUEST SP. There are some exceptions to these rules in some specific protocols.

FIGS. E-1 to E-3 show the SP's exchanged when the destination station is an individual extension ("IE"). FIG. E-1 shows the situation where the IE can accept the call (Note: Apply Ringing is shown as a generic indication, it could as well be a call waiting indication). When the station is initiating a call request for another station on the network it will do so by sending the CALL_REQ_EXT SP. If the responding station is an IE (i.e., it is the only extension with that address on the network) and is willing to accept the call, it will send an ACCEPT(IE) SP on the specified RF channel. When the calling session receives this response, it determines that there is only one station with this extension and acknowledges this station by sending an ACK SP. (It must also be noted that whenever a transport layer receives an ACK packet of any type (TR(S_ACK), TR(S_NACK), TI(P_ACK), or TI(R_ACK)) it will clear its retransmit table of the transaction which caused this particular ACK).

When the receiving station user answers the call, an ANSWER SP will be sent. When this is acknowledged by the calling station, the call will be completed. If no ACK SP is received by the called station within the set time, then the called station will receive dial tone.

FIG. E-2 shows the situation when the called extension is an IE and cannot accept the call because either the station is busy or it has DND in effect. In such a case, it will send a BUSY(IE).

FIG. E-3 shows the situation where, for some reason, no response was received within the set time-out. In such a case, the transport layer will notify the same to the session layer, at which point a REORDER tone will be given to the user.

FIGS. E-4 to E-7 show the situation where the called extension is a MAE, which means that more than one station may respond to the call request. FIG. E-4 shows the case where at least one station can accept the call. In the example there are three stations which have a line appearance for the same extension. Notice that ACCEPT(MAE) and BUSY-(MAE) are transmitted as TI(R) and not as TI(R_ACK). This is done with a purpose. If the transport does not receive an ACK, it will not clear its retransmit table for this transaction. If a station in a MAE has missed the CALL_REQUEST SP in the first transmission, it is possible that it might receive it in subsequent retransmission. Thus, using these multiple broadcasts increases the probability of successful delivery of the CALL_REQUEST SP to all the stations in a MAE.

It is possible that many stations belonging to the MAE groups will try to respond simultaneously. This will increase the probability of SP collisions. This can be reduced by using some arbitration scheme for sending the response SP's. In the present arbitration scheme, each MAE member will have an assigned position number for each of the stations within a MAE. When a CALL_REQUEST_EXT is received for a MAE extension, each station in the MAE will delay its response by an amount proportional to its position number [e.g., $(n-1)\times 10$ msec. where 'n' is its position in the group]. This will reduce the probability of SP collisions. In order to minimize the maximum response time, the total number of appearances for a MAE extension will be limited (say to 10).

When the destination extension is a MAE, if the calling station decides to disconnect the call before the call is answered, then a DISCONNECT SP has to be sent to all the ringing stations in the MAE. To facilitate this it is necessary for the calling station to maintain a list of ringing stations. It is awkward to maintain a list of responding extensions. In addition, the calling station would have to send a number of DISCONNECT SP's as "reliable" datagrams. To avoid this, a CONTINUE_RING SP is broadcast on all the RF channels periodically (say every 1.5 sec.) as a TI(P). When a station answers the call by going off-hook, after acknowledging that station with an ACK SP, a STOP_RING SP is broadcast on all the RF channels. If a station receives this SP and if it is still ringing, then it will stop the ringing. If a station does not receive the STOP RING SP, it will monitor for CONTINUE_RING SP. If a ringing station does not receive at least one CONTINUE_RING SP within a set period (say every 5.0 sec.) it will stop ringing the station. CONTINUE_RING and STOP_RING SP's together provide a robust scheme in the MAE environment.

It is possible that more than one ringing MAE extension go off-hook simultaneously. In this event, only one of these stations will get the ownership of the voice circuit and will answer the call by sending an ANSWER SP. The other stations will receive a dial tone.

FIG. E-5 shows a MAE configured for the "single call" mode. In this mode, only one call is allowed on a MAE. If a station with one MAE extension is busy, it will be reflected on all the appearances of that MAE. If a MAE is configured for this mode, when a ringing MAE station receives a STOP_RING SP it will make itself busy. It will also monitor for a CONTINUE_BUSY SP (say with a periodicity of 2 min.). If a busy MAE (which is not involved in conversation) does not receive this SP in the set period, it will make itself idle.

FIG. E-6 shows the disconnection of a call after establishing a voice path. In such a case, it is necessary to make other stations in that MAE idle. A MAKE_IDLE SP will be broadcast as soon as a disconnect is detected.

FIG. E-7 shows the situation where the called extension is a MAE and at least one BUSY(MAE) is received by the calling extension. If no ACCEPT(MAE) is received before the expiration of time-out, a busy tone will be given to the user.

FIGS. E-8 to E-11 deal with hunt groups. Hunt group extensions provide a mechanism to locate the first idle extension within a set of extensions. This means when a call request is made to the hunt extension each member can answer the call only if a member with the higher position has not answered the call already. In order to provide this prioritized mechanism a call request will have an integer call attempt number in the CALL_REQUEST SP (This integer number is transmitted as part of CALL_REQ_EXT SP. CALL_REQ_EXT(n) indicates the nth call request attempt for a hunt group). Each member in a hunt group will have a position number assigned to it. When the number in the CALL_REQUEST SP matches the position number then that station will answer the call by sending either an ANSWER or a BUSY SP. The above scheme is sufficient if it can be guaranteed that all the members in the group will always be able to respond. In the event that some members may not be able to respond, it must be possible to make a new request to the next member. The following procedure supports this capability.

If the CALL_REQ_EXT(1) is received by the hunt group members only the station with position 1 will send either an ACCEPT(HUNT) or BUSY(HUNT) SP. However, each other member will send the pertinent group information and its current status by sending HUNT_GRP_INFO (number of members in the group, terminating conditions if the last member does not answer the call, Busy/free). This SP is sent as a TI(P) and will not acknowledge the call request. Similar to MAE, hunt members will delay their response depending on their position to reduce the probability of SP collisions.

When the CALL_REQ_EXT(n>1) is received by a hunt group member, it will compare its position number with 'n' in the call request SP. If they both match, it will send ACCEPT(HUNT) or BUSY(HUNT). These SP's will have other pertinent group information (number of members in the group, terminating conditions if the last member does not answer the call).

If it is necessary to make a call request (with n>1), then the Busy/Free information received in HUNT_GRP_INFO SP's in response to the first call request attempt will be used to reduce the number of requests made. The requests will not be made to the members which sent the BUSY information explicitly.

If a busy response (or no response) is received for a call request made to the last member in the group then the call is terminated according to the terminating condition received in the hunt group information.

FIG. E-8 shows a situation where the first member of the hunt group has answered the call.

FIG. E-9 shows a situation where the first two members in the group are busy. A new call request will be made to the next member soon after receiving the BUSY(HUNT). BUSY(HUNT) is transmitted as a TI(P_ACK).

FIG. E-10 shows a situation in which the first member of the hunt group failed to respond to the CALL_REQ_EXT(1). Note that the HUNT_GRP_INFO SP's are transmitted as a TI(P). Hence the calling station has to wait till the time-out is elapsed. This gives a chance for the first member to receive retransmitted call request SP's.

FIG. E-11 shows a situation in which some hunt members are not responding. It must be noted that successive new call requests are made till all the members have been given an equal chance. Note that the calling station has to wait till the elapse of time-out to make a new call request when a hunt group member does not respond.

FIGS. E-12 and E-13 relate to trunk calls. When the user dials digits requesting another user outside the network, then the session will initiate a trunk call request by sending CALL_REQ_TNK SP to the trunk group address. Since more than one trunk group may be willing to answer the trunk call request, an integer number in the request SP specifies the group to which the request is made (similar to hunt group members). It is also possible to have a different extension for each trunk group. In this case there is no need for the integer data in the call request SP. In this case address filtering will be handled by the link layer. The decision to address a particular group has to be made by the session. This means some trunk addressing algorithms have to be implemented in the VIU session layer.

Within each trunk group there can be a number of trunk interface modules (TIM's). Since each TIM will know the availability of its own trunks, an arbitration scheme is required for selecting only one trunk from different TIM's within the group. More particularly, each TIM within a group will have a position number associated with it. When a CALL_REQ_TNK is received by a TIM (which has the trunk group specified by the request number) it will perform the following functions.

If all the trunks within the TIM are busy, then that TIM will send a TRUNK_ACK_INFO SP after delaying it for a time proportional to its position number (say n×10 msec. where n is the position number of the TIM). This SP will have information such as whether another trunk group exists or whether it is the last member within a group. This SP is transmitted as a TI(P) and will not cause the transport to clear its retransmit table. The delay factor used for transmitting the SP will reduce the probability of SP collisions when more than one TIM in a group is busy.

If a trunk is available, then the TIM will try to claim the response voice time slot after a delay period. Delay=Recv_Cycle_#+n1+n2×(n−1), where Recv_Cycle_#=Cycle number on which the SP request was received, n1=a pre-determined number of cycles (to allow session/transport response time), n2=a predetermined number of cycles (say 5), n=position number of the TIM).

If after the elapse of the delay period, the TIM is successful in claiming the response voice time slot then it will seize a trunk and send an ANSWER_INT SP to the caller. Note that the delay used favors the TIMs with lower position numbers and provides a method of locating an available trunk starting from the first trunk within a group. The delay used will be a cycle number and claiming is delayed till at least that cycle number before transmitting the ANSWER_INT SP. This delay will be implemented in the link layer. Also the link layer will copy Recv_Cycle_#of a received SP from a register in the control/interface circuit to the SP buffer in the PRAM. The ANSWER_INT SP indicates to the caller that a trunk has been seized and that the TIM is expecting the final call request SP CALL_REQ_TNK_FNL.

Since the same trunks are shared by the network and other outside networks which are making calls to stations on the network, it is possible that a TIM may find itself with no trunk available after claiming the response VTS successfully. In this case it will release the response VTS and send a TRUNK_GRP_INFO SP to the caller.

When the caller receives the ANSWER_INT SP from a TIM, a trunk is available for the user and the caller will send a CALL_REQ_TNK_FNL SP to this TIM only, so that the TIM can establish communication with the outside party.

FIG. E-12 shows the case where a trunk is available in the group. Note that TIM1 is busy and sends TRUNK_GRP_INFO immediately as a TI(P).

FIG. E-13 shows the case where no trunk is available in the first group. Based on the information received in the TRUNK_GRP_INFO SP, the caller makes a second request to another trunk group. Note that some TIM's are not responding and the last TIM is busy and sending TRUNK_GRP_INFO as a TI(P_ACK) and will cause the transport retransmit table to be cleared. In the second group also no trunk is available and the TRUNK_GRP_INFO SP indicates that no further group is available and the caller receives a REORDER tone.

Feature-Related Protocols

FIGS. E-14 to E-39 illustrate the protocols that are carried out when a user invokes a feature, either before or during a call.

FIGS. E-14 to E-16 deal with call holding. When a user invokes the "hold" feature (either implicitly or explicitly), at the station initiating "hold" the receive side of the "VC" is disabled (Drop_Rx). When the other station receives the HOLD SP it will disable both receive and transmit (Drop_Rx and Drop_Tx) and enters a HELD-BY state. When the station invoking "hold" receives the ACK it will drop transmit, make the circuit available to the network and enter a HOLDING state.

If the station in HELD-BY state is a MAE configured for a "single call" mode, then the station which invoked the hold will broadcast a CONTINUE_HOLDING SP periodically (2 min.). If the members in that MAE fail to receive this SP, then they will become idle. (Note: This SP is similar to CONTINUE_BUSY SP in the active state).

If the station in the HOLDING state is a MAE configured for a "single call" mode, then the station in the HELD-BY state will broadcast a CONTINUE_TO_HOLD SP periodically (2 min).

When the station in the HOLDING state invokes "unhold", a new VC is reserved and the other station is notified. When the other station receives the UNHOLD SP it will enable its transmit and receive using this new circuit. It is not necessary for the HELD-BY station to compete for the response voice time slot as it is the only one which is in HELD-BY state. A simple one-way hold is shown in FIG. E-14. When a station in HELD-BY state invokes the "hold" feature, then both the stations will enter a TWO-WAY hold state. If either of the stations is an MAE configured for "single call" mode, other station will send CONTINUE_TWO_WAY SP periodically (2 min.). Two way hold is as shown in FIG. E-15.

It is possible that both stations might invoke "hold" simultaneously. In this case when the stations receive a HOLD SP, each station will enter a HELD-BY state and send an ACK. When the ACK is received, each station will enter TWO-WAY-HOLD state. When a station in the TWO-WAY-HOLD state invokes "unhold", after receiving an ACK, it will enter a HELD-BY state. The other station after receiving an UNHOLD SP will enter the HOLDING state. Then this will be the same as one-way-hold case. If a station in HOLDING state receives a HOLD SP, then it will enter the TWO-WAY-HOLDING state. If a station in the HELD-BY state invokes "hold" then it will send a HOLD SP and after receiving the ACK will enter a TWO-WAY-HOLDING state. If the stations in TWO-WAY-HOLD state invoke "unhold" simultaneously, then the station with the higher LUA will claim a new VC and acknowledge the "unhold" first by sending a TI(R_ACK). The second station then enables this circuit (Tx_Voice, Rx_voice) and acknowledges the earlier UNHOLD SP. The simultaneous hold and unhold situations are shown in FIG. E-16.

FIGS. E-17 to E-19 deal with call forwarding. When a station invokes the "forward" feature to redirect incoming calls to another station in the Interconnect a FORWARD_REQ SP is transmitted on all the RF channels. If the destination station is willing to accept the calls, it will send an ACK and the user will receive a confirmation tone. This situation is shown in FIG. E-17. If a station is not accepting the forward request, then it will send a FORWARD_DENIED SP as a TI(P). This will allow other stations, if any (e.g. destination is MAE or hunt group) to respond. If no ACK is received before the time-out and if at least one FORWARD_DENIED SP was received, then the user will be given a Denial Tone. This situation is depicted in FIG. E-18. When a CALL_REQ_EXT SP arrives at the forwarded extension, it will send back a FORWARDED_IND SP. At this time, the calling station will make a new call request to the destination station as shown in FIG. E-19.

In order to avoid the circular forwarding effect when chain forwarding is in effect at the destinations, the number of times a station can receive a FORWARDED_IND will be limited to 2. If the calling station receives more than this number of FORWARDED_IND in a row (i.e after making new call requests to the destination station), it will not make any further call requests and the user will hear ring back at this stage.

FIG. E-20 shows the case when a first user has put one user on hold and is active with another user. The first user can invoke the "consult" feature and switch to the other call. The SP exchange is similar to One-Way hold.

FIGS. E-21 to E-26 deal with call transfer. A user (B) wanting to transfer a currently active call to another extension (C) puts the first call on hold and will try to establish the call with the other station. If the station trying to transfer (called the arbitrator) waits until the other station (C) answers the call and goes on-hook, the call will be transferred automatically. The SP exchange in this situation is shown in FIG. E-21.

However it is possible that the arbitrator may go on-hook before the call gets answered. Therefore, the arbitrator station has special responsibility to see that SP exchanges are handled properly. Depending on the destination extension type and the state of the call, the following things can happen. If the destination extension is an IE and the arbitrator (B) goes on-hook after hearing the ringing, then the SP exchange is as shown in FIG. E-22.

However, if the user chooses to go on-hook immediately and if the ACCEPT(IE) is received afterwards, then the ACCEPT(IE) is ignored by the arbitrator (B) and the call between the arbitrator and destination station (C) is terminated. The caller on hold (A) stays on hold to the arbitrator. If the destination extension is a MAE, then the arbitrator station will ACK the ACCEPT(MAE) SP's until the time-out. Then it will send TRANSFER_REQ on all the RF channels. If at the end of another time-out at least one ACCEPT_XFER is received, it will complete the transfer by sending a TRANSFERRED_IND SP. At this time the station which requested the transfer will monitor the call (Apply ringback, send CONTINUE_RING SP etc.). The SP exchange in this case is as shown in FIG. E-23.

If the called extension is a hunt group, and the station has sent an ACCEPT SP, then the situation will be similar to that of an IE. However, if a BUSY(hunt) is received for a call request, then the new call request to the next member is done by the station requesting the transfer. The SP exchange in this situation is as shown in FIG. E-24. If there was no response from the first member of the hunt group and at least one HUNT_GRP_INFO is received before the elapse of time-out, then the SP exchange will be as shown in FIG. E-25.

If a transfer request has failed for any reason (e.g. no response before the elapse of a time-out, or a BUSY_ACK(IE) is received, or at least one BUSY_ACK(MAE) is and no ACCEPT_ACK(MAE) is received, or BUSY_ACK(hunt) is received from the last member of the group), a TRANSFER_FAIL SP is transmitted to the station requesting transfer. At this time if a station (or TIM) is configured for ringing the arbitrator again, then it will send a RING_AGAIN SP as shown in FIG. E-26.

FIGS. E-27 and E-28 show the SP exchange for call waiting. If an extension is configured for a call waiting, it will receive a call waiting indication if a second call arrives when the extension is already busy with one call. If the user chooses to answer the new call by disconnecting the current call, then he (or she) will receive ringing after disconnection. This situation is shown in Figure E-27. On the other hand, the user can put the first call on hold by invoking the "consult" feature as shown in FIG. E-28.

FIG. E-29 shows the SP exchange for call pickup. A ringing extension (directed pickup or group pickup or night answer) can be answered by another extension with this feature.

FIG. E-30 shows the SP exchange for call park. Invoking the "call park" feature, a user can park an active call at another extension.

FIG. E-31 shows the SP exchange for call retrieve. As user may invoke the "call retrieve" feature at an extension to retrieve a call parked at another extension.

FIG. E-32 shows the SP exchange for camp on. A user after receiving busy tone, can invoke the "camp-on" feature. When the called station becomes idle it will send a CALL-BACK SP to the calling station to indicate that it is free. This will initiate ringing at the calling station. When the user goes off-hook a new call request is made to the called party (with LUA as calling address) automatically. If the called station is not an IE, a CAMP_ON_CANCEL SP is broadcast. If the station invoking the "camp-on" feature is busy when the CALLBACK SP is received, the user will receive a call waiting indication. At this time, if user goes on-hook, he will hear ringing.

FIG. E-33 shows the protocol for establishing a conference call. A 3-way conference is established when a user with two calls (one active and other on hold) invokes the "conference" feature. A conference server (the NBU) is involved in the conference. All the parties involved will have a full duplex voice path to the server. The station establishing the conference is responsible for obtaining the server resource.

FIGS. E-34 and E-35 show the SP exchanges for an AIU operator can invoke the "override" feature to barge-in to a currently active call. The SP exchange when an attendant invokes this feature during an active call is shown in FIG. E-34. When the station has DND in effect, invoking "override" will cause ringing at the station. This is shown in FIG. E-35

FIGS. E-36 and E-37 deal with disconnecting ringing or held calls. If the calling station disconnects a ringing call, and the ringing extension is an IE, a DISCONNECT SP is sent as a TI(R). When an ACK SP is received by the calling extension, it will become idle as shown in FIG. E-36. If the ringing extension is a MAE, the calling station will broadcast a DISCONNECT SP and will become idle as shown in FIG. E-37. If for some reason, a ringing MAE extension does not receive the DISCONNECT SP, it will continue to monitor for CONTINUE_RING SP. The station will become idle when it does not see CONTINUE_RING SP within the expected time.

A station in the HELD-BY state can disconnect a call by going on-hook. If the station in the HOLDING state is not a MAE configured for "single call" a DISCONNECT SP is sent as a TI(R). The HELD-BY state station will become idle after receiving the ACK SP as shown in FIG. E-38. If HOLDING station is a MAE configured for a "single call" a DISCONNECT SP is broadcast and the HELD-BY station will become idle as shown in FIG. E-39. If for some reason, a HOLDING MAE extension does not receive the DISCONNECT SP, it will continue to monitor for CONTINUE_TO_HOLD SP. The station will become idle when it does not see a CONTINUE_TO_HOLD SP within the expected time.

Time-Frequency Multiplexing

FIG. F-1 is a block diagram of the HRU and its connection to the network and the outside trunks. In the embodiment shown, HRU 1020 includes 4 Network Head-end Cards (NHC) for channels 1–4. Each NHC is identical and includes a receiver 1022 and a transmitter 1024 coupled to network medium 1026. Packets received through receiver 1022 from medium 1026 are processed through the fast phase lock loop, MLD 1020, before being returned to transmitter 1024. Each NHC is coupled to the same medium and receives upstream transmissions from the voice interface units 1030 and retransmits them downstream on medium 1026 on a different frequency. This is done by first receiving the upstream data, reconstructing it, synchronizing it with MLD 1028, then remodulating it with the proper downstream carrier frequency for retransmission. A path is also provided from MLD 1028 to an Input/Output Processor (IOP) 1032. IOP 1032 essentially multiplexes the four channels onto a trunk bus 1034 for connection to one of trunk interface cards 1036. Each trunk interface card 1036 couples to an outside trunk 1038 for outside calls. These trunk interface cards could couple to a central office, or other types of trunks which are standard in a public telephone switching network.

FIG. F-2 shows the phase locking of the clocks of four NHC cards. An external clock may be provided to a clock receiver 1040, which is then phase locked to an internal clock of one of the NHCs in a primary phase lock loop 1042. This is used to produce two master clocks A and B. Enable logic 1044 will enable the A clock on one NHC and the B clock on another NHC to be applied to the A and B clock buses, and disable the connection to the A and B buses for the clocks on the other NHCs. The A and B clocks are then provided to all of the NHCs, and a select circuit 1046 examines the clocks to determine which is a better quality. Thus, if one of the NHCs has a bad oscillator, its clock will not be selected. The A clock is selected by default in the event they are similar. If no external clock is present, the oscillator of the primary phase lock loop 1042 is used as the A or B clock.

A secondary phase lock loop 1048 on each NHC phase locks to the system A or B clock and produces four different phase clocks for use in the NHC circuitry as needed. Thus, all NHCs are synchronized to the same A or B clock.

Maximum Likelihood Detector (MLD)

The NHC implements a data reclocking scheme to time align all data being passed through the NHC. Since the upstream transmission is supplied by an unknown source with regard to phase, the reclocking circuit uses a maximum likelihood detector or MLD to reclock the data. The standard solution of phase locking a clock from the incoming data edges is not workable since a PLL with such a short integration time would be far less stable than is needed for the system, and extremely difficult to build. The MLD detects the edges in 4 bits of packet preamble, and then delays the data path by a time of 0 to 1 bits, (in increments of 0.062 bits) to properly align the center of the data bits and the edge of the sampling clock.

With this method, no frequency lock is required since the NHC's downstream transmissions are the system's source of master clock. All of the system's PLLs and clocks are frequency coherent unless a given unit is in failure mode; in which case it will be supplying no broadband transmission and does not pose a problem. With this understanding, we can assume that the NHC's MLD circuit must only account for phase or time alignment differences. The described functions can be implemented with high speed digital circuitry that responds to the received packet's needs within a four-bit time span during the packet preamble. The selected delay will remain locked until a loss of carrier is detected at the head-end which will be interpreted as an "end of packet". The NHC will begin inserting a pseudo-silence pattern (PSP) and reset the MLD for the next packet. The PSP maintains synchronization between transmissions. There must be a minimum of two bit-times between packets when no carrier is present to allow the MLD circuit to reset.

Referring to Figure F3, there is shown a block diagram of one type of maximum likelihood detector (MLD) 1152 suitable for use in accordance with the invention. The MLD 1152 comprises a shift register 1130, a bit stream combiner 1132 and a two-level to three-level data converter 1134. The shift register 1130 has associated therewith a high-speed clock 1136 and a bit synchronizer 1138. The bit stream combiner 1132 uses as an input either a received transmission as provided by bit synchronizer 1138 or, if no carrier is detected, a continuous pseudo data source 1140. The function of pseudo data source 1140 is to provide a continuous string of pseudo data, for example, 1 0 1 0 1 0 format data as the pseudo-silence pattern (PSP). The continuous data stream is then provided to the data converter 1134 where two level data is converted to three level data. This conversion is done by translating the data stream into 2 parallel data streams at one-half the frequency. The 2 streams are then converted into a single, three level data stream at the same on-half frequency. This results in data with more than one bit per hertz. The output of the data converter 1134 is coupled to the transmitter of the HRU.

The purpose of the MLD 1152 is to align data for optimum reception. The various signals received in burst mode through the HRU receiver. Each exhibit different phases as a result of differences in distance along the upstream channel from the HRU, as well as differences in filter delays and differences in the phase of any local clock. The MLD 1152 adjusts for differences in the phase of the input data so that the system clock used in connection with receiving the data in a synchronous format can strobe the received data at or near the midpoint of the bit in the bit stream. To this end, the shift register 1130 is clocked by a high speed clock 1136 at, for example, eight times the input data rate whereby each input bit is shifted to eight possible positions in turn for output at a selected tap 1142, 1144, 1146, 1148, 1150, 1152, 1154 or 1156. In the specific embodiment, each tap of the shift register thus presents an output data stream differing in time delay by one eight bit from the adjacent tap. The bit synchronizer 1138 monitors each one of the taps and selects by means of appropriate optimization a bit stream from one of the taps, providing as its output a bit stream to the bit stream combiner 1132. The bit synchronizer 1138 may, for example, include a multiplexer and means for checking each of the input bit streams for errors due to sampling at a less than optimum phase. Should it be deemed unnecessary to adjust the phase automatically, the bit synchronizer may comprise a simple selector switch coupling one selected tap through to the bit stream combiner 1132.

MLD 1152 operates by having the bit synchronizer 1138 examine the data bits as they pass along the shift register 1130. The time relationship between the rising edges and the falling edges of the data bits are compared to those of the system clock. Based upon the calculations made by the bit synchronizer 1138, the appropriate shift register tap among the eight possible taps 1142–1156 is used to extract the data and send it to the bit stream combiner 1132. This calculation estimates the center of the data bit.

The center of the data bit must be known relative to the system clock. (The system clock is derived from the high speed clock 1136 which also runs the shift register 1130.) The bit synchronizer 1138 examines one of the lines 1142–1156 and notes when the edges of the data bits occur with respect to each other and with respect to the system clock. The time relationships are measured in terms of the periods of the high speed clock 1136. This examination occurs on the first portion of the incoming data stream which has a preamble especially designed to ease the task of the bit synchronizer (usually a 1 0 1 0 1 0 1 0 sequence) and also to allow the synchronization process to occur before the message bits arrive.

The data clock, consisting of two phases CLK phase 1 and CLK phase 2, at the nodes is derived from the bit rate of the continuous downstream bit rate transmitted by the head-end. Thus, the burst (packet) transmissions from the VIU nodes to the head-end are at a frequency known to the head-end but at an unknown phase. Once the MLD 1152 determines the phase, that phase is constant throughout the burst transmission. Therefore, once the MLD 1152 ascertains the phase of the preamble it does not make any further adjustments for the remainder of the burst transmission.

The center of the bit times are calculated by taking the bit period, that is, the time between the start and the end of a bit as measured in high speed clock 1136 periods, and dividing by two. This measurement can be made by a counter within bit synchronizer 1138 which is started when a bit transition occurs and is stopped when the next transition occurs. A similar counting method can be used to determine the time relationship between the bit edges and the master clock edges. The appropriate shift register 1130 output 1142–1156 to take the data from is found from the time relationships between the data edges and the master clock edge. The implementation can be done from a look-up table in a memory within the bit synchronizer 1138 or can be calculated in real time with either hard-wired logic or a fast dedicated microprocessor.

Head-End unit

FIGS. F-4 and F-5 are a block diagram of one of the network head-end cards of the head-end unit 1020 of FIG. F-1. Signals from the network broadband cable 1026 are received by receiver 1160. A carrier detect circuit 1162 provides signals to maximum likelihood detector 1164 indicating whether a carrier, and thus a transmission, is present. If no carrier is present, the pseudo-silence data source in the MLD is activated. The data itself is processed through detector 1166, low pass filter 1168, amplifier 1170 and level detector 1172. The resultant data is then provided to MLD 1164.

MLD 1164 can retransmit the data through a summation circuit 1174, buffer 1176, low pass filter 1178, phase equalizer 1180 and an attenuator circuit 1182. The data is then provided to a transmitter 1184 in which the data modulates the carrier frequency in a modulator 1186, with the output being provided through buffer 1188 and diplex filter 1190 back to broadband network cable 1026.

The connection to the trunks is provided through a modem bus multiplexer 1192 which provides the signals from MLD 1164 to a bus 1194. The signals from bus 1194 are provided to a connector 1196 as shown in FIG. F-5. Connector 1196 couples to the IOP card as shown in FIG. F-6.

A clock generator circuit 1198 contains the clocking circuit shown in FIG. F-2. A PAL decode controller 1200 has logic for selecting the best clock. FIG. F-5 shows a frequency switch multiplexer 1202 for selecting the frequency channel of the particular NHC by providing an appropriate input to a frequency synthesizer 1204. FIG. F-5 also shows a reset decode fault generator 1206 and a power supply circuit 1208.

FIG. F-6 is a block diagram of the IOP card 1032 of FIG. F-1. Each of four NHC cards as shown in FIGS. F-4 and F-5 is connected via a connector 1196 to a controller/interface circuit 1210. The construction of the controller/interface circuit is the same as that used on the voice interface units as described elsewhere in this application. A phase lock loop 212 synchronizes the IOP timing to that of the NHCs. A PCM highway 1214, identical to the PCM highway used in the VIUs, is coupled to a trunk data buffer 1216. This couples the data to a trunk bus 1034 as shown in FIG. F-1. The specific trunk card address is provided through a trunk address buffer 1218 and an address decode circuit 1220.

The IOP is controlled by a microprocessor 1222 which has access to an EPROM and EEPROM 1224 and a DRAM 1226. An interface and clocking circuit 1228 couples DRAM 1226 to address and data buses 1230 and 1232. A clocking circuit 1234 is used to provide a clock to controller/interface circuits 1210.

The I/O Processor Card (IOP), is a general purpose CPU card used to control up to 24 full-duplex voice timeslots. These voice connections can be from any of the four voice channels via the four chip sets 1210 and modem buses 1196. A 10 MHz 80186 microprocessor executes software from the 512K-bytes of dynamic RAM. The 16K-bytes of EPROM allows the IOP to self-test itself and request to be booted, and an 8K-byte EEPROM provides non-volatile storage of configuration information. An additional 8K of EEPROM is available. The EPROM will also contain card serial number, date of manufacture, revision, etc. Circuit 1228 is used to provide DRAM control, parity error interrupt control, memory write protection, memory refresh, and watch-dog timer. The Trunk Group Bus Interface connects the IOP to other cards in the trunk group.

The four chip sets 1210 each consist of two custom LSI chips and an 8K×8 static RAM. These chip sets communicate with each other over an internal bus. Circuits 1210 each include a Receiver/Transmitter (Rx/Tx) which interfaces to the modem serial bus on the TIU backplane. A Packet Controller (PCTL) provides the PCM Highway consisting of 24 full-duplex timeslots for connection to trunk interfaces and server circuits. PCTL also provides IOP access to P-RAM, packets, tone generation, etc. A P-RAM, Packet RAM, 8K×8 static RAM, is used for storing voice and signalling buffers. These buffers hold the incoming and outgoing packets as well as some commands for handshaking between the 80186 and circuit 1210. The 80186 can read and write this RAM. In addition, this RAM can be optionally stuffed with a 32K×8 RAM with the addition of a jumper on the IOP. It should be noted that P-RAM cannot be successfully accessed without the 5.018 MHz modem clocks from the backplane.

Circuit 1228 is a custom LSI chip which provides all of the timings for DRAM control, memory refresh, data buffering, and write protection. It also includes circuitry to handle watch-dog timer and NMI generation to the 80186. It contains an error register which captures 18-bits of the address during write protect errors, and parity errors.

The IOP Card provides up to 512K-bytes of parity checked dynamic RAM. RAM can be configured in 128K-byte blocks. Chip 1228 provides all the control timing, address multiplexing, memory refresh, and data buffering for the DRAM.

All timings originate from the modem (NMCs or NHCs); the modem provides two 5.018 MHz clocks in quadrature which are used by the CIC chips 1210 to recover data from the network and for internal state timing.

The 20.072 MHz phase-lock-loop circuit receives and locks to the selected 5.018 MHz clock from one of the four chips programmed to be the master. 20.072 MHz is provided to a chip 1228 which returns a 6.176 MHz clock to the CIC chips 1210 for the PCM Highway. Chip 1228 uses a 10.036 MHz clock (20.072 MHz/2) from the 80186 to synchronize its DRAM control logic.

The Watch-Dog Timer (WDT) function, contained in chip 228, provides a method of detecting incorrect program execution caused by software bugs or hardware malfunction. The WDT appears as an I/O port on the 80186's bus, and drives NonMaskable Interrupt and RESET to the 80186 microprocessor. Once enabled, software must tickle the WDT once every two seconds to avoid a Non-Maskable Interrupt. If not tickled within two seconds after an NMI, chip 1228 will reset the 80186 microprocessor.

Conclusion

It can thus be seen that the present invention provides a technique for rapidly and efficiently downloading code and data to nodes in a distributed intelligence network.

While the above is a complete description of the preferred embodiment of the invention, various modifications, alternative constructions, and equivalents may be employed. For example, while a coaxial cable is used in the preferred embodiment, fiber optic and other media could be used. Similarly, while the TMG function is carried out by the NBU hardware, physically separate units could be used.

Additionally, while the preferred time domain multiplexing scheme shows the SP interval at the beginning of each frame, with two frames making up a cycle, there are other possibilities. For example, there is no absolute reason to have two SP intervals in each cycle.

Therefore, the above description and illustrations should not be taken as limiting the scope of the invention which is defined by the appended claims.

Table A-1—List of Abbreviations

AIU—attendant interface unit/console
BCSP—boot control signalling packet
BP—boot packet
BRSP—boot request signalling packet
CID—configuration identifier
CVP—claiming voice packet
HRU—head end retransmission unit
IE—individual extension
IOP—I/O processor
LUA—local unique address
MAE—multiple appearance extension
MLD—maximum likelihood detector
NBU—network boot unit
NMWS—network manager workstation
PCM—pulse code modulation
PCTL—packet control circuit
PRAM—packet RAM
PUA—physical unit address
RxTx—receive/transmit circuit
SLE—system link extension
SP—signalling packet
TIM—trunk interface module
TMG—timing mark generator
TM—timing mark
VC—voice circuit
VIU—voice interface unit
VP—voice packet
VTS—voice time slot

TABLE A-2

Packet Formats
(lengths in bytes)

__Timing Mark Packet (TM) - 10 bytes__

| | |
|---|---|
| 1 | Preamble |
| 1 | Unique Delimiter |
| 1 | Cycle Number |
| 2 | TMG Identification |
| 1 | Boot Control Information (4 bits for boot channel, 3 bits for Tx channel that corresponds to the Rx channel in which this TM was received, and one bit for an installation indicator) |
| 1 | Reserved for other boot information |
| 2 | CRC |
| 1 | Pad |

__Signalling Packet (SP) - 71 bytes__

| | |
|---|---|
| 3 | Channel Change Pad (subject to change depending on modem delays) |
| 1 | Preamble |

TABLE A-2-continued

Packet Formats
(lengths in bytes)

| | |
|---|---|
| 1 | Unique Delimiter |
| 60 | Data (60 bytes fixed in h/w, but the s/w does not have to use all of it). Includes a link header having 6, 10, or 14 bytes, and a transport header having 7 bytes. |
| 2 | CRC |
| 3 | Channel Change Pad |
| 1 | Modem Enable/Disable Pad |

__Skew Signalling Packet (SSP) - (71 bytes)__

| | |
|---|---|
| 3 | Channel Change Pad (subject to change depending on modem delays) |
| 1 | Preamble |
| 1 | same delimiter as normal SP |
| 14 | Data |
| 2 | CRC (transmitter is turned off here) |
| 46 | Idle Time |
| 3 | Channel Change Pad |
| 1 | Modem Enable/Disable Pad |

__Voice Packet (VP) - 19.5 bytes__

| | |
|---|---|
| 1 | Preamble |
| 1 | Unique Delimiter |
| 16 | 2 ms worth of PCM data |
| 1.5 | Pad |

__Claiming Voice Packet (CVP) - 19.5 bytes__

| | |
|---|---|
| 1 | Preamble |
| 1 | same delimiter as normal VP |
| 16 | Data |
| 1.5 | Pad |

__Boot Packet (BP) - 19.5 bytes__

| | |
|---|---|
| 1 | Preamble |
| 1 | Unique delimiter |
| 16 | 16 bytes of boot data |
| 1.5 | Pad |

__Frame Format__

| Slop | Timing Mark (SP or SSP) | Signalling Slot | 28 Voice Slots (VP, BP, or CVP) |
|---|---|---|---|

10 bytes - 1 TM Slot
71 bytes - 1 SP Slot
+ 546 bytes - 28 VP Slots 627 bytes - total (5016 bits)
+ Slop ( 2 bits)

5018 bits/frame × 1 frame/ms = 5.018 Megabits/sec

TABLE A-3

Map of PRAM
(addresses in bytes (hex); lengths in bytes)

| Address Range | Definition |
|---|---|
| 0000–001F | PCM Hwy Timeslot 0 Xmt Ring Buffer (32) |
| 0020–003F | PCM Hwy Timeslot 0 Rcv Ring Buffer (32) |
| 0040–005F | PCM Hwy Timeslot 1 Xmt Ring Buffer (32) |
| 0060–007F | PCM Hwy Timeslot 1 Rcv Ring Buffer (32) |
| ⋮ | ⋮ |
| 05C0–05DF | PCM Hwy Timeslot 23 Xmt Ring Buffer (32) |
| 05E0–05FF | PCM Hwy Timeslot 23 Rcv Ring Buffer (32) |
| 0600–061F | Transmit Silence Buffer (32) |
| 0620–07FF | Unused, reserved for future use |
| 0800–0807 | PCM Hwy Timeslot 0 Control Block (8) |
| 0808–080F | PCM Hwy Timeslot 1 Control Block (8) |
| 0810–0817 | PCM Hwy Timeslot 2 Control Block (8) |
| ⋮ | ⋮ |
| 08B8–08BF | PCM Hwy Timeslot 23 Control Block (8) |
| 08C0–08FF | Unused, reserved for future use |
| 0900–093F | Network Transmit Active Table (64) |
| 0940–097F | Network Receive Active Table (64) |

TABLE A-3-continued

Map of PRAM
(addresses in bytes (hex); lengths in bytes)

| Address Range | Definition |
|---|---|
| 0980–09BF | Transmit Timing Mark Data Buffer (64) |
| 09C0–09FF | Receive Timing Mark Data Buffer (64) |
| 0A00–0A7F | Network Transmit SP Data Buffer (128) |
| 0A80–0AFF | Network Receive SP Data Buffer (128) |
| 0B00–0B3F | Network Busy/Free Table (64) |
| 0B40–0B7F | Network Receive SP Hash Table (64) |
| 0B80–0BBF | Network Claiming VP Data Buffers (64) |
| 0BC0–0BFF | Network Transmitted CRC Buffers (64) |
| 0C00–0CFF | Network Transmit Boot Buffer 0 (256) |
| 0D00–0DFF | Network Transmit Boot Buffer 1 (256) |
| 0E00–0EFF | Network Receive Boot Buffer 0 (256) |
| 0F00–0FFF | Network Receive Boot Buffer 1 (256) |
| 1000–103F | Network Receive - PCM Timeslot Map (64) |
| 1040–107F | Network Transmit - PCM Timeslot Map (64) |
| 1080–10FF | Unused, reserved for future use. |
| 1100–11FF | Gain Level Switch or Tone Buffer (256) |
| 1200–12FF | Gain Level Switch or Tone Buffer (256) |
| : | : |
| 1F00–1FFF | Gain Level Switch or Tone Buffer (256) |
| | End of 8 KB P-RAM |

Additional memory may be provided for extra gain level switch or tone buffers. For example, Receive Long Tone Buffers (which can be over 60K in maximum length) are made by using consecutive Gain Level Switch/Tone Buffers.

TABLE A-4

Boot Image File Format
(lengths in bytes)

| | |
|---|---|
| 2 | Image ID - identifies the image type |
| 2 | Version - specifies the version number of the program |
| 4 | Exec. Address - specifies the program starting address |
| 2 | Exec. Control - used to control the execution after the image is booted. If Exec. Control is set, the booted unit will start the program by jumping to the address specified by the Exec. Address: field. If Exec. Control is cleared, the booted unit will restart the boot process cycle. This execution control mechanism allows a network unit to receive configuration data images. |
| 2 | No. of Blocks - specifies the number of memory blocks contained in this program image. |
| 4 | Reserved - |
| The following are repeated for each block. | |
| 2 | Length - |
| 2 | Block Number - specifies the block sequence number of this block |
| 4 | Load Address - specifies the load starting address of this block |
| up to 245 | Memory Image |
| 2 | Checksum - contains the Checksum of this block |

TABLE A-5

Boot Request Signalling Packet Format
(lengths in bytes)

| | | |
|---|---|---|
| 6/10/14 | Link Header | source and destination addresses |

TABLE A-5-continued

Boot Request Signalling Packet Format
(lengths in bytes)

| | | |
|---|---|---|
| 7 | Transport Header | |
| 1 | Boot Select | identifies the packet as a Boot SP |
| 1 | Packet Type | identifies the packet type as Boot Request SP |
| 2 | Image ID | identifies the type of program image being requested |
| 2 | Version | A WORD, specifies the version number of the program image. A value of 0XFFFF indicates an unspecified Version number. |

TABLE A-6

Boot control Signalling Packet Format
(lengths in bytes)

| | | |
|---|---|---|
| 6/10/14 | Link Header | source and destination addresses |
| 7 | Transport Header | |
| 1 | Boot Select | identifies the packet as a Boot SP |
| 1 | Packet Type | identifies the packet type as Boot Control SP |
| 2 | Channel/Frame | specifies the channel and frame, on which the NBU will download the image blocks |
| 8 | Timeslots | specifies the VTS's that will be used for the transmission. The VTS number 255 or the eighth value marks the end of the VTS list |
| 2 | Image ID | same as boot image file |
| 2 | Version | same as boot image file |
| 4 | Exec. Address | same as boot image file |
| 2 | Exec. Control | same as boot image file |
| 2 | Number of Blocks | same as boot image file |

TABLE C-1

HRU SIGNAL DESCRIPTIONS

| | |
|---|---|
| MRXD | MODEM Receive Data is the reconstructed serial data which is recovered by the NHC and delivered to the TIU interface at a rate of 5.018 Mbps. The data stream is synchronized with the Phase 1 clock, and data is shifted through on the falling edge. The rising edge is then used as the sampling clock edge. |
| MTXD | MODEM Transmit Data is the serial data accepted at the TIU interface for broadband transmission. The data rate is again 5.018 Mbps. The data stream must be synchronized with the Phase 1 clock, and data is shifted to the NHC on the falling edge. The rising edge is then used to sample the data by the NHC. |
| MTXE~ | MODEM Transmit Enable is an active low signal which enables broadband transmission by selecting MTXD as the source of inserted data rather than the PSP generator. MTXE must NOT be active when there is valid upstream transmission and is ORed with the NHC's internal Carrier Detect to insure that this condition is not violated. This "Enable Lock" circuit is necessary since this signal not only applies to the auxiliary interface, and MUST NOT disable the NHC transmit function. Only an internal NHC fault signal or external NHC reset will disable or interrupt the downstream |

TABLE C-1-continued
HRU SIGNAL DESCRIPTIONS

| | |
|---|---|
| | transmission. |
| MACLK | MODEM "A" Clock is a 5.018 MHz clock which is reconstructed by the NHC and then delivered to the TIU interface. This clock can be described as "Phase 1", and has a duty factor of 50/50 ± 5%. The rising edge of this clock is used for MRxD sampling. |
| MBCLK | MODEM "B" Clock is a 5.018 MHz clock which is reconstructed by the NHC and then delivered to the TIU interface. This clock can be described as "Phase 2" or "Phase 1 + 90 degrees", and has a duty factor of 50/50 ± 5%. |
| MTLOCK~ | MODEM T1 Locked is an open Collector active low signal supplied to the TIU interface to indicate that the NHC is phase and frequency locked with either of the 40.144 MHz clocks NSYNCA and NSYNCB. |
| MFAULT | MODEM Fault is an active high signal which indicates an NHC failure, the signal will remain active until the NHC is reset by the IOP. While the fault signal is active, the outputs from the NHC are held inactive or tri-state and broadband transmission is suspended. |
| MA0-2 | MODEM Address (0–2) are address lines that, when used in conjunction with MRST~, will allow static reset of the NHC card if the MODEM Address matches the occupied slot. |
| MRST~ | MODEM Reset is an active low signal supplied by the TIU which will hold the addressed NHC in a reset state. |
| NRFn1-3 | Network Receive Frequency (1–3) are used to select one of eight receive frequencies, (upstream channels) for the NHC to operate on. Where "n" represents NHC 0–4. The receive frequency is selected via a rotary hex switch located on the TIU Backplane. NOTE: In the case of a Network MODEM Card, these switches would select the transmit or the upstream frequency. |
| NTFn1-4 | Network Transmit Frequency (1–4) are used to select one of sixteen transmit frequencies, (downstream channels) for the NHC to operate on. Where "n" represents NHC 0–4. The transmit frequency is selected via a rotary hex switch located on the TIU Backplane. NOTE: In the case of a Network MODEM Card, these switches would select the receive or the downstream frequency. |
| NSYNCA | Network Sync Clock "A" is one of two 5.018 MHz clocks received from the TIU backplane as the "Master" clock. |
| NSYNCAOK~ | NHC Sync Clock "A" OK indicates that NHC "A" generator is operating correctly. |
| NTLOCKA~ | NHC "A" T1 Locked indicates that NHC "A" is phase locked to the T1 source. |
| NSYNCB | Network Sync Clock "B" is one of two 5.018 MHz clocks received from the TIU backplane as the "Master" clock. |
| NCLKBOK~ | NHC Sync Clock "B" OK indicates that NHC "B" clock generator is operating correctly. |
| NTIDCKB~ | NHC "B" T1 Locked indicates that NHC "B" is phase locked to the T1 source. |
| P5v | P5V Supplies a diode isolated voltage source for backplane pull up resistors and resistor packs. A maximum current of 50ma is made available. |

What is claimed is:

1. A method for transmitting boot images to a number of nodes in a network, comprising:

the step, performed continuously, of generating a periodic timing mark to define a series of cycles wherein (i) at least one interval within each cycle is designated a signalling packet ("SP") interval, and (ii) a plurality of other intervals within each cycle are designated timeslots;

the step, performed by a network boot unit ("NBU"), of transmitting a boot control signalling packet ("BCSP") in a given SP interval, wherein the BCSP (i) contains boot control information signifying that a boot image is to be transmitted, (ii) specifies at least one timeslot in which the boot image is to be transmitted in later cycles, and (iii) contains image descriptor information identifying the boot image; and the steps, performed by the NBU, of transmitting boot packets, each containing a portion of the identified boot image, within the specified timeslot or timeslots for each of a number of cycles subsequent to the frame in which the BCSP was transmitted.

2. The method of claim 1, wherein the step of transmitting a boot image is performed over successive cycles.

3. The method of claim 1, and further comprising the steps, performed by a node requiring a particular type of boot image, of:

testing for a predetermined time for the presence of a BCSP specifying the particular type of boot image; and in the absence of a BCSP within the predetermined time, transmitting a boot request signalling packet ("BRSP") specifying the particular type of boot image.

4. The method of claim 1, and further comprising the step, carried out by the NBU prior to the step of transmitting boot packets, of claiming at least one timeslot.

5. The method of claim 4 wherein the claiming step includes the substeps of:

determining a timeslot that is believed to be free;

transmitting a claiming packet unique to the NBU on that timeslot;

listening to that timeslot; and verifying the receipt of the claiming packet as sent.

6. The method of claim 1 wherein the step of transmitting a BCSP is performed simultaneously on a plurality of channels and wherein the step of transmitting boot packets is performed on a single channel.

7. The method of claim 1 wherein the step of transmitting a BCSP is repeated after at least one boot packet has been sent.

8. A method wherein a plurality of network boot units ("NBU's") in a network determine which NBU is to respond to a boot request signalling packet ("BRSP") specifying a particular boot image, comprising:

the step, performed continuously, of generating a periodic timing marks to define a series of cycles wherein (i) at least one interval within each cycle is designated a signalling packet ("SP") interval, and (ii) a plurality of additional intervals within the cycle are designated timeslots; and the steps, performed by each NBU having access to the particular boot image, of transmitting a boot control signalling packet ("BCSP") during the SP interval, the BCSP for each NBU identifying that NBU as the source, testing for the reception of a BCSP, determining if the first BCSP received originated from itself, and assuming the status of master NBU if and only if the first received BCSP did originate from itself.

9. The method of claim 8, and further comprising the steps, performed by the master NBU, of transmitting a boot control signalling packet "(BCSP") in a given SP interval, wherein the BCSP (i) contains boot control information signifying that a boot image is to be transmitted, (ii) specifies at least one timeslot in which the boot image is to be transmitted in later cycles, and (iii) contains image descriptor information identifying the particular boot image; and transmitting boot packets, each containing a portion of the particular boot image, within the specified timeslot or timeslots for each of a number of cycles subsequent to the frame in which the BCSP was transmitted.

10. A method for transmitting information from a node in a specified timeslot in a time-division multiplexed communication system having a unidirectional transmitting bus terminating at a head-end and translated at said head-end onto a unidirectional receiving bus originating from said head-end, comprising the steps of:

transmitting a test signal on said transmitting bus from said node;

receiving said test signal from said receiving bus at said node;

calculating the elapsed time between said transmitting and receiving steps;

calculating a skew time from said elapsed time;

transmitting an information signal an amount of time time equal to said skew time prior to a time of arrival of said timeslot at said head-end;

generating a periodic timing mark, with the periods between said timing marks being frames, each frame having a plurality of timeslots;

transmitting information signals to a second node in said specified timeslot in first frames, said first frames occurring every other frame; and receiving information signals from said second node in said specified timeslot in second frames, said second frames occurring between said first frames.

11. The method of claim 10 further comprising the step of digitizing a voice signal to produce said information signal.

12. The method of claim 10 wherein said transmitting an information signal step includes asynchronously transmitting said information within said timeslot.

13. The method of claim 10 wherein said step of generating a periodic timing mark includes receiving a timing signal from a public switched network and using said public switched network timing signal to produce said timing marks.

14. A communication system for exchanging information between a plurality of nodes, comprising:

a unidirectional transmitting medium coupling each of said nodes to a head-end of said transmitting medium;

a unidirectional receiving medium extending from an originating end to each of said nodes;

head-end translating means for transferring signals received at said head-end of said transmitting medium to said originating end of said receiving medium;

means for generating a periodic timing mark on said receiving medium, each interval between a pair of timing marks being a frame, each frame defining a Plurality of timeslots;

means for transmitting a test signal from a first node on said transmitting medium;

means for receiving said test signal at said first node on said receiving medium;

means for calculating an elapsed skew time between the transmitting and receiving of said test signal;

means for transmitting information for a specified timeslot an amount of time equal to said skew time prior to the arrival of said specified timeslot at said head-end; and wherein said transmitting medium and said receiving medium are separate frequency channels on a single physical medium and said translating means is a frequency translator.

15. The communication system of claim 14 further comprising means, coupled to said first node, for digitizing a voice signal to produce said information.

16. The communication system of claim 14 further comprising a plurality of means for digitizing voice signals, each digitizing means being coupled to one of said nodes, each of said nodes having a separate address, and a plurality of memories, each coupled to one of said nodes for storing the addresses of said nodes.

17. The communication system of claim 16 further comprising a plurality of transmitting and receiving channels on said physical medium, each of said nodes having means for transmitting and receiving on more than one channel.

18. A method for claiming a timeslot for voice transmissions at one node in a network over a medium, comprising the steps of:

(a) providing a periodic timing mark on said medium, each timing mark being followed by a plurality of timeslots;

(b) monitoring, at each node, timeslots following said timing mark for the presence of messages;

(c) storing in a memory at each node a list of occupied timeslots;

(d) transmitting, at an originating node a dummy message in a claimed, random one of the unoccupied timeslots as determined from said memory list;

(e) monitoring said medium for reception of said transmitted dummy message;

(f) comparing a received dummy message to the transmitted dummy message;

(g) repeating steps (a) through (f) if the transmitted and received dummy messages are not substantially similar;

(h) transmitting a series of dummy messages in said claimed timeslot to keep the claimed timeslot occupied;

(i) updating said memory list in other nodes to indicate said claimed timeslot as being occupied;

(j) transmitting a signalling packet from said originating node having a destination address, an originating address, and the location of said claimed timeslot;

(k) monitoring said medium for a response to said signalling packet;

(l) receiving a responsive signalling packet designating a claimed response timeslot; and (m) transmitting voice data in said claimed timeslot and converting voice data in said response timeslot into voice signals.

19. The method of claim 18 wherein said medium includes a plurality of frequency channels and further comprising the step of sending said signalling packet over each of said channels, said monitoring for a response step being done on a home channel containing said claimed timeslot.

20. The method of claim 18 further comprising the steps of:

(n) receiving, at a receiving node, said signalling packet addressed to said receiving node;

(o) transmitting a second dummy message in a response timeslot having a predetermined relationship to said claimed timeslot;

(p) monitoring said medium for reception of said transmitted second dummy message;

(q) receiving said second dummy message;

(r) comparing said received second dummy message to the transmitted second dummy message;

(s) repeating steps (o) through (r) if said stored second dummy message and received dummy message are not substantially similar;

(t) transmitting a signalling packet addressed to said originating node indicating that voice communication has been established;

(u) transmitting a series of second dummy messages in said response timeslot to keep said response timeslot occupied; and (v) sending voice transmissions in said response timeslot.

21. The method of claim 20 further comprising the step of adding said response timeslot to said memory list of occupied timeslots at said other node.

22. The method of claim 20 further comprising the steps of:

determining whether said receiving node is busy with another transmission; and sending a signalling packet to said originating node indicating that said receiving node is busy if said receiving node is busy.

23. The method of claim 22 wherein said medium has a plurality of channels and further comprising the steps of:

determining whether said originating node is on the same channel as said receiving node;

transmitting a signalling packet to an additional node when said receiving and originating nodes are on different channels and said receiving node is busy, said signalling packet indicating that said receiving node is busy;

retransmitting, at said additional node, said signalling packet from said receiving node to said originating node on the frequency channel of said originating node.

24. A method for claiming a timeslot for voice transmissions at one node in a network over a medium, comprising the steps of:

(a) providing a periodic timing mark on said medium, each timing mark being followed by a plurality of timeslots;

(b) monitoring, at each node, timeslots following said timing mark for the presence of messages;

(c) storing in a memory at each node a list of occupied timeslots;

(d) transmitting, at an originating node a dummy message in a claimed, random one of the unoccupied timeslots as determined from said memory list;

(e) monitoring said medium for reception of said transmitted dummy message;

(f) comparing a received dummy message to the transmitted dummy message;

(g) repeating steps (a) through (f) if the transmitted and received dummy messages are not substantially similar;

(h) transmitting a series of dummy messages in said claimed timeslot to keep the claimed timeslot occupied;

(i) updating said memory list in other nodes to indicate said claimed timeslot as being occupied;

(j) transmitting a signalling packet from said originating node having a destination address, an originating address, and the location of said claimed timeslot;

(k) monitoring said medium for a response to said signalling packet;

(l) receiving a responsive signalling packet designating a claimed response timeslot; and (m) transmitting voice data in said claimed timeslot and converting voice data in said return timeslot into voice signals.

(n) receiving, at a receiving node, said signalling packet addressed to said receiving node;

(o) transmitting a second dummy message in a response timeslot having a predetermined relationship to said claimed timeslot;

(p) monitoring said medium for reception of said transmitted second dummy message;

(q) receiving said second dummy message;

(r) comparing said received second dummy message to the transmitted second dummy message;

(s) repeating steps (o) through (r) if said stored second dummy message and received dummy message are not substantially similar;

(t) transmitting a signalling packet addressed to said originating node indicating that said response timeslot has been claimed;

(u) transmitting a series of second dummy messages in said response timeslot to keep said response timeslot occupied;

(v) sending voice transmissions in said response timeslot;

(w) determining whether said receiving node is busy with another transmission;

(x) sending a signalling packet to said originating node indicating that said receiving node is busy if said receiving node is busy;

(y) determining whether said originating node is on the same channel as said receiving node;

(z) transmitting a signalling packet to an additional node when said receiving and originating nodes are on different channels and said receiving node is busy, said signalling package indicating that said receiving node is busy;

(aa) retransmitting, at said additional node, said signalling packet from said receiving node to said originating node on the frequency channel of said originating node.

25. A method for establishing and maintaining a voice communication between nodes in a network, each node having at least one associated telephone characterized by address information, comprising:

the step, performed repetitively and continuously, of generating periodic timing marks to define a series of cycles wherein (i) at least one interval within each cycle is designated a signalling packet ("SP") interval, (ii) a plurality of other intervals within each cycle are designated voice time slots ("VTS"), and (iii) pairs of VTS's in each cycle define a voice circuit ("VC");

the step, performed by a first node receiving signals from its associated telephone, of claiming a first VTS of an unused VC;.

the step, performed between the first node and a second node addressed by the first node of exchanging SP's between the first and second nodes;

claiming the second VTS of the VC for the second node; and the steps, performed by each of the first and second nodes, of inserting voice data in their respective claimed VTS's, each node generating the voice data on the basis of signals received from its associated telephone for transmission to the other node and applying voice data as received from the other node to its associated phone.

26. The method of claim 25, wherein the first mentioned step of claiming a VTS comprises the substeps of:

ascertaining the apparent availability of a particular VTS;

transmitting a Claiming Voice Packet ("CVP") within the apparently available VTS; and verifying the receipt of the CVP intact to indicate the absence of collision.

27. The method of claim 26 wherein each node is capable of communication on any of a plurality of frequency channels, and wherein the steps of exchanging SP's includes the substep, performed by the first node of sending a Call Request SP on each of the channels, specifying a single channel for response.

28. The method of claim 26 wherein each cycle contains first and second frames, each frame including an SP interval and a plurality of VTS's, with any VC consisting of corresponding VTS's from the first and second frames.

29. A method for establishing and maintaining a voice communication between nodes in a network, each node having at least one associated telephone characterized by address information, comprising:

the step, performed repetitively and continuously, of generating periodic timing marks to define a series of cycles wherein (i) at least one interval within each cycle is designated a signalling packet ("SP") interval, (ii) a plurality of other intervals within each cycle are designated voice time slots ("VTS"), and (iii) pairs of VTS's in each cycle define a voice circuit ("VC");

the step, performed by a first node in response to signals from its associated telephone indicating an off-hook condition and a combination of keystrokes indicating a call to be placed to a second node, of claiming a first VTS of an unused VC;

the step, performed by the first node in response to successfully claiming the first VTS, of transmitting a Call Request SP to the second node;

the step, performed by the second node in response to receiving the Call Request SP, of sending an Accept SP or a Busy SP to the first node;

the steps, performed by the first node in response to receiving the Accept SP, of transmitting an ACK SP to the second node, and applying a ringback signal or a busy signal to its own associated phone;

the step, performed by the second node in response to receiving the ACK SP, of causing its own associated phone to ring;

the step, carried out by the second node in response to signals from its associated phone indicating an off-hook condition, of claiming the second VTS of the VC;

the step, performed by the second node in response to successfully claiming the second VTS, of sending an Answer SP to the first node;

the step, performed by the first node in response to receiving the Answer SP, of sending an ACK SP to the second node; and the steps, carried out by each of the first and second nodes, of inserting voice data in their respective claimed VTS's, each node generating the voice data on the basis of signals received from its associated telephone for transmission to the other node and applying voice data as received from the other node to its associated phone.

30. The method of claim 29, wherein the first mentioned step of claiming a VTS comprises the substeps of:

ascertaining the apparent availability of a particular VTS;

transmitting a Claiming Voice Packet ("CVP") within the apparently available VTS; and verifying the receipt of the CVP intact to indicate the absence of collision.

31. The method of claim 29 wherein each node is capable of communication on any of a plurality of frequency channels, and wherein said step of sending a Call Request SP includes the substeps of sending a Call Request SP on each of the channels, specifying a single channel for response.

32. The method of claim 29 wherein each cycle contains first and second frames, each frame including an SP interval and a plurality of VTS's, with any VC consisting of corresponding VTS's from the first and second frames.

33. A system for transmitting messages to and from nodes over a network broadband medium, comprising:

a plurality of head-end means, coupled to one end of said network medium, for receiving said messages in a first frequency band and retransmitting said messages over said network medium in a second frequency band, said first and second frequency bands being a channel, each of said head-end means operating on a different channel;

a timing mark generator coupled to said network medium for simultaneously producing periodic timing marks on all of said channels;

a plurality of clock generators, each coupled to a different one of said head-end means, for producing the clock signals for said head-end means;

a plurality of phase lock loops, each coupled to a different one of said head-end means, for phase lock synchronizing said clock signals to a master clock;

a plurality of digital phase lock loop means, each coupled to a different one of said head-end means, for producing a fractional offset of the bits of a message in a timeslot following one of said timing marks to synchronize said message with said clock signals; and means, coupled to said head-end means, for examining the contents of each timeslot and inserting a bit patterns for synchronization in the absence of a message.

34. The system of claim 33 further comprising a plurality of second phase lock loops, each coupled to a different one of said head-end means, for phase synchronizing each said clock generator to an external clock; and logic means for selecting one of the outputs of said second phase lock loops as said master clock.

35. The system of claim 33 wherein a first or last portion of each said timeslot contains no data to allow said digital phase lock loop means to reset.

36. A system for transmitting messages to and from nodes over a network broadband medium, comprising:

a plurality of head-end means, coupled to one end of said network medium, for receiving said messages in a first frequency band and retransmitting said messages over said network medium in a second frequency band, said first and second frequency bands being a channel, each of said head-end means operating on a different channel;

a timing mark generator coupled to said network medium for simultaneously producing periodic timing marks on all of said channels;

a plurality of clock generators, each coupled to a different one of said head-end means, for producing the clock signals for said head-end means;

a plurality of phase lock loops, each coupled to a different one of said head-end means, for phase lock synchronizing said clock signals to a master clock;

a plurality of digital phase lock loop means, each coupled to a different one of said head-end means, for producing a fractional offset of the bits of a message in a timeslot following one of said timing marks to synchronize said message with said clock signals;

means, coupled to said head-end means, for examining the contents of each timeslot and inserting a bit pattern for synchronization in the absence of a massage;

a plurality of second phase lock loops, each coupled to a different one of said head-end means, for phase synchronizing each said clock generator to an external clock;

logic means for selecting one of the outputs of said second phase lock loops as said master clock; and wherein a first or last portion of each said timeslot contains no data to allow said digital phase lock loop means to reset.

37. The system of claim 36 wherein said digital phase lock loop means comprises:

a shift register having a data input coupled to receive said received message and a clock input coupled to a head-end clock having a frequency at least four times the frequency of said received data; and means for selecting an output of said shift register corresponding to a minimum phase difference between said received data and said head-end clock.

* * * * *